(12) United States Patent
Hesse

(10) Patent No.: US 6,754,207 B1
(45) Date of Patent: Jun. 22, 2004

(54) MULTIPLE-PATH WORMHOLE INTERCONNECT

(75) Inventor: John Hesse, Moss Beach, CA (US)

(73) Assignee: Interactic Holdings, LLC, Princeton, NJ (US)

( * ) Notice: Subject to any disclaimer, the term of this patent is extended or adjusted under 35 U.S.C. 154(b) by 414 days.

(21) Appl. No.: 09/693,359

(22) Filed: Oct. 19, 2000

Related U.S. Application Data

(63) Continuation-in-part of application No. 09/009,703, filed on Jan. 20, 1998, now Pat. No. 6,289,021.

(51) Int. Cl.[7] ............................................. H04L 12/28
(52) U.S. Cl. ...................................... 370/388; 370/400
(58) Field of Search ............................... 370/386, 387, 370/388, 389, 392, 400, 408, 409, 464; 340/2.2, 2.21, 2.23, 2.27, 825.01, 825.02; 379/271, 272; 709/238, 240

(56) References Cited

U.S. PATENT DOCUMENTS 6,335,930 B1 * 1/2002 Lee ............................ 370/387

FOREIGN PATENT DOCUMENTS

| EP | 0 369 146 A | 5/1990 |
|---|---|---|
| EP | 0 403 361 A | 12/1990 |
| EP | 0 720 332 A | 7/1996 |
| WO | WO 00 38375 A | 6/2000 |

OTHER PUBLICATIONS

Ni et al. "A Survey of Wormhole Routing Technqiues in Direct Networks". IEEE Computer. Feb. 1993. pp. 62–76.*
Linder et al. "An Adaptive and Fault Tolerant Wormhole Routing Strategy for k–ary n–cubes". IEEE Transactions on Computers. Jan. 1991. pp. 2–12.*
Liu et al. "Hierarchical Adaptive Routing". IEEE Symposium. Oct. 26–29, 1994. pp. 688–695.*
Balakrishnana et al. "A Priority–Based Flow Control Mechanism to Support Real–Time Traffic in Pipelined Direct Networks". IEEE International Conference on Parallel Processing. pp 120–127.*
Ni et al. "A survey of Wormhole Routing Techniques in Direct Networks". IEEE Computer. Feb. 1993, pp. 62–76.

* cited by examiner

Primary Examiner—Chi Pham
Assistant Examiner—Derrick W Ferris
(74) Attorney, Agent, or Firm—Ken J. Koestner

(57) ABSTRACT

A family of interconnect structures, switches that exploit the interconnect structures to attain scalability, low latency, and single-chip implementations. The disclosed interconnect structures and switches support a wide variety of applications including supercomputer interconnects, LAN switches, IP and ATM switches, telephony central office switching, video on demand servers, interconnects for mainframe database servers, high-speed workstation interconnects, and many others that are known to those having ordinary skill in the art.

4 Claims, 60 Drawing Sheets

MULTIPLE-PATH INTERCONNECT

DIAGONAL INTERCONNECT

NODE ARRAYS and CELLS

MESSAGE FORMAT

HEADER LENGTH CHANGE

8-ROW 3-COLUMN INTERCONNECT

8-ROW 5-COLUMN INTERCONNECT

MESSAGE FLOW AND BLOCKING

DIAGONAL INTERCONNECTION

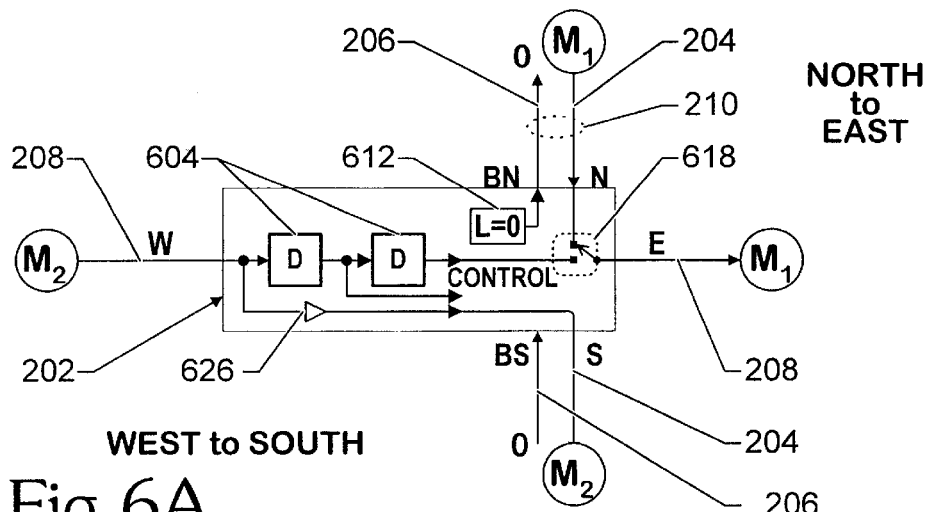
Fig 6A WEST to SOUTH / NORTH to EAST
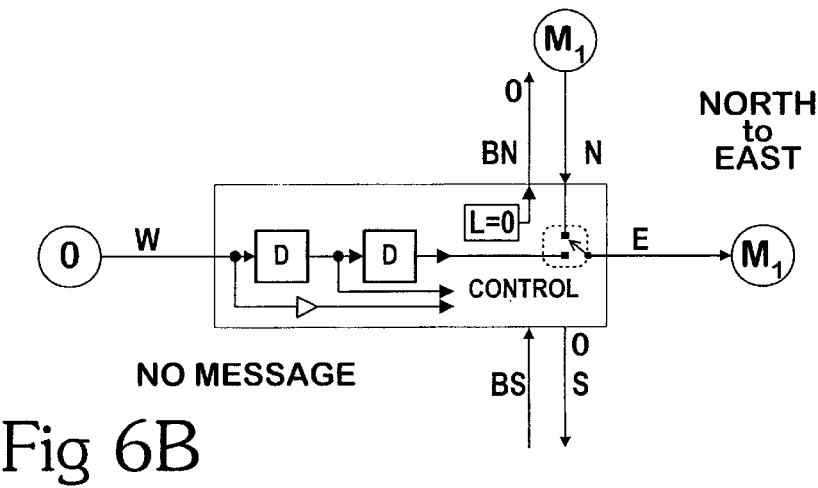
Fig 6B NO MESSAGE / NORTH to EAST
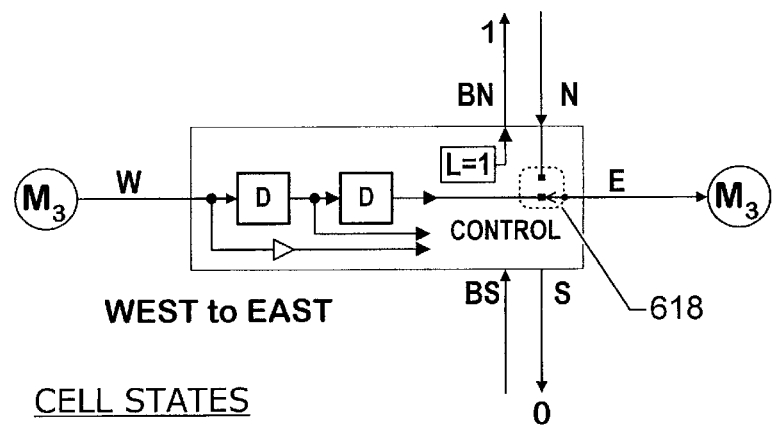
Fig 6C WEST to EAST
CELL STATES

CASCADE INTERCONNECT

STAIR STEP INTERCONNECT

CELL GROUPS

S1: 0,0,0 ...

$\pi_{1,1}$

S2: 0,1,0, ...

1002

$\pi_{2,1}$

1030

S4: 0,2,1,3,0

$\pi_{4,1}$ $\pi X_{4,1}$
SIMPLE

1036

S8: 0,4,2,6,1,5,3,7,0

$\pi_{8,1}$
GRAND TOUR $\pi R_{8,1}$
RANDOM

S16 = 0,8,4,12,2,10,6,14,1,9,5,13,3,11,7,15,0

$\pi 16,1$

GRAND TOUR $\pi R16,1$

RANDOM $\pi_{8,3}$

DEGREE 3 PERMUTATION $\pi_{8,4}$

DEGREE 3 PERMUTATION $\pi_{8,5}$

DEGREE 5 PERMUTATION $\pi_{8,7}$

DEGREE 7 PERMUTATION

16-ROW FLOORPLAN EXAMPLE

RACETRACK FLOORPLAN

S3 = 0,2,1,0

$\pi_{3,1}$

S5 = 0,3,2,4,1,0

$\pi_{5,1}$

S6 = 0,3,2,5,1,4,0

$\pi_{6,1}$

S11 = 0,6,3,9,2,8,5,10,1,7,4,0

$\pi_{11,1}$ $S_3 3 \Leftarrow$    0, 1, 2, 0, ...

$S_3 9 \Leftarrow S_3 3$    &    $(S_3 3 + 3)$    &    $(S_3 3 + 6)$ $S_3 3$    $\Rightarrow$   0 _ _ 1 _ _ 2 _ _ 0 ...

$(S_3 3 + 3)$   $\Rightarrow$   _ 3 _ _ 4 _ _ 5 _ _

$(S_3 3 + 6)$   $\Rightarrow$   _ _ 6 _ _ 7 _ _ 8 _

$S_3 9$    $\Leftarrow$   0, 3, 6, 1, 4, 7, 2, 5, 8, 0, ...

$S_3 27 \Leftarrow S_3 9$    &    $(S_3 9 + 9)$    &    $(S_3 9 + 18)$ $S_3 9$   $\Rightarrow$ 0 _ _ 3 _ _ 6 _ _ 1 _ _ 4 _ _ 7 _ _ 2 _ _ 5 _ _ 8 _ _ 0

$(S_3 9 + 9)$   $\Rightarrow$ _ 9 _ _ 12 _ _ 15 _ _ 10 _ _ 13 _ _ 16 _ _ 11 _ _ 14 _ _ 17 _

$(S_3 9 + 18)$   $\Rightarrow$ _ _ 18 _ _ 21 _ _ 24 _ _ 19 _ _ 22 _ _ 25 _ _ 20 _ _ 23 _ _ 26

$S_3 27$    $\Leftarrow$ 0, 9, 18, 3, 12, 21, 6, 15, 24, 1, 10, 19, 4, 13, 22, 7, 16, 25, 2, 11, 20, 5, 14, 23, 8, 17, 26, 0, ...

BASE 3 SEQUENCES

Fig 16

BASE-4 CELLS

BASE-4 NODE

BASE 4 NODES

BASE-4 INTERCONNECT

16 ROW BASE-4 INTERCONNECT

BASE 4 INTERCONNECT

LOGICALLY SIMILAR CIRCUITS

TWO-CELL LAYOUT

TWO-CELL NODE

TIMING DISTRIBUTION

Prior Art

CLK / RD

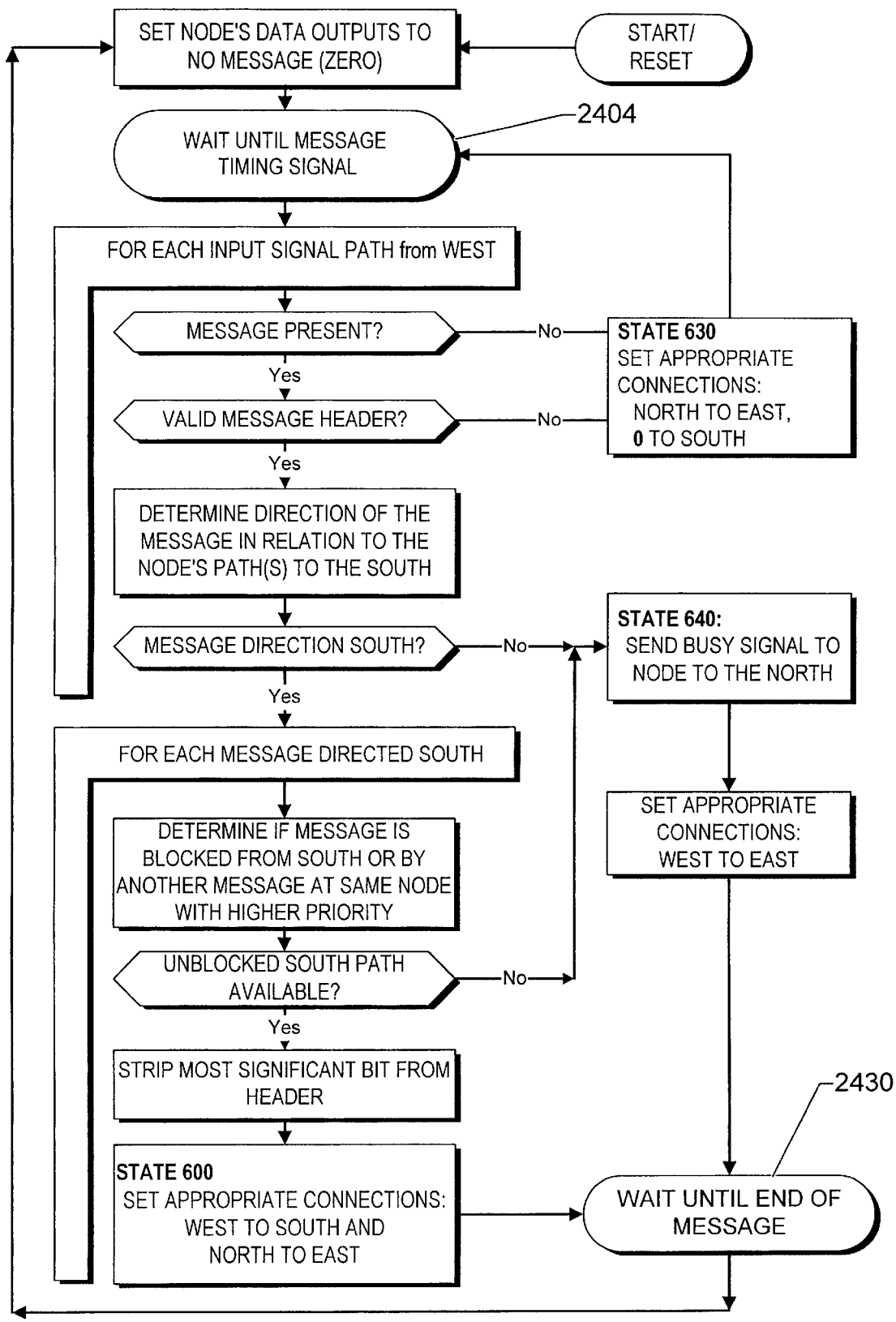
Fig 25     CONTROL FLOWCHART

TWO-CELL NODE STATES

4-CELL NODE

S8= 0,4,2,6,1,5,3,7,0

4-DOWN INTERLEVEL PERMUTATIONS

CELL PRIORITIES

CELLS AND NODES

BUILT IN SELF TEST

DEFECTIVE CELL BYPASS

16x16 SYSTEM with RESERVES

ASYNCHRONOUS INPUT

ADVANCED TIMING
EXTERNAL BUSY SIGNAL

TIME-OF-FLIGHT LOOP

MULTIPLE-PATH WORMHOLE INTERCONNECT

RELATED ART

This is a continuation in part of U.S. patent application Ser. No. 09/009,703, filed on Jan. 20, 1998, now U.S. Pat. No. 6,289,021, which is incorporated herein by reference in its entirety. This application also incorporates U.S. Pat. No. 5,996,020 herein by reference in its entirety The disclosed system and operating method are related to subject matter disclosed in the following co-pending patent applications that are incorporated by reference herein in their entirety:

1. U.S. patent application Ser. No. 09/693,603 entitled, "Scaleable Interconnect Structure for Parallel Computing and Parallel Memory Access", naming John Hesse and Coke Reed as inventors and filed on even date herewith;
2. U.S. patent application Ser. No. 09/693,358 entitled, "Scaleable Interconnect Structure Utilizing Quality-of-Service Handling", naming Coke Reed and John Hesse as inventors and filed on even date herewith;
3. U.S. patent application Ser. No. 09/693,357 entitled, "Scaleable Wormhole Routing Concentrator", naming John Hesse and Coke Reed as inventors and filed on even date herewith;
4. U.S. patent application Ser. No. entitled, "Scaleable Apparatus and Method for Increasing Throughput In Multiple Level Minimum Logic Networks Using a Plurality of Control Lines", naming John Hesse and Coke Reed as inventors and filed on even date herewith.

BACKGROUND OF THE INVENTION

The present invention relates to interconnection structures for computing and communication systems. More specifically, the present invention relates to a scaleable low-latency switch for usage in a multiple level interconnection structure.

A persistent and significant unsolved problem in the field of computer science and communications has been the lack of a scaleable, low-latency interconnect that sustains high throughput, a high cross-sectional bandwidth, under fully loaded conditions. Existing interconnect designs, such as banyon, omega and fat-tree networks, multi-level grids, torus and hypercube networks, all fail in various degrees to scale without limit, and to support low latency and high throughput when loaded with traffic. Geometries of existing networks were developed by Nineteenth Century mathematicians, and even earlier geometricians, and were never intended to support a message-routing method.

What is needed is an interconnect structure and a suitable switch for use in forming interconnections in the structure that are scaleable virtually without limit, and that support low latency and high throughput.

SUMMARY OF THE INVENTION

What have been discovered are a family of interconnect structures, switches that exploit the interconnect structures to attain scalability, low latency, and single-chip implementations. The disclosed interconnect structures and switches support a wide variety of applications including supercomputer interconnects, LAN switches, IP and ATM switches, telephony central office switching, video on demand servers, interconnects for mainframe database servers, high-speed workstation interconnects, and many others that are known to those having ordinary skill in the art.

BRIEF DESCRIPTION OF THE DRAWINGS

These and other objects, features and advantages of the invention will be more readily apparent from the following detailed descriptions in which:

FIGS. 6A, 6B and 6C are detailed schematic block diagrams that respectively illustrate a cell in three internal states, and show "vertical" and "horizontal" movement of messages and transmission and receipt of control signals.

FIG. 16 is a table that illustrates operations for generating numeric sequences for a base 3 design, a class of interconnects other than power-of-2 design.

FIGS. 21A through 21O are block diagrams that respectively illustrate a plurality of cell-to-cell connection topologies for transmitting messages and control information. The illustrated structurally distinct layouts and topologies are functionally similar.

FIG. 25 is a simplified flowchart showing operations for determining routing decisions for a message or messages entering a node.

DETAILED DESCRIPTION

Figure 1A:
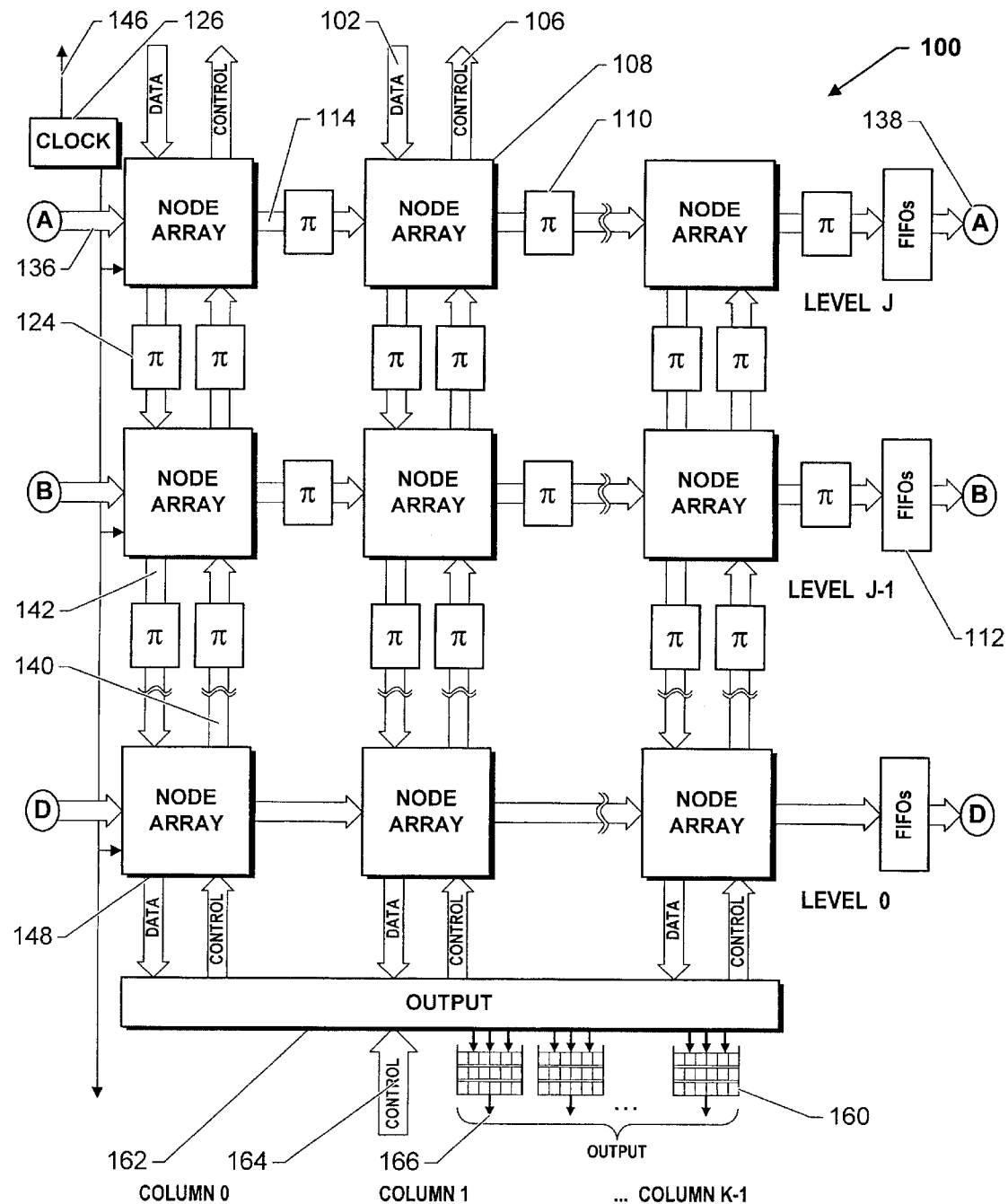
FIG. 1A is a block diagram showing an innovative interconnect structure with node arrays and permutation boxes arranged in multiple columns and levels, and illustrating horizontal and vertical data paths, vertical control signal paths, and input/output structures.
Figure 1B:
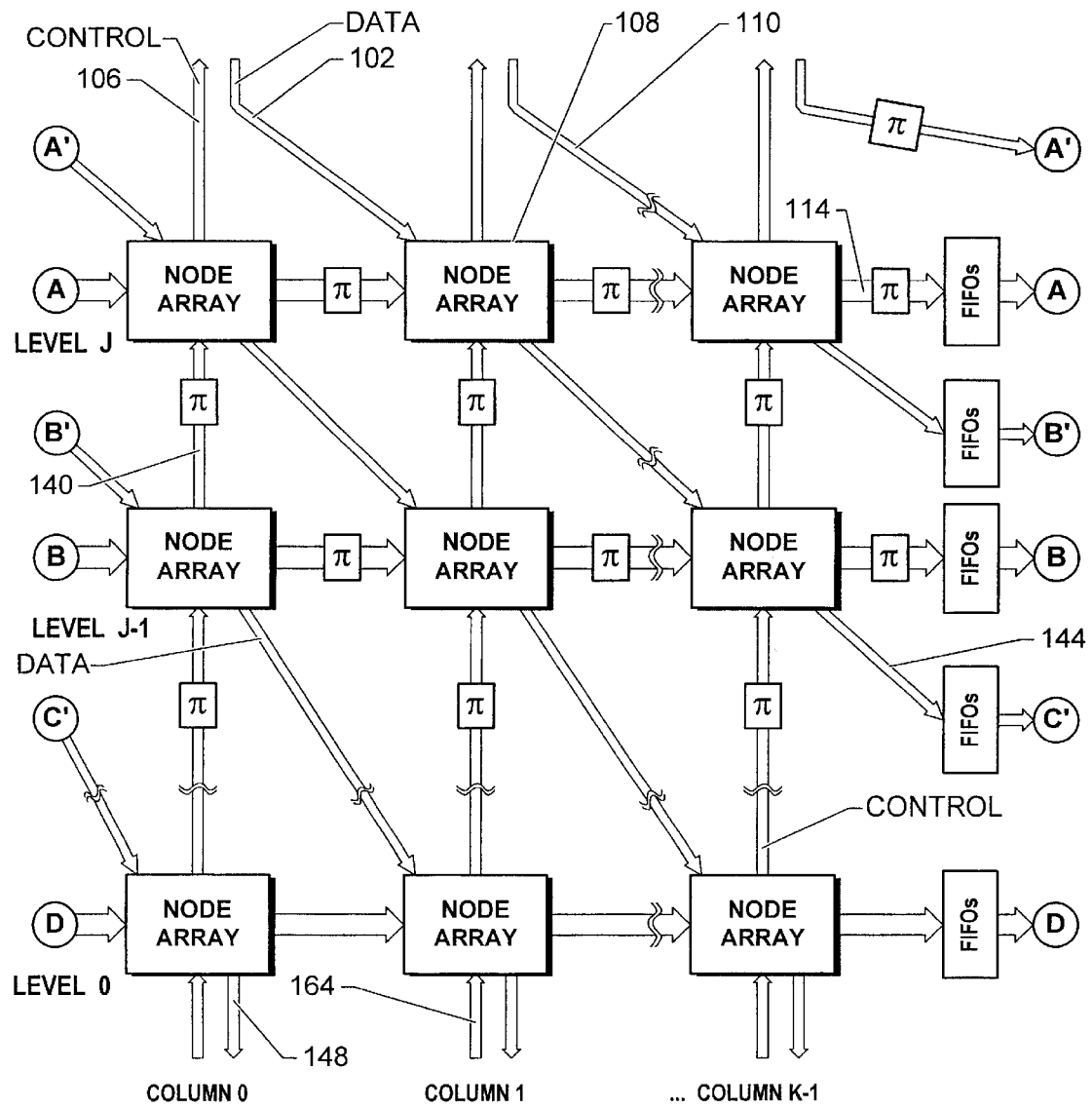
FIG. 1B is a block diagram that shows an alternate embodiment of the interconnect structure with node arrays and permutation boxes arranged in multiple columns and levels, and illustrating horizontal and diagonal data paths, and vertical control signal paths.

FIGS. 1A and 1B are block diagrams showing two embodiments of the fast, multiple-path interconnect 100 with multiple rows of serial data transmitters and switching cells arranged in multiple vertical columns and multiple levels. The levels are interconnected at each column by a structure of vertical data paths 142 in the interconnect shown in FIG. 1A, by diagonal data paths 110 in the interconnect path shown in FIG. 1B, and vertical control signal paths 140 in both figures. K columns are shown, enumerated as column 0 through K−1. J+1 levels are shown, enumerated as level 0 through J. The individual levels contain a plural number of rows, which perform serial data transmission 114. The horizontal rows interconnect node arrays 108, permutation boxes 110, and first-in, first-out, serial delay means (FIFOs) 112 at each level.

Serial data in the form of messages are admitted into interconnect 100 through data input ports. Data input element 102 includes a plural number of data ports at one or more columns. Messages entering interconnect 100 from input ports directly enter node arrays 108 at the top level via data bus 102. Signals on control signal bus 140 and 106 indicate that an associated data path may not be available to accept input data. Serial data is emitted from interconnect 100 by data output lines at each vertical path 148. Each data column connects to a plural number of output ports. External control signals 164 may inform the interconnect that an external device is ready or not ready to accept data. In some embodiments of the interconnect, control signal 164 is omitted and messages reaching the bottom level are immediately connected to an output port.

K columns are shown. A column may contain a plurality of separate data transmission paths for conveying messages. For example, an interconnect structure can have K columns, each with $2^J$ downward transmission paths where J+1 is the number of interconnect levels, and support up to $2^J$K input ports and up to $2^J$K output ports. The number of data lines may be different from $2^J$ in some embodiments.

To facilitate understanding, messages are considered to generally flow from left to right and from top to bottom within the interconnect. Note that this convention is imposed to describe motion of messages within a theoretical topology and not to describe structural space constraints of the network. The topology may be folded, twisted, inverted, wrinkled, or undergo any other variation in relative position and correspond to the described topology. A message reaching the right-hand side 138 of a level is routed left to enter the left-hand side 136. The routing of individual messages through the interconnect is controlled by nodes and cells within node arrays 108. Clock 126 controls the timing of node arrays 108, FIFOs 112, and input and output timing. The timing of messages entering the interconnect is governed by external timing signal 146.

Features of interconnect 100 include but are not limited to at least one of (1) the use of a control signal to communicate the availability of a message path to the switching cell that might use the control signal, (2) an alternate path from the cell that is always available, (3) a multiplicity of connection paths from any input to any port, and (4) message wormholing through the interconnect.

A serial message moving within interconnect 100 always has an available path to continue a wormhole motion and never is held in a buffer, desirably reducing time of flight through the interconnect. In conjunction with the operative features is a global timing scheme that allows logic and control to be performed within a single clock period at each node, and enables wormhole message transmission through the interconnect. Wormhole transmission occurs when a message spans a plural number of nodes within the interconnect, even to the extent that the head of the message reaches an output port before the tail has entered an input port. Wormhole routing is performed without any form of handshaking as messages move from node to node through the interconnect structure.

In some embodiments of interconnect 100, output control logic 162 identifies and routes messages that have reached the bottom level and connects the messages to an appropriate target port 166. When two or more messages arrive in the same time period at the same output port, a buffer 160 can be used to store messages for subsequent output from the interconnect. External control signal 164 informs the output port whether the external target can accept a message. Output control functionality is discussed in more detail hereinafter. In an alternative embodiment, output control logic 162 and buffers 166 are omitted and messages move directly from the bottom level to respective output ports 166.

FIG. 1A shows message paths in horizontal and vertical directions and control signals in a vertical direction. FIG. 1B shows an alternate embodiment where messages move horizontally or diagonally downward, and control signals moving in a vertical direction. In FIG. 1A, data moving down in a vertical data path immediately moves to the right in a horizontal data path so as to move from a given node array to an array one level lower and one column to the right. In FIG. 1B, data moves directly from a node array to a node array one level lower and one column to the right.

Figure 1C:
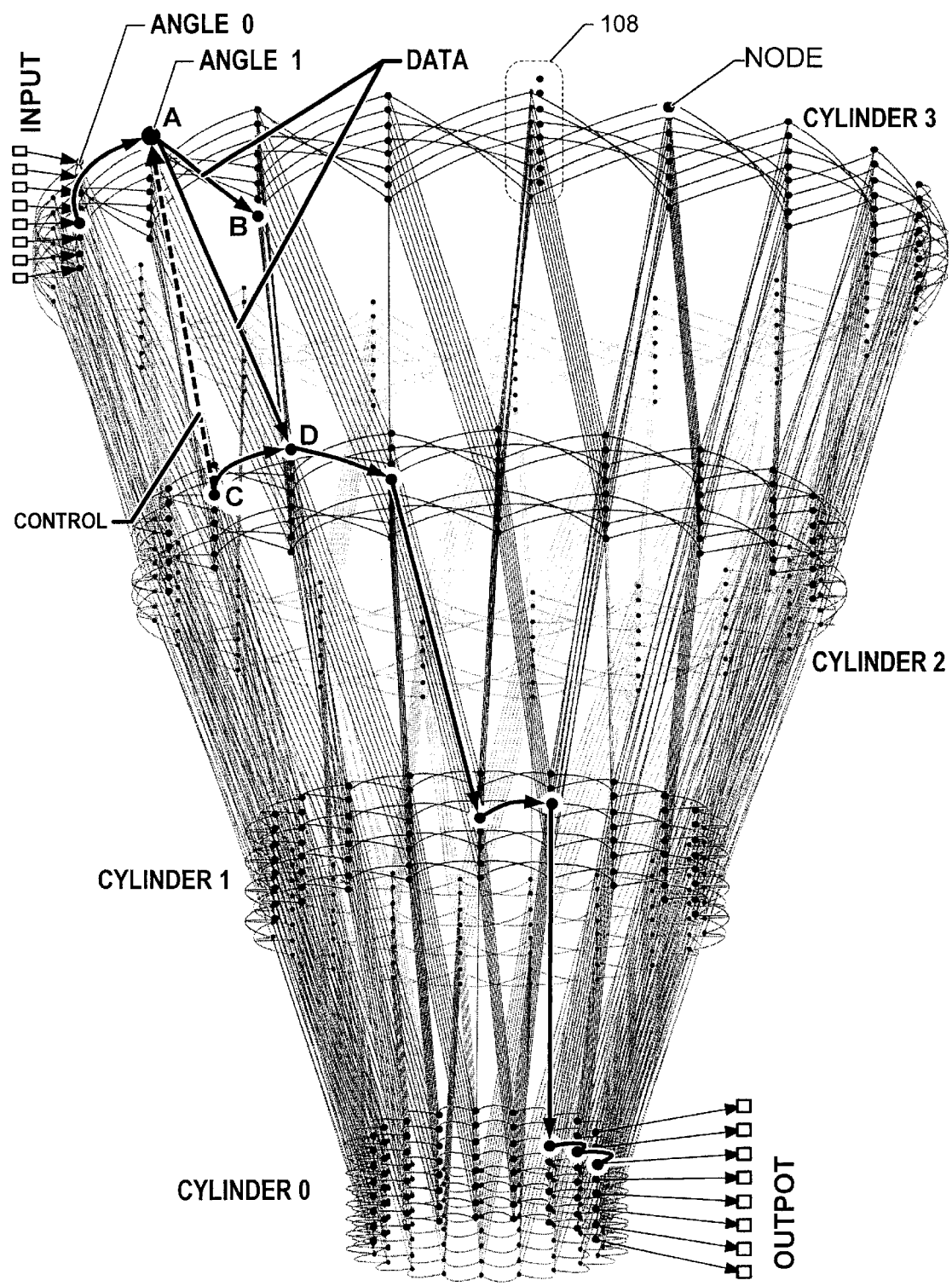
FIG. 1C is a schematic pictorial diagram illustrating an example of a Multiple-Level, Minimum-Logic network or interconnect structure as is described more fully in U.S. Pat. No. 5,996,020. To facilitate understanding of the interconnect structure, the diagram describes the structure in terms of "nodes" that are connected at a plurality of "angles" which are arranged on a "cylinder". A dashed line shows a path of a message from an input port to a designated output port.

FIG. 1C is a schematic pictorial diagram illustrating a four-cylinder, eight-row network that exemplifies the multiple-level, minimum-logic (MLML) networks taught in U.S. Pat. No. 5,996,020. Data in the form of a serial message enters the network at INPUT terminals to the network which are located at an outermost cylinder, shown as cylinder 3 at the top of FIG. 1C, and moves from node to node towards a target output port that is specified in a header of the message. Data always moves to a node at the next angle in one time period. A message moves toward an inner cylinder shown at a lower level in FIG. 1C whenever such a move takes the message closer to the target port.

The network has two kinds of transmission paths: one for data, and another for control information. In an illustrative embodiment, all nodes in the network may have the same design. In other embodiments, the nodes may have mutually different designs and characteristics. A node accepts data from a node on the same cylinder or from a cylinder outward from the node's cylinder, and sends data to node on the same cylinder or to a cylinder inward from the node's cylinder. Messages move in uniform rotation around the central axis in the sense that the first bit of a message at a given level uniformly moves around the cylinder. When a message bit moves from a cylinder to a more inward cylinder, the message bits synchronize exactly with messages at the inward cylinder. Data can enter the interconnect or network at one or more columns or angles, and can exit at one or more columns or angles, depending upon the application or embodiment.

A node sends control information to a more outward positioned cylinder and receives control information from a more inward positioned cylinder. Control information is transmitted to a node at the same angle or column. Control information is also transmitted from a node on the outermost cylinder to an input port to notify the input port when a node on the outermost cylinder that is capable of receiving a message from the input port is unable to accept the message. Similarly, an output port can send control information to a node on the innermost cylinder whenever the output port cannot accept data. In general, a node on any cylinder sends a control signal to inform a node or input port that the control signal sending node cannot receive a message. A node receives a control signal from a node on a more inward positioned cylinder or an output port. The control signal informs the recipient of the control signal whether the recipient may send a message to a third node on a cylinder more inward from the cylinder of the recipient node.

In the network shown in FIG. 1C, if a node A sends a message to a node B on the same cylinder, and node B receives data from a node J on an outer cylinder, then the node A independently sends control information to the node J. Node B, which receives messages from nodes A and J, does not participate in the exchange of control information between nodes A and J. Control-signal and data-routing topologies and message-routing schemes are discussed in detail hereinafter.

In U.S. Pat. No. 5,996,020 the terms "cylinder" and "angle" are used in reference to position. These terms are analogous to "level" and "column," respectively, used in U.S. Pat. No. 6,289,021, and in the present description. In FIG. 1C data moves horizontally or diagonally from one cylinder to the next, and control information is sent outward to a node at the same angle, analogous to the layout shown in FIG. 1B. The node array 108 of FIG. 1B is analogous to a column of nodes in one cylinder at one angle of the MLML network.

Figures 2A, 2B:
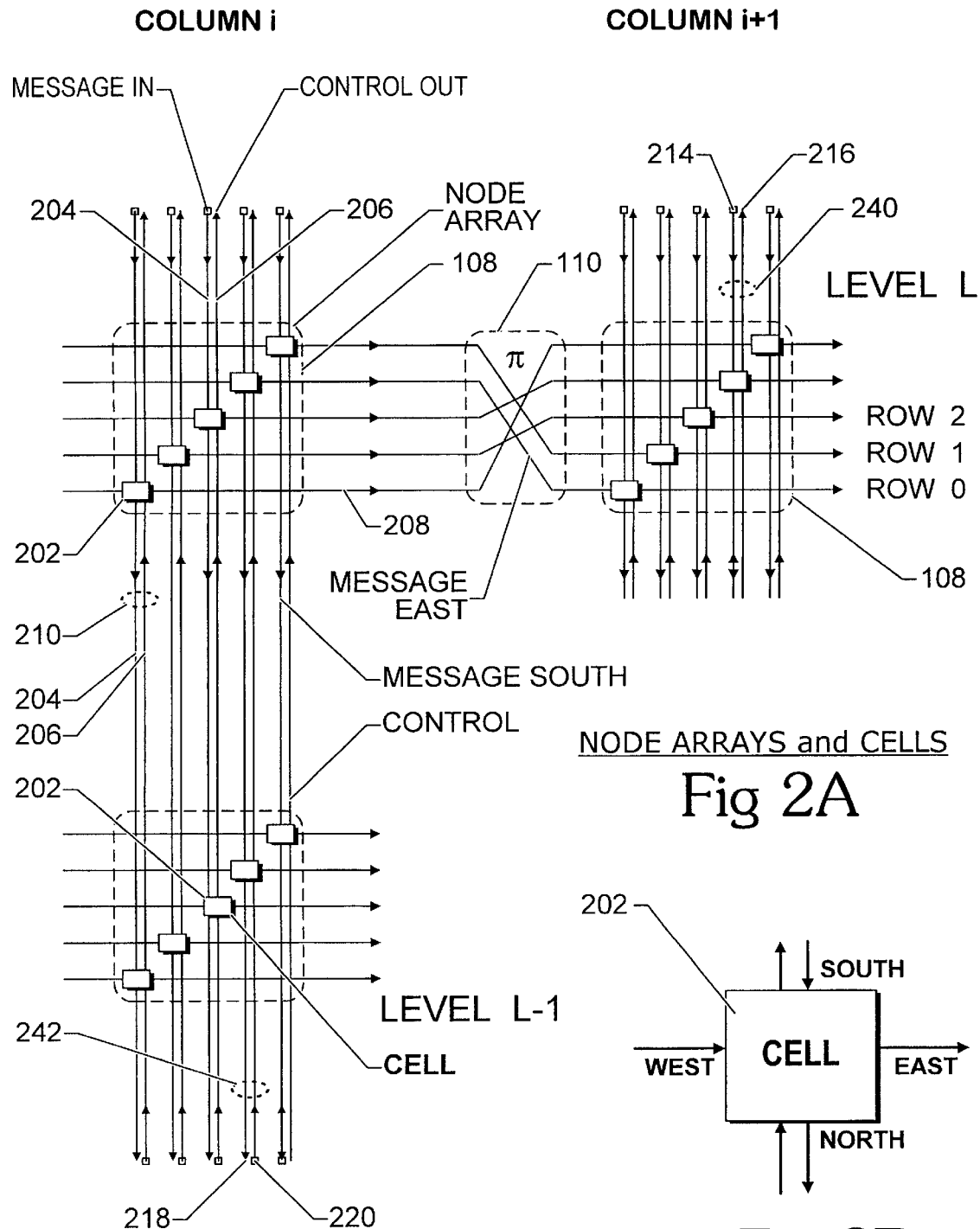
FIG. 2A is a simplified schematic diagram that illustrates an example of local interconnections between cells within node arrays. The diagram shows connections of cells located on horizontal data paths, or "rows", are connected through a permutation box to cells in an adjacent column and connected vertically to cells in the same column by a data path "downward" and a control signal path "upward".
FIG. 2B is a simplified diagram of a cell showing interconnections to other cells in four directions which are termed "north", "south", "east", and "west" directions to facilitate understanding and to define conventions used in the specification text.

Referring to FIG. 2A in conjunction with FIG. 1A, a node array 108 contains a plural number R of cells 202. A node array 108 is positioned at the intersection of a level and a column of interconnect 100. The illustrative interconnect 100 has one cell on a horizontal row 208 and one or more cells on a vertical path 210. Row 208 is a horizontal data path that transmits a message from one column to the next at a given level. Row 208 is included in data bus 114. A level contains a plural number R of data rows 208. A column contains a plural number R of vertical data paths 204, and R vertical control signal paths 206. Vertical data path 204 serially transmits a message to the next lower level and is a member of data bus 142. Vertical path 206 carries a control signal from a cell at a lower level to a cell at the higher level or to input 204 if the cell is at the top level. A control signal on path 206 signals the cell or cells above that the signaling cell cannot accept a message. A cell 202 is located at the intersection of every horizontal row 208 and vertical data path 204. In an alternative embodiment, the number of rows may be different at different levels.

In some embodiments a plural number of vertical data and control signal paths may connect to a cell or set of cells. The term "cell" as used here refers to a switching element located at the intersection of a row 208 and vertical data path 210. The cell that receives a message from the left can switch the message either: (1) horizontally to the cell on the same level at the next column, or (2) downward to the cell at a lower level. In literature that discusses interconnects and networks the term "node" is often used to refer a switching component such as a single switch within an interconnect, a set of switches, one or more control elements, or a complete switch system that is part of a geographically dispersed network such as the Internet. In the context of the present description, "node" refers to a single cell, or a set of interconnected cells in the same node array. In a simple embodiment a node contains one cell and control logic for the cell. In other embodiments a node contains a plural number of cells and all or most of the control logic for the cells.

A permutation box 110 generates row-to-row transitions of messages moving horizontally, and is located between some columns. An array of first-in, first-out elements is a plural number of serial delay elements, referred to hereafter as FIFOs. A FIFO 112 is located on a row 208. A FIFO array 112 is located between one or more columns. Because a vertical data path 204 is associated with a corresponding control signal vertical paths 206, the pair of vertical paths is referred to as sub-column 210. Similarly, message input port 214 and an associated control signal output 216 are referred to as input port 240. A data output path 218 and an associated control signal input port 220 are referred to as an output port 242.

Data enters a cell 202 located in a top-most node array through input port 214 and data exits from a cell at the bottom-most level to an output port 218. A control signal 216 at input port 214 can signal to the external input device that the associated input port cannot accept data. Control signal input port 220 accepts signals from an external device, which may indicate that the latter cannot accept data from the associated output port. Data path 204, control signal path 206, and data row 208, shown as a single line, may each contain one or more signal paths depending on the characteristics of the cell. Cells that are interconnected together within the same node array and function together as a node are discussed later.

Referring to FIG. 2B, directional conventions are described for a cell. A cell 202 accepts one or more messages from the north or west and transmits messages to the east or south. A cell sends one or more control signals to the north and accepts one or more control signals from the south. If a message moves to the next column directly or through a permutation box, the message is described as moving east. Similarly, if a message moves down to a lower level directly or through a permutation box the message is described as moving south. Directions are used as a convention to indicate the direction of data or control signal flow into or out of cells. A message at level L, column C, moves at the next time step to either: (1) level L, column ((C+1) mod K), or (2) to Level L−1, column ((C+1) mod K), where K is the number of columns. More generally, a message always moves to the next sequential column without buffering while either remaining at the same level or dropping down to a lower level. In an optical wavelength division multiplexing (WDM) embodiment, the header bits can all travel in the same time slot using different wavelengths to carry the different header bits. Data can be transmitted in both the time and frequency domains.

Figure 3A:
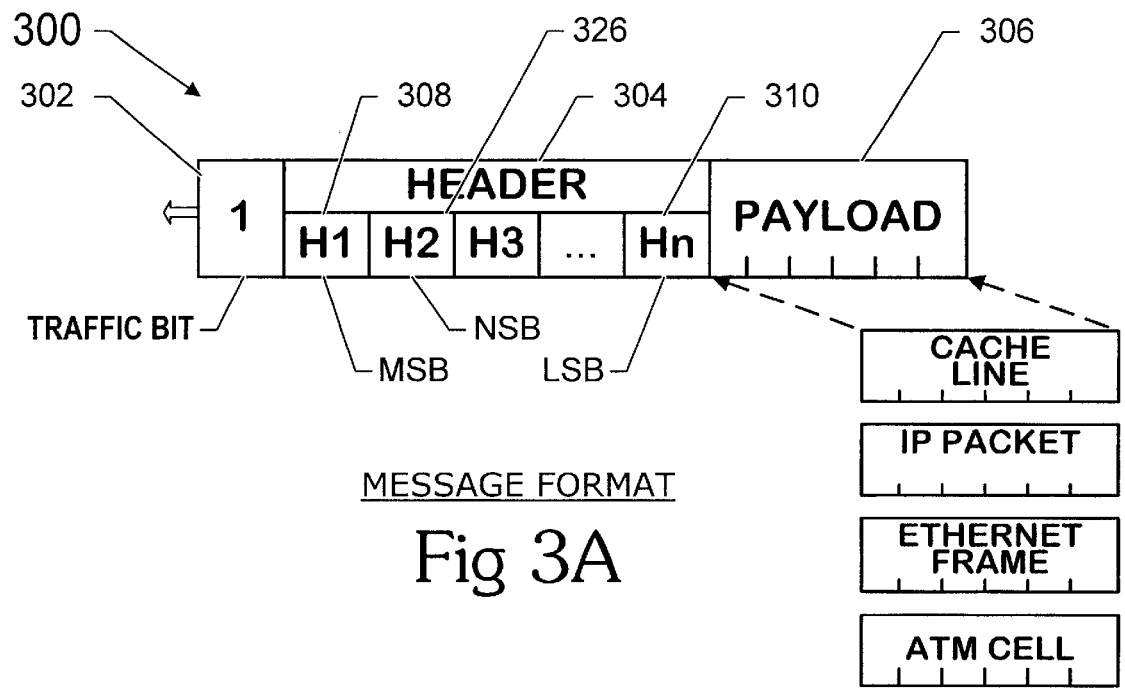
FIG. 3A is a table that depicts an example of a message format including various predefined bits such as a "traffic" bit, binary encoding bits, or bits designating a target row address. The message formal generally includes a header followed by a payload.

FIG. 3A shows a highly suitable example of a message format. A message entering interconnect 100 includes a traffic bit 302 which has the value '1', a target header 304 identifying the target row or target output port 218, and a payload 306. Traffic bit 302 indicates whether a message is present. The message header 304 is a binary encoding of the target row number such that the most-significant bit (MSB) of the address 308 appears first, the least significant bit 310 appears last; and the next most-significant bit 326 follows the MSB. In an alternative embodiment, the least significant bit appears first. A destination column may optionally be encoded following the header (not shown). Payload 306 contains the data packet that is desired to be transported within interconnect 100 from any input port 214 to any output row or port 218. In some embodiments of interconnect 100, payload 306 can have a variable length, up to a pre-determined maximum length. The maximum length is a function of timing. For example, short messages are admitted into the interconnect at one time period or periods, longer messages at another time, and that the pattern of differing message lengths can repeat in a manner controlled by an external command. The total length of message 300 includes the traffic bit 302, the header 304, and payload 306. Payload 306 is a serial stream of data, such as a shared-memory cache line, an interprocessor communications message in a supercomputer, an ATM cell in a switch or router, an Ethernet frame, an IP packet in a switch or router, or any other data desired to be transmitted from an input port to any output port of the interconnect.

Figure 3B:
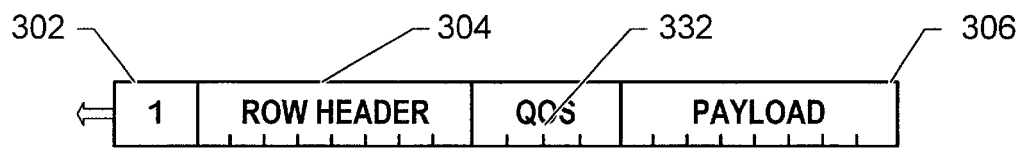
FIG. 3B is a table showing an alternative message format that supports quality of service (QOS) encoding.

Referring to FIG. 3B, message 330 may contain priority bits and/or quality of service (QOS) bits 332 in addition the header or headers and payload already discussed. The bits are used within the interconnect to specify if one message has priority over another message, and/or whether a particular message can be discarded within the interconnect if the interconnect becomes congested with other message traffic. QOS bits may be set before the message enters the interconnect, for example, to indicate a low-priority ATM (Asynchronous Transfer Mode) cell or packet. QOS bits may also be modified while a message is within the interconnect structure, for example, to track the age of the message within the interconnect structure.

Figure 3C:
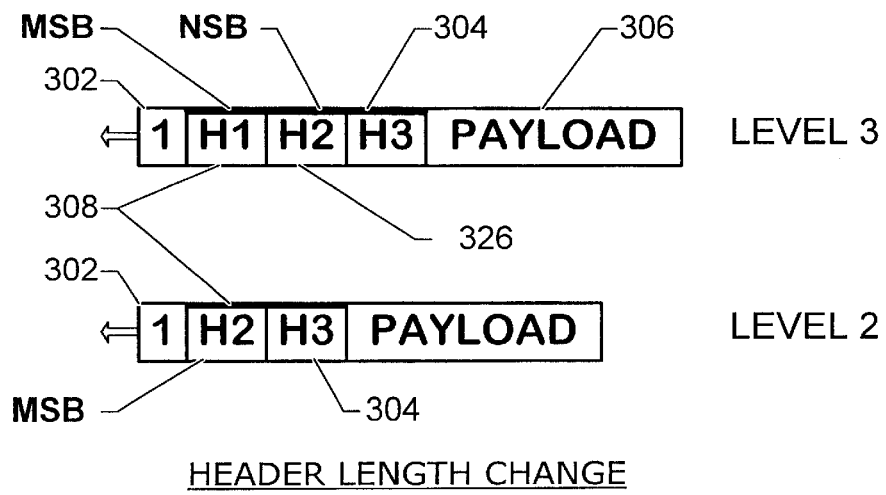
FIG. 3C is a table that illustrates modification of a message header as a message moves to a next level.

Referring to FIG. 3C, when message 300 moves south to a lower level the MSB H1 308 is removed from the message. Therefore, the next most-significant bit H2 326 becomes the MSB for the message at the next lower level. A desirable side effect of the header length change is that the length of the header is reduced by one bit per level. MSB-bit stripping advantageously minimizes the amount of logic needed in cells. When message 300 reaches the targeted output port all bits of header 304 have been removed, reducing the message time-of-flight. Traffic bit 302 is retained as the first bit of the message along with other bits that are not row header bits. The target address, if required by the recipient of the message, can be included as part of the payload.

Figure 4A:
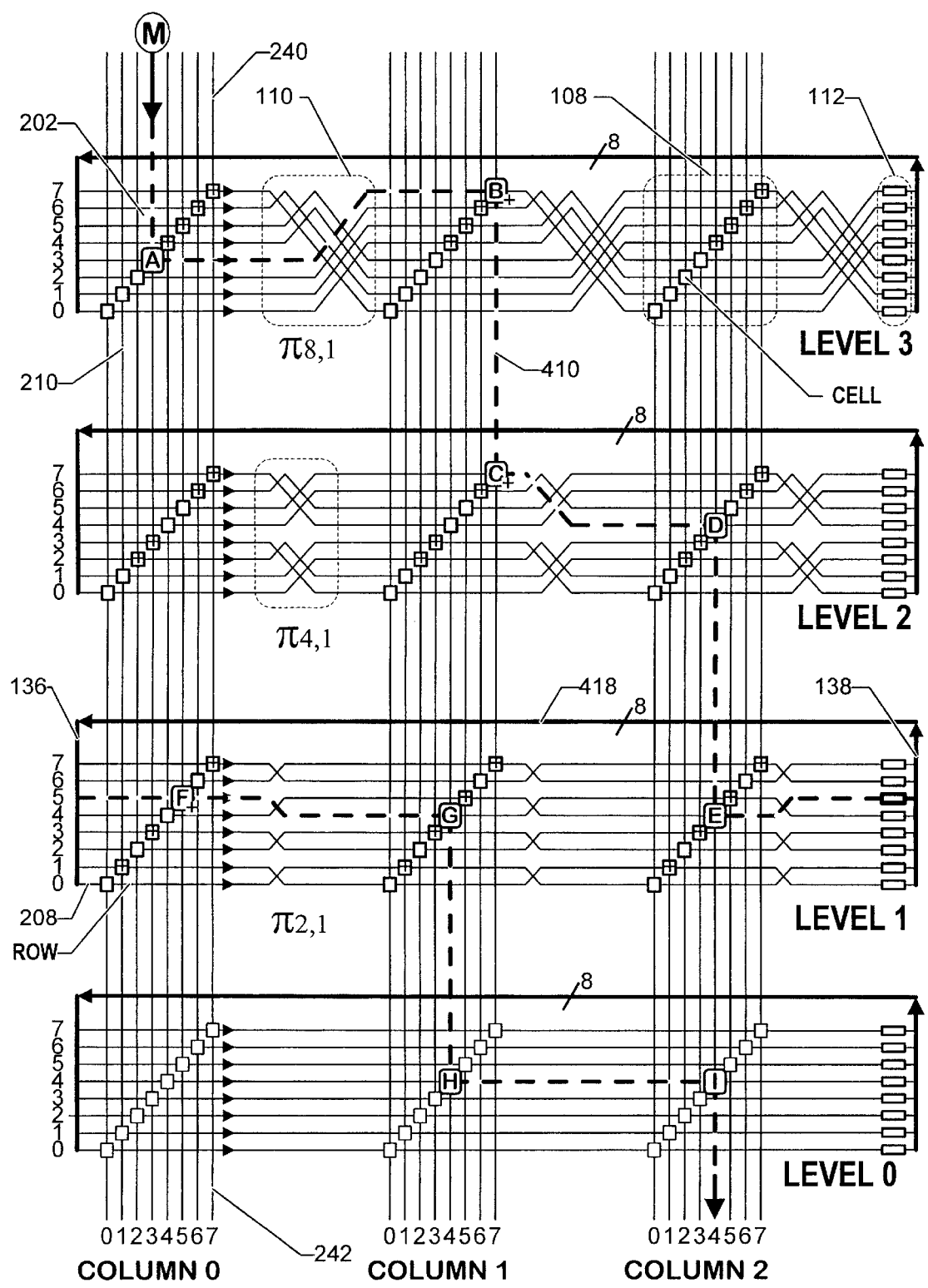
FIG. 4A is a detailed schematic diagram showing an example of an 8-row 3-column interconnect and a connection topology of data and control signal paths for cells and input/output (I/O) lines. A dashed line illustrates wormhole message flow.

FIG. 4A is a diagram showing an example of an interconnect with interconnections between cells and a description of message wormholing. The interconnect topology at each level is the same as the Multiple Level, Minimum Logic network shown in FIG. 1C. For clarity, the diagram has only 8 rows per level and 3 columns. Other embodiments have more rows and columns, for example but without limitation, 64 to 1024 or more rows per level, and 12 to 24 or more columns. The interconnect scales upward without limit while preserving efficient throughput and wormhole message transmission. A permutation box 110 can be interposed between columns. An "identity" layout is used in node arrays 108. An identity layout is the placement of cells along a diagonal as shown. The layout of permutation boxes is discussed in conjunction with the description of FIG. 10 hereinafter. The interconnect has a single FIFO structure 112 at a level, using the configuration shown in FIG. 7B.

Some of the nodes in FIG. 4A are marked with "+" to indicate rules of movement of messages through the interconnect structure. Messages that move from level L to level L−1 use header bit $H_L$ in making routing decisions. In some embodiments, bit $H_L$ is the most-significant bit 308 of the address. Messages that have $H_L=1$ depart level L to level L−1 from level L nodes that are marked with a "+". Messages that have $H_L=0$ depart level L to level L−1 from level L nodes that are not marked with a "+". The rule for movement of a message through a node on level L is advantageously based only on the traffic bit, the header bit $H_L$ and a control bit from a node on level L−1. The purpose of the control bit is to indicate a blocking condition. The example of message flow shown in FIG. 4A is simplified by the assumption that no blocking occurs. Rules of movement are discussed in the patents that are incorporated by reference and hereinafter.

A message M enters the interconnect structure from the north at column 0, level 3, row 3. A dashed line shows the full path of message M as the message wormholes through the interconnect structure. Message M enters cell A located on row 3 of the first node array. The row header 304 for message M is '100' in binary notation indicating a target of row 4 at the bottom level. A message entering a cell from the north is immediately routed east. After exiting the first node array, the message moves east and passes through permutation box π8,1 where the message moves from row 3 to row 7, and enters cell B that is connected to the south to cell C located in the upper group of cells at level 2. In FIG. 4A a cell, such as cell C, that is connected to a cell in an upper group is indicated by "+". The term "group of cells" is discussed in more detail with respect to the discussion of FIG. 9. For clarity, path 410 is shown as a single line that contains two signals: (1) data path 204 to the south, and (2) control signal 206 from the south. The MSB of message M header is '1' which specifies a destination of a cell in the upper group. Therefore, cell B routes the message south to cell C. Cell B modifies the header by removing the current MSB, and the header address changes from '100' to '00' before being sent south to level 2. Messages moving through node C exit the interconnect structure through an exit port at row 4, 5, 6, or 7.

A message entering a cell from the north is routed east so that message M moves east from cell C through permutation π4,1 from row 7 to row 4 to cell D which is connected to a lower group. H2 is the new MSB of the of the header. The value of H2 is '0' indicating that the message M is targeted to exit the structure through an exit port at height 0, 1, 4, or 5. The MSB of the header is now '0' indicating a lower group. Cell D routes the message south to cell E. Messages passing through cell E exit the interconnect structure through an output port at either row 4 or 5. Cell D changes the message header from '00' to '0'. At level 1, cell E routes the message east through permutation box π2,1, through FIFO 112 and then to the right-hand side 138 of the interconnect. The message circulates to the west 418 and enters the same row, row 5, at the first column. More suitable embodiments have more than the three columns shown in the example and the message does not enter a FIFO so soon. Cell F is connected to an upper group. The MSB, '0,' indicates a lower group. Cell F routes message M east to cell G. Cell G, connected to a lower group, sends the message south and east on row 4, the target row. The message moves to the next column and exits, having completed passage through the interconnect. FIG. 4A illustrates wormholing of a message through the interconnect. FIG. 1C shows a similar example of a message wormholing through the network such that the head exits before the tail enters. An unblocked message encounters 1.5 cells per level on average while wormholing through the interconnect structure.

Three-node groups most simply show connectivity in the illustrative interconnect structure. The three-node groups include a first node on any level other than level 0. The first node on a level is capable of sending a message to a second node on the same level as the first node. The set of output ports that are accessible to receive a message from the first node is the same as the set of output ports that are accessible from the second node. The first node is also capable of sending messages to a third node. The third node is on a level lower than the level of the first and second nodes. The set of output ports that are accessible to receive a message from the third node is not equal to the set of output ports accessible from the first node, but is a subset of the set of output ports accessible from the first node. In this way, when a message drops a level, the number of accessible output port targets is reduced. Since messages never move up a level, the progress that a message makes in narrowing the number of accessible output ports is never lost.

Figure 4B:
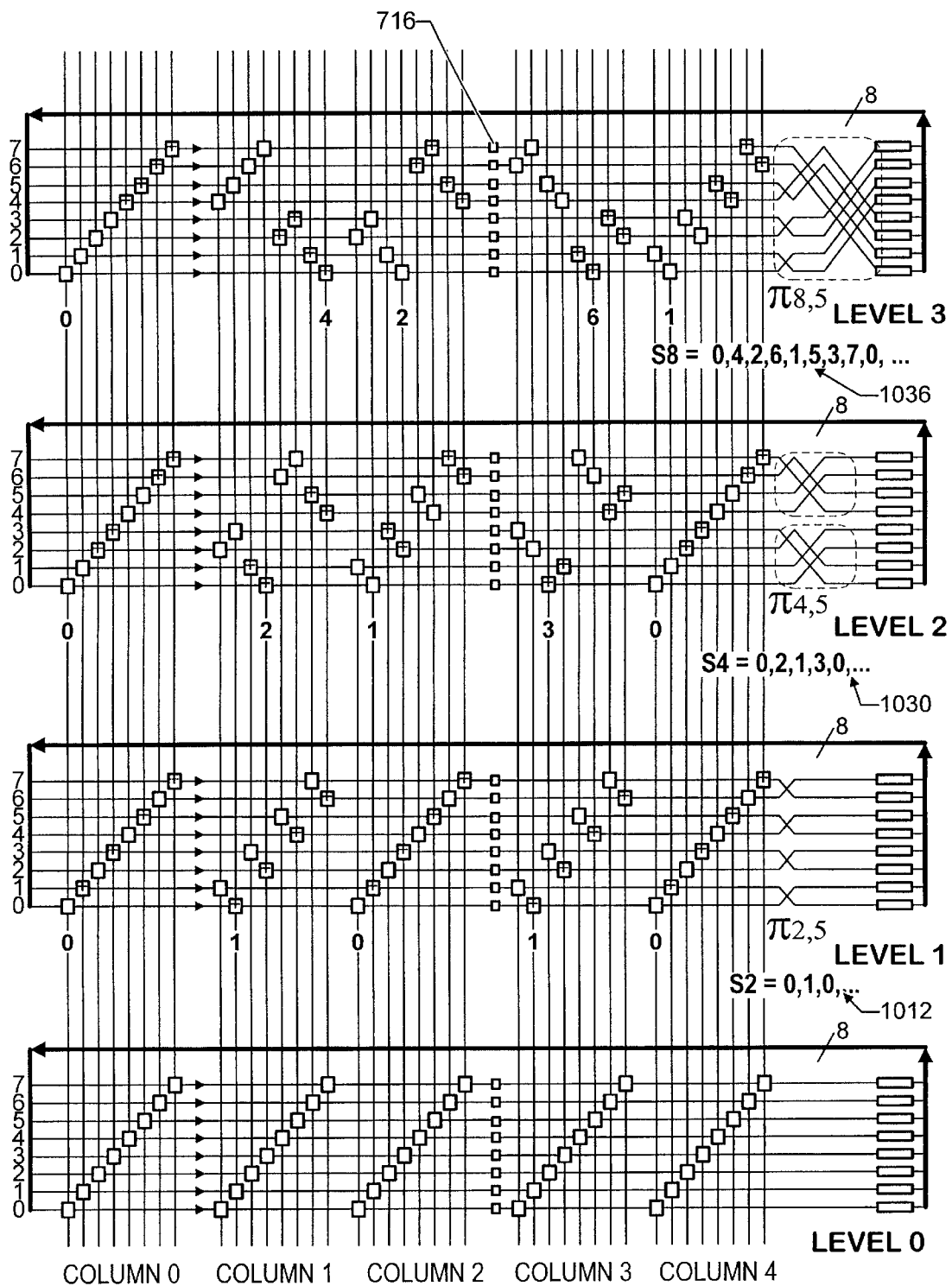
FIG. 4B is a schematic diagram showing an alternative but functionally equivalent topology for an 8-row 5-column interconnect.

FIG. 4B shows the layout of an example of an eight-row, five-column embodiment of the interconnect, which is topologically equivalent to the five-column version of the interconnect embodiment described by FIG. 4A. The layout at each level is the same as the structure shown in FIG. 7C where only one FIFO and no permutation boxes are interposed between columns, allowing space for more control logic on the chip. The effect of a permutation box between columns is equivalently achieved by a special placement of cells in each node array. In particular, the location of a cell is determined by the cells to the west and south. Level 0 and column 0 layouts are described by an identity configuration. Cells at level 0 are placed in an identity configuration, defined as an arrangement on the diagonal from lower left to upper right, as shown. Cells in column 0 are also arranged in the identity configuration at all levels. Remaining node arrays 108 are laid out in left-to-right, bottom-to-top sequence: the cells in the node array at column 1, level 1 are positioned before the node array cells in column 2, level 1, and so on. Level 1 is laid out before level 2, and so on. Cell location is determined by examining the cell on the same row to the west and the cell on the same vertical path to the south, and applying translation sequences for the current cell's level. Translation sequences are discussed in detail for FIG. 10.

At level one, cells on row zero are alternatively positioned over level 0 cells on rows 0,1,0,1 . . . shown as sequence S2 1012. Moreover on each level 1 row, cells are alternatively positioned over rows 0,1,0,1 . . . (mod 2). At level 2, cells on row 0 are alternatively positioned over level 1 cells on rows 0,2,1,3,0 . . . in sequence S4 1030 and moreover, on each level 1 row, cells are alternatively positioned over rows 0,2,1,3,0 . . . (mod 4). At level 3, cells are alternatively positioned over rows 0,4,2,6,1,5,3,7,0 . . . in sequence S8

1036. Referring also to FIG. 4A, a message begins on row 0 and moves to the right while remaining on level 3. The permutation takes the message from row 0 to row 4, then from row 4 to row 2, and from row 2 to row 6, and so forth. The interconnect structures shown in FIG. 4A and FIG. 4B are similarly formed from translation sequences that are obtained by repeated application of a permutation discussed in the U.S. Pat. No. 5,996,020 and U.S. Pat. No. 6,289,021 and are discussed with some generalization hereinafter.

Referring to FIG. 4B all rows have south connections to cells that are defined by translation sequences. A message always alternates over an upper and lower group. A cell that is connected to an upper group is indicated by "+" to illustrate the alternating connection scheme. When a message moves east from the last column, column 4, the message passes through a degree-5 permutation box before circulating west to column 0. The degree-5 permutation box operates to continue the translation sequence Sn, discussed hereinafter.

FIG. 4B describes a method of laying out cells where the inter-level effects of a permutation box between each column are desirably achieved by specially arranging cells within the node arrays, advantageously simplifying integrated circuit chip layout. For an interconnect structure with K columns, a single degree-K permutation box is used at the individual levels, achieving the effect of the omitted permutation boxes for messages that circulate back to the first column. The result is that the layout shown in FIG. 4B is topologically the same as another 8-row 5-column switch with degree-1 permutation boxes between each column.

Figure 5A:
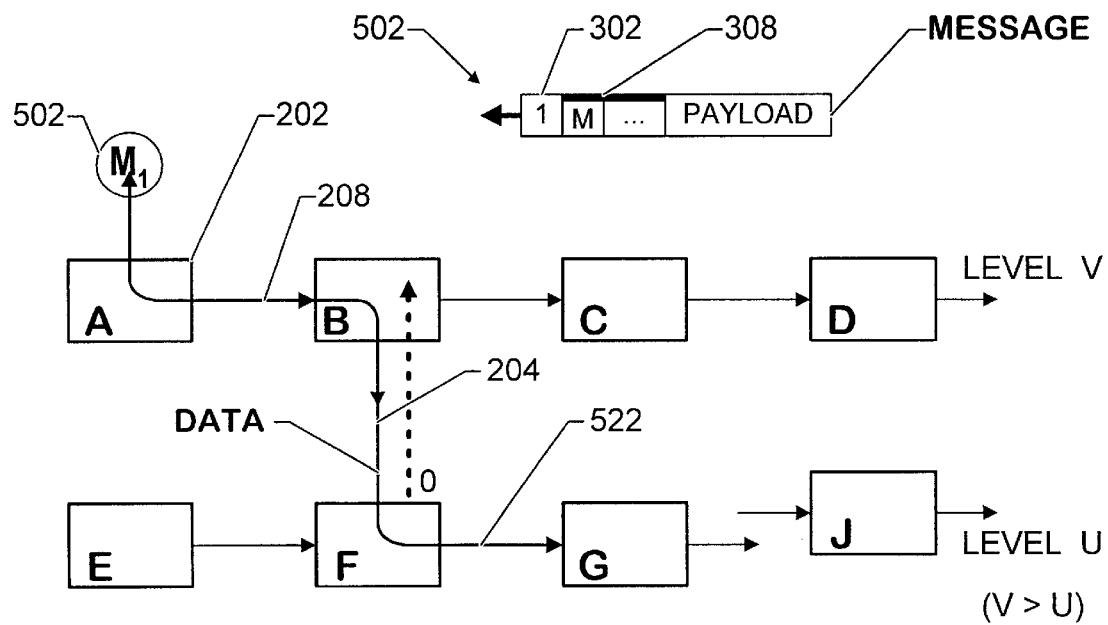
FIG. 5A is a simplified block diagram that shows cells at two levels and four columns to illustrate message wormholing through cells in the two levels.
Figure 5B:
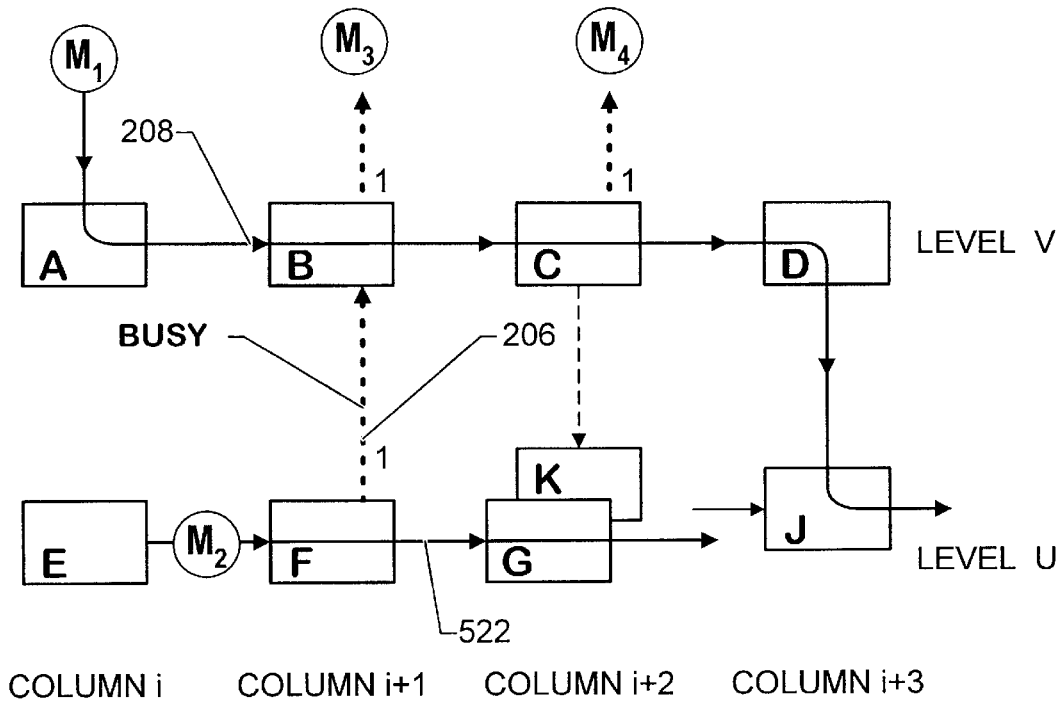
FIG. 5B is a simplified block diagram, also showing cells at two levels and four columns, that depicts message blocking by a control signal from a lower-level cell. Although the message is blocked, the message always has a free path available to continue a wormhole progression through the interconnect via a downward movement at another column.

When two messages at different levels compete for the same horizontal data path 208 the message at the lower level has priority, a logical assignment of precedence since the lower level message probably has been in the interconnect a longer time. A suitable structure for implementing the priority rule is illustrated in FIGS. 5A and 5B. For clarity, only one cell per node array is shown, and any permutation boxes and/or FIFOs that may be located between columns are omitted. FIGS. 5A and 5B show an arrangement of cells, each having two levels and four columns. Cell A is connected to the east to cell B at the next column and same level by row 208.

FIG. 5A illustrates a case where message MI 502 enters cell A from the north. Traffic bit 302 is '1' which indicates that a message is present. When a message enters a cell from the north the message remains at the same level and immediately moves east to the cell at the next column. Therefore, message M1 proceeds east on a row 208 to cell B so that in one time step the message drops down one level and moves right one column. The most-significant bit (MSB) of the header specifies a particular group of lower-level cells. Cell B examines the traffic bit and the MSB, and determines whether a path to the target includes the cell to the south of cell B. Cell B is not blocked from below and sends the message south to cell F. Following a rule for a message entering from the north, message M1 is immediately routed east on row 522 to the next cell, G.

FIG. 5A illustrates the flow of a message M1 which enters a cell from the north and immediately moves east to a cell B at the next column. The header is examined and the message M1 is routed south to F and then east. Message M1 is allowed to drop from cell B to cell F because (1) the MSB of message M1 indicates a connection to the target destination includes cell F, and (2) message M1 is not blocked by another message, that is, row 522 from F is available. This example illustrates the case where a message is allowed to move without delay to the next lower level. Switches are set in cells A, B and F to make a direct connection from above A to G.

Referring to FIG. 5B, in another example the same message $M_1$ enters cell A from the north and is routed east to cell B. Another message, $M_2$ at cell F, has priority over message $M_1$ in two ways: (1) message $M_2$ has priority over message $M_1$ to enter cell G, and (2) message $M_2$ has priority over message $M_1$ in the use of link 522. As message $M_1$ enters cell B message $M_2$ had entered cell F from the west. Cell F routes message $M_2$ east on row 522 to the next cell, G. Because row 522 is immediately occupied with message $M_2$ cell F cannot accept a message from the north, that is, from cell B. To avoid a collision between messages $M_1$ and $M_2$, cell F sends a control signal 206 north to cell B. Cell B is thereby blocked from sending message $M_1$ to the south. Cell B is compelled to likewise send a control signal north, protecting message $M_1$ from a possible collision from above, and to route message $M_1$ east to cell C; a message $M_3$ that might be above cell B is thereby prevented from dropping south. A message moving east at one level passes over connections to cells at the next lower level and a particular connection may or may not include a path that connects to the target. Alternatively stated, a message moving east encounters connections to cells that are in a group having connections to the message target. Whenever no connection is available to the target group the cell sends the message east on the same level. Cell C examines the header of message M1 and determines that the cell to the south is not in the target group. Cell C is thus compelled to route message M1 east to cell D. To prevent a possible collision from above, cell C sends a control signal to the north and a message M4 that might be above cell C is thereby prevented from dropping. At the next column, cell D is connected to a cell, J, that is in the path to the target of message M1, and cell D is not blocked by cell J. Cell D examines current MSB in conjunction with the control signal from cell J and sends message M1 south to cell J. Cells F and J are in the target group of message M1, cell G is not. Cell F was busy but cell J was not, and message $M_1$ is advantageously sent to J, on a path to the message $M_1$ target.

In FIG. 5B the flow of message $M_1$ is described where the message is blocked from moving south by a message $M_2$ concurrently moving directly below message $M_1$. Message $M_1$ remains at the same level and visits cells in two more columns before finding an available connection path. Whenever a message moves east a control signal is always sent north, prohibiting a higher cell from sending a message down that would cause a collision. A desirable effect of the interconnect topology and blocking or busy signaling is that a message entering any cell advantageously always has an exit path to the east and often to the south. A message is always in motion and is never held by buffering or storage during transit through the interconnect. The message never loses the progress toward the target.

Figure 5C:
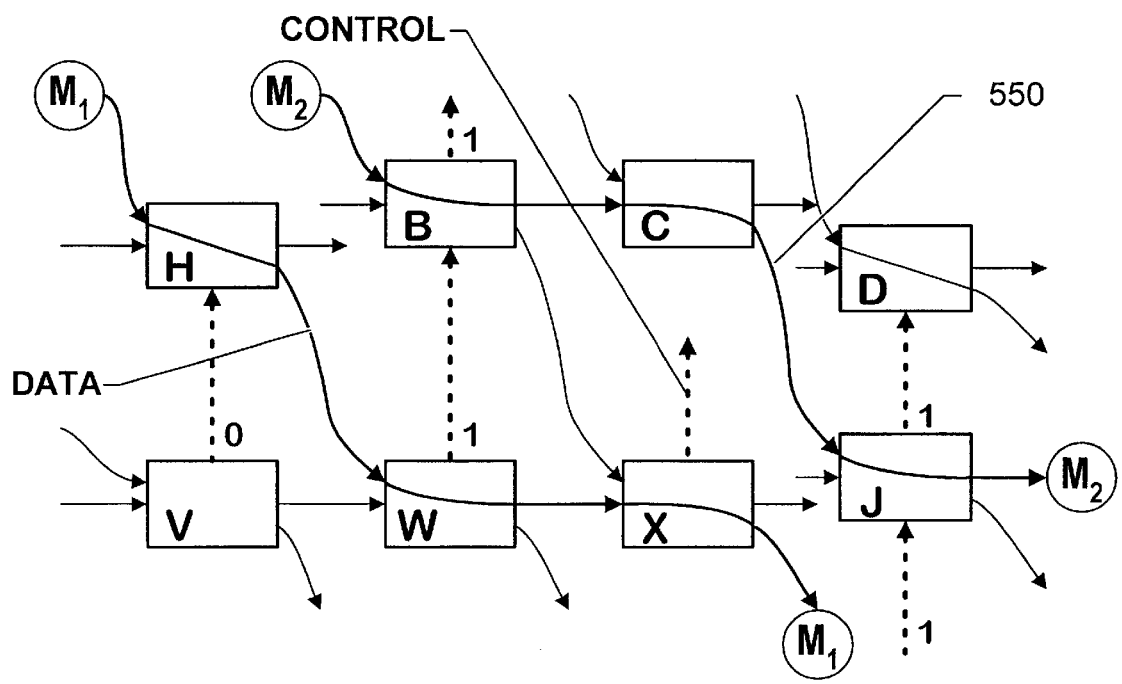
FIG. 5C is a simplified block diagram that shows cells at two levels and four columns using the diagonal topology illustrated in FIG. 1B. Messages wormhole through cells but can be temporarily blocked by a control signal. The interconnection topology of FIG. 5C with a lookahead control signal prevents blocking of a second message when a first message is currently blocked. The second message moves to the next level immediately without blocking.

FIGS. 5A and 5B show pairs of cells at different levels connected vertically at each column. For example, cells B and F compete for access to cell G. FIG. 5C shows a "diagonal" cell interconnect, such as that illustrated in FIGS. 1B and 1C. With diagonal interconnections, data moving to the next lower level moves directly to the cell at the next column rather than passing through the cell directly to the south and then east, as occurs for the horizonal/vertical arrangement. In the example cell F sends a control signal north to cell B to inform cell B that the common target, cell G, will be occupied with a message from cell F. The diagonal interconnection design is topologically similar to the strictly horizontal and vertical layout shown in FIGS. 1A, 5A and 5B. Significant differences are (1) a diagonal metalization path between levels in the diagonal arrangement, (2) absence of switch 618 to prevent an upper-level cell from causing a collision, and (3) a cell has two input terminals from the west and none from the north in the diagonal arrangement.

FIG. 5C illustrates an example of the timing and movement of messages through two rows. Relative timing of messages entering cells proceeds from left to right at each level and from bottom to top at each column of the interconnect. In the example shown by FIG. 5C, the sequence of message arrival is V, H, W, B, X, C, J, and D. Timing is discussed in more detail in conjunction with timing diagrams shown in FIGS. 24A and 24B. In the illustrative example, no message enters cell V so that cell V sends control signal '0', signifying "not busy" to cell H in the level above and the same column as cell V, allowing cell H to send a message to cell W, the common target of cells V and H. Message $M_1$ enters cell H and by that entry is allowed to move diagonally south to cell W. Cell W examines message $M_1$ header and determines that no downward connection exists to the message target; therefore cell W routes the message to cell X at the same level. Because cell X is to be occupied with message $M_1$, cell W sends signal '1', a busy signal, north to cell B, which receives message $M_2$ at the same time. Because of the blocking signal from below, cell B is compelled to send message $M_2$ east to cell C at the same level. Cell B sends signal '1' north to block a cell connected to C from sending a message to cell C. Cell X is not blocked from below and sends message $M_1$ south toward the target. Cell C is not blocked from below and is connected to cell J, which is on a path to the target of message $M_2$. Cell J receives control signal '2' and is compelled to route message $M_2$ to the east.

Cell W thus prevents cell B from sending a message south to cell X. In the next time period, the path from cell X to the east is open and is capable of accommodating a message from cell B. If cell W had a capability to anticipate the future state of cell X, cell W could allow cell B to send a message down. However at the time cell W makes a routing decision, the state of cells at the next column is not available, and cell W blocks cell B.

FIGS. 6A, 6B and 6C show block diagrams of an example of a cell with vertical connections and illustrate routing of messages through the cell. An illustrative cell has a message entry path from the north N, a message entry path from the west W, a message exit path to the east E, a message exit path to the south S, a cell-busy output path to the north BN, and a cell-busy input path from the south BS. More complex cells with a plural number of paths to and from the respective directions are discussed hereinafter. A message $M_2$ entering the cell at node W from the west is either: (1) routed south to the next level, as shown in FIG. 6A, or (2) routed east to the next column, as shown in FIG. 6C. A message from the north 204 is always routed east, as shown in FIGS. 6A and 6B.

A row 208 connects output line E of one cell to input line W of another cell in the next column at the same level. Permutation box 110 and FIFO 112, which may be located between columns and/or levels, are not discussed. Vertical data path 204 connects output line S south to input line N of another cell in the same column at a lower level. Control path 206 connects busy output line BN north to input line BS of a cell in the same column at the next higher level. Delay elements D 604 are one-bit serial registers that store specific message header bits for examination by control logic, and adjust message timing between levels as is discussed in greater detail hereinafter. Each message bit is nominally delayed one clock period while passing through a delay element D. An example of a delay element is a type D flip-flop, or a clocked dynamic or static shift register. The internal control logic of a cell examines the appropriate first bits of an incoming message, the bits being stored momentarily in the delay elements, and the control signal at the appropriate time. The internal control logic then sets internal gates to direct the message to the east or south. Control logic sends state information north on vertical path BN to supply look-ahead information.

In the example shown in FIG. 6A, message $M_2$ enters cell 202 from the west. Cell logic examines a message header 304 and control signal BS and determines that the message is to be routed south on vertical path S 204. In more desirable embodiments, the header address MSB 308 is removed when the message is sent south and the next most-significant bit 326 thereby becomes the MSB at the next lower level. Traffic bit 302 is retained in the header. After removing the MSB, a direct connection 626 between the input line W and the output line S is made, bypassing the two delay elements. The cell is in state 600. The timing of the subsequent message flow is advantageously advanced by one clock period because of the removal of a header bit. This speedup permits messages at the next lower level to proceed ahead of, or earlier than, messages at the level above, desirably permitting cells at the lower level to generate a control signal BN in a timely manner so that the level above may utilize the control signal Timing is discussed in more detail hereinafter.

Since message $M_2$ moves south, output line E is not connected to an input signal from the west but is instead connected to north input line N. State 600 of the cell in FIG. 6A is represented by '0'which is stored in latch 612, a one-bit register. The latch is also used to control the remainder of the message's flow through the cell. Control signal BN is connected to the latch output and sends '0' north to indicate to the cell above that the latter is free to send a message south to input line N. When a message $M_2$ from the west is routed south, another message $M_1$ from the north is permitted to enter the cell and immediately routed east through switch 618 to connect on path 208 to a cell in the next column. No delay occurs in the time of flight of a message moving north to east; in effect, message $M_1$ from the north is directly connected to the next column so that in one time period message $M_1$ moves down one level and to the right one column. A message moving from west to south does not pass through any delay elements. A message moving from west to east passes through two shift-registers 604. A message is never buffered, held, retained or stored at a cell.

In the example of FIG. 6B, there is either no message from the west or the header of the message is invalid. In either of these cases no message is sent south, and the input from the north is connected directly to the east through switch 618. The value '0' is sent north to indicate to the cell above that the cell is allowed to send a message south.

In the example shown in FIG. 6C, message $M_3$ enters cell 202 from the west on line W. The header MSB 308 and control signal from the south are examined by the cell logic. Bit 308 might indicate that the message cannot drop because no path south connects to the message target, or the control signal might indicate that the message is blocked from below. In the example one or both of the conditions are met so the message is routed east to output line E. The cell is in state 640. The value '1' represents the state of the cell in FIG. 6C, which is stored in latch 612. Control signal BN is connected to the latch and sends a logic '1' to the cell above to indicate blocking from sending a message south. The cell to the north defers to the control signal and does not send a message down. Switch 618 connects the output line of the second delay element to the output line to the east and prevents a message from the north from entering the cell. When a message moves from west to east through a cell, the output signal to the south line S is set to '0', which is has the same effect as not sending a message south. A message $M_3$ moving west to east experiences a nominal delay of two clock periods during passage through delay elements.

FIGS. 6A, 6B and 6C indicate states of cell 202. In state 600 a message is present and, according to the header and the absence of a blocking signal, moves south where the message eventually connects to the target. Simultaneously, a message M1 from the north is allowed to use path E to connect directly to the next column. In the situation when no message is present at line W or when the message header is invalid, state 630 is set, which allows a message from the north to use the path to the east. No connection is made from the west to any output line of the cell and no data is sent south. In state 640 a message moves from west to east, nominally experiencing a delay of two clock periods, and no message can enter from the north. Delay elements such as clocked shift registers meter the rate of messages moving west to east. When a message moves south, timing of the message is advanced relative to messages remaining on that level, desirably allowing the lower level cells sufficient time to send control signals to the north in a timely manner.

In other embodiments with faster or slower technology, the number of delay elements may be different from the illustrated embodiments. In all cases, a cell receives control information from lower levels sufficiently early to act on the information. FIG. 6A shows a message M1 connected from the north to the east. The message passes through switch 618 and nominally experiences a delay of zero clock cycles. Message $M_2$ is connected from west to south with the message traffic bit 302 nominally experiencing a delay of one clock cycle. The remainder of message $M_2$ experiences a delay of zero where the actual delay includes the propagation delay of connection-path gates. FIG. 6B similarly shows message $M_1$ connected from north to east and also experiences a delay of zero clock cycles. FIG. 6C shows message M3 630 connected from west to east passing through two delay elements. Message $M_3$ nominally experiences a delay of two clock cycles.

FIGS. 7A through 7F, in conjunction with FIGS. 1A and 1B, show alternative configurations of embodiments of interconnect 100 illustrating different arrangements of three major components at one level of the interconnect. The components include: (1) node arrays 108, (2) permutation boxes 110, and (3) FIFOs 112. The illustrative examples represent a single level of the interconnect. In one embodiment one node array is allocated per column, usually with at least one FIFO array per level, and usually at least one permutation box per level. A permutation box 110 is not used at level 0. The total delay of combined delay elements in each row, including FIFOs and shift registers in the cells, is to be sufficient to accommodate a full message. Accordingly a repeatedly blocked message is to be able to completely reside on one level to circulate until the message is eventually able to move south.

Figure 7A:
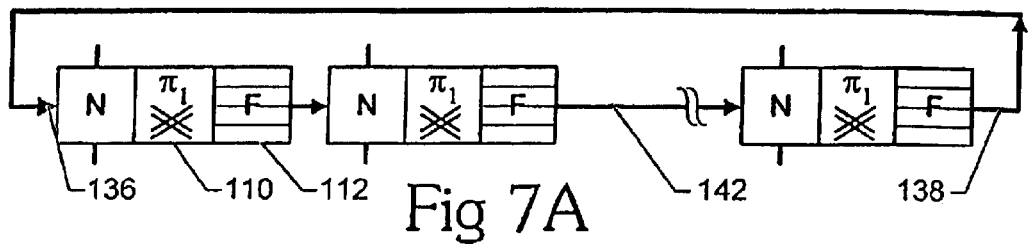
FIGS. 7A through 7F are block diagrams depicting one level of the interconnect structure and illustrating several optional configurations for forming a structure of the level including a variety of node arrays, permutation boxes, and FIFOs. A particular configuration may be more advantageous for one or more of a variety of applications.

FIG. 7A shows a permutation box 110 and a FIFO array 112 at each column immediately follow each node array 108. Most embodiments of interconnect structure 100 advantageously support a wormhole routing capability. The relative sequence of FIFO 112 and permutation box 110 at a column is arbitrary; either may precede or follow. If the length of each FIFO buffer in FIFO array 112 is smaller than the length of message 300 then the message can span a plural number of columns before the message works south to a lower level. A message reaching the right-most column 138 is routed back 702 to the first column 136. A message typically spans multiple levels, even to the extent that the first part of the payload exits interconnect structure 100 prior to the tail entering the interconnect structure.

Figure 7B:
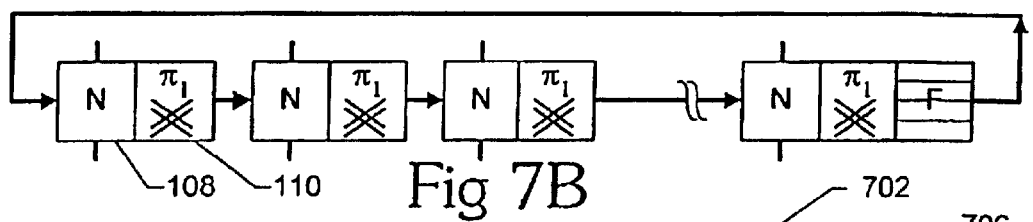
Figure 7C:
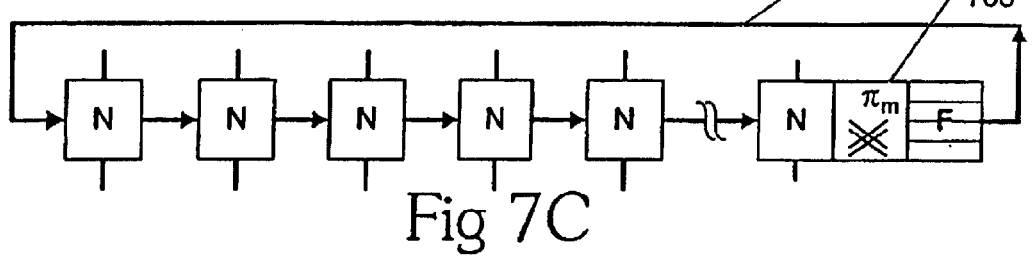

FIG. 7B shows the same sequence of the permutation box 110, FIFO array 112, and node array 108 as FIGS. 1A and 1B, and is similar to FIG. 7A except that only one FIFO array is included at each level. FIFOs and the shift registers in all cells on a row are adequately large to accommodate a full message. One FIFO is positioned on each row 208 and all FIFOs have the same length. A permutation box is omitted between columns, as shown in FIG. 4B and 7C, and only a single, degree-M permutation box 706 is included.

Figure 7D:
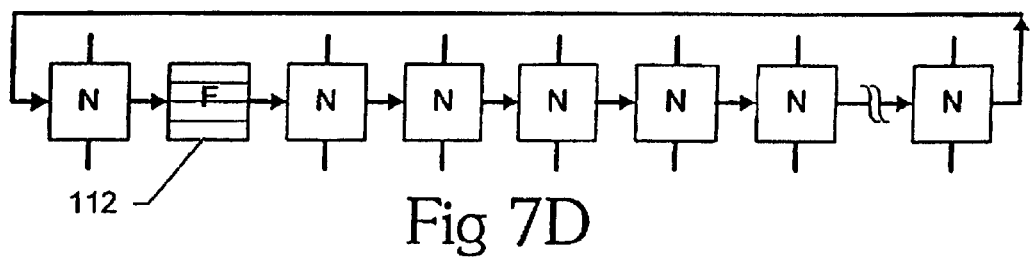
Figure 7E:
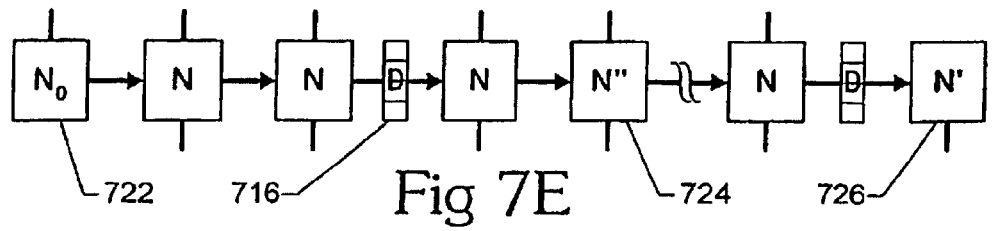

FIG. 7D is a layout for use when the number of columns is sufficiently large that a permutation box is not needed. A FIFO is placed in a location with expected low traffic. FIG. 7E shows a layout suitable for use where the traffic density is low, such as when only one column is used for input and an adequate number of output ports are available to handle expected traffic loads. The layout does not have a return path from right to left. Messages that enter from the north are assumed to drop to a lower level before the right-most column 726 is reached. Messages reaching the right-most node array N' 726 are sent south to a cell in node array N" 724 which does not accept the message if no output path is available for the message from the north. Messages entering the left-most cells $N_0$ 722 do not compete with messages from the west and therefore move immediately to the next column. Referring also to FIG. 6A and 6C, the cells in $N_0$ include only a direct connection from north to east, and the cells in N' include a direct connection from west to south, advantageously omitting control logic. Cells in N" utilize switch 618 to reject a message from the north when another message with priority is sent east.

In the normal operation of a cell, a message that is routed south bypasses the cell's delay elements, for example shift registers, and experiences a propagation delay based on the number of the gates in the path. Messages that are successively routed south through a plural number of cells may accumulate a propagation delay that can adversely affect the proper operation of the control logic at lower levels. A delay element 716, such as a one-bit shift register, is placed on each row to re-align the timing, the leading edge, of message bits that have experienced different cumulative delays. After exiting the delay element all messages enter the next array with the same timing. The delay element is nominally placed after every two to five columns, depending on the ratio of propagation delay to the clock period. FIG. 24B illustrates an alternative method of handling propagation delay.

Figure 7F:
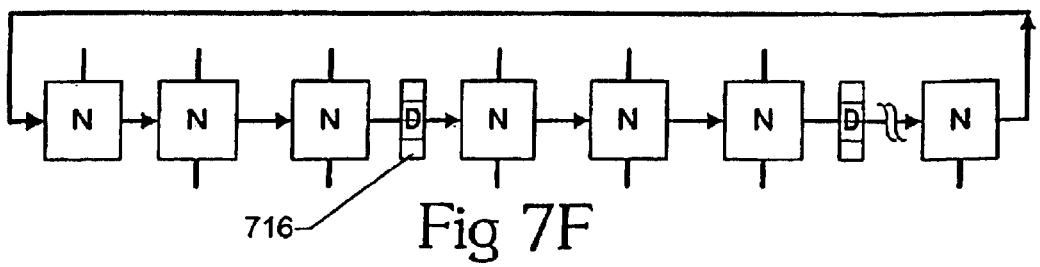

When the number of columns K is very large sufficient storage can be available among the cells along a row to fully contain a message so that a FIFO is not needed or used, as is shown in the embodiment of FIG. 7F. No permutation box is used or required when $K=2^N$ and N is greater than the number of levels of the interconnect. Typically all levels have the same configuration except when the layout shown in FIG. 7E is used. Level 0 has the same configuration as the other levels, but does not have a permutation box. The examples depict various embodiments. Other configurations that follow the general specification discussed hereinabove are acceptable and may have particular advantages in satisfying particular performance and implementation requirements of an interconnect structure or network.

Figure 8A:
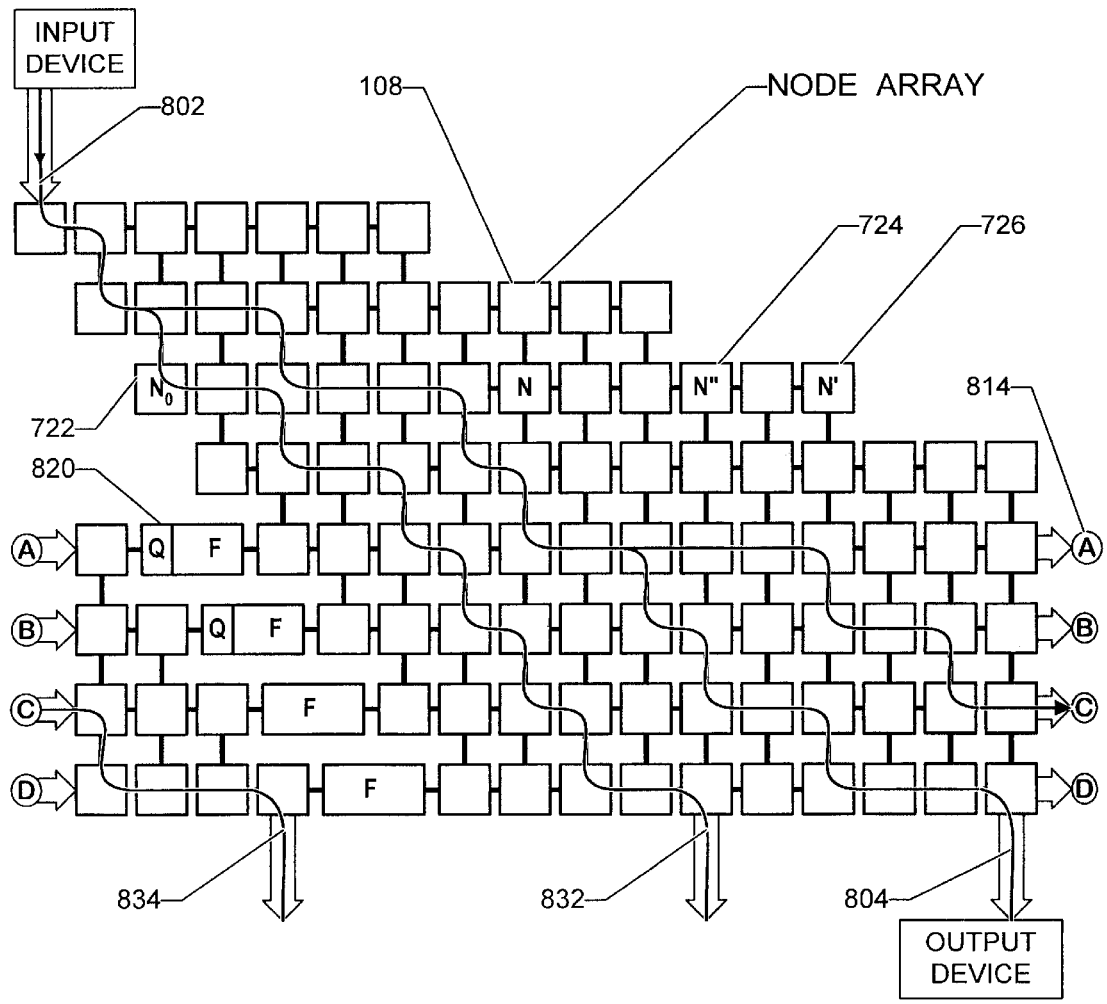
FIG. 8A is a schematic block diagram illustrating a "stair step" embodiment of the interconnect structure that efficiently uses available silicon. A line that originates from an input device, bifurcates within the interconnect structure, and exits the interconnect structure from two target output nodes illustrates the operation of an example of a wormhole flow of messages.

FIG. 8A is a highly suitable embodiment of interconnect structure 100 that is referred to as a "cascade interconnect." Messages enter the top at one column, move in steps with each step directed either downward or to the right, the rightward steps being taken when the message is blocked from moving downward. The messages are collected at a bottom level. Some messages, such as messages competing for the same output terminal, may be deflected into FIFOs and circulate from the right back to the left 814 at the rightmost column of a level. Simulations show that if only one column is used to receive input messages and two or three columns are used to output messages, messages at the top levels always drop within a few columns. The most suitable layout: (1) has a single input column 802, (2) advantageously has fewer columns (node arrays) at top levels, (3) positions FIFOs 112 to reduce the likelihood that messages enter the FIFOs 112 (4) uses 2-cell nodes to move messages rapidly downward, and (5) optionally uses output queues 810 to accommodate bursty traffic. FIFOs are eliminated at upper levels since under a wide range of conditions messages would never enter FIFOs positioned at the upper levels. FIFOs are therefore positioned to the left of the most direct path downward.

Most suitably the number of rows at the top level is equal to the number of input ports. The number of output ports is equal to or greater than the number of input ports so that multiple output columns advantageously drain messages from the interconnect. The number of I/O pins is a limiting factor for a chip design therefore a maximum amount of silicon is used to implement as many node arrays as possible. Two-cell nodes are used so that an unblocked message always has a path down at the next column. An unblocked message advantageously makes a "45-degree" diagonal path from the upper left of the interconnect. The FIFOs are most suitably located immediately to the left of this diagonal, as shown in FIG. 8A.

In normal traffic, messages typically move only a few columns to the right of the diagonal path. The combined movement of all messages is a cascade-like flow. Some messages experience few deflections and move in a path close to the diagonal. Other messages experience more deflections and arrive at the bottom further to the right. Output columns are most suitably located a few columns to the right of the diagonal to desirably gather a major portion of the messages. An output column 834 may be placed immediately to the left of the bottom-level FIFO 112 to advantageously gather messages before entering a FIFO. If the output device at column 834 is never busy the bottom level FIFO can be omitted.

Simulations show that the total number of internal columns should be about 1.5 to 2 times the number of levels. For example, a 128-row interconnect would have 7 levels and should have 12 to 15 columns in total. Because messages are less likely to be blocked at top levels, a message is unlikely to ever traverse all columns at the top level. Thus node arrays are not needed at all columns to the right of the input. FIFOs and node arrays are advantageously omitted at the top levels, reducing the amount of silicon.

Some embodiments of the cascade interconnect layout can have multiple output columns for each row, as shown in FIG. 8A, giving multiple exit paths for messages directed to the same target. If the receiving device can handle multiple messages at one time, for example by buffering, the likelihood that a message is blocked externally is further reduced. An alternate embodiment has a queue of output buffers and one output port per address, desirably reducing the total number of I/O ports.

Figure 8B:
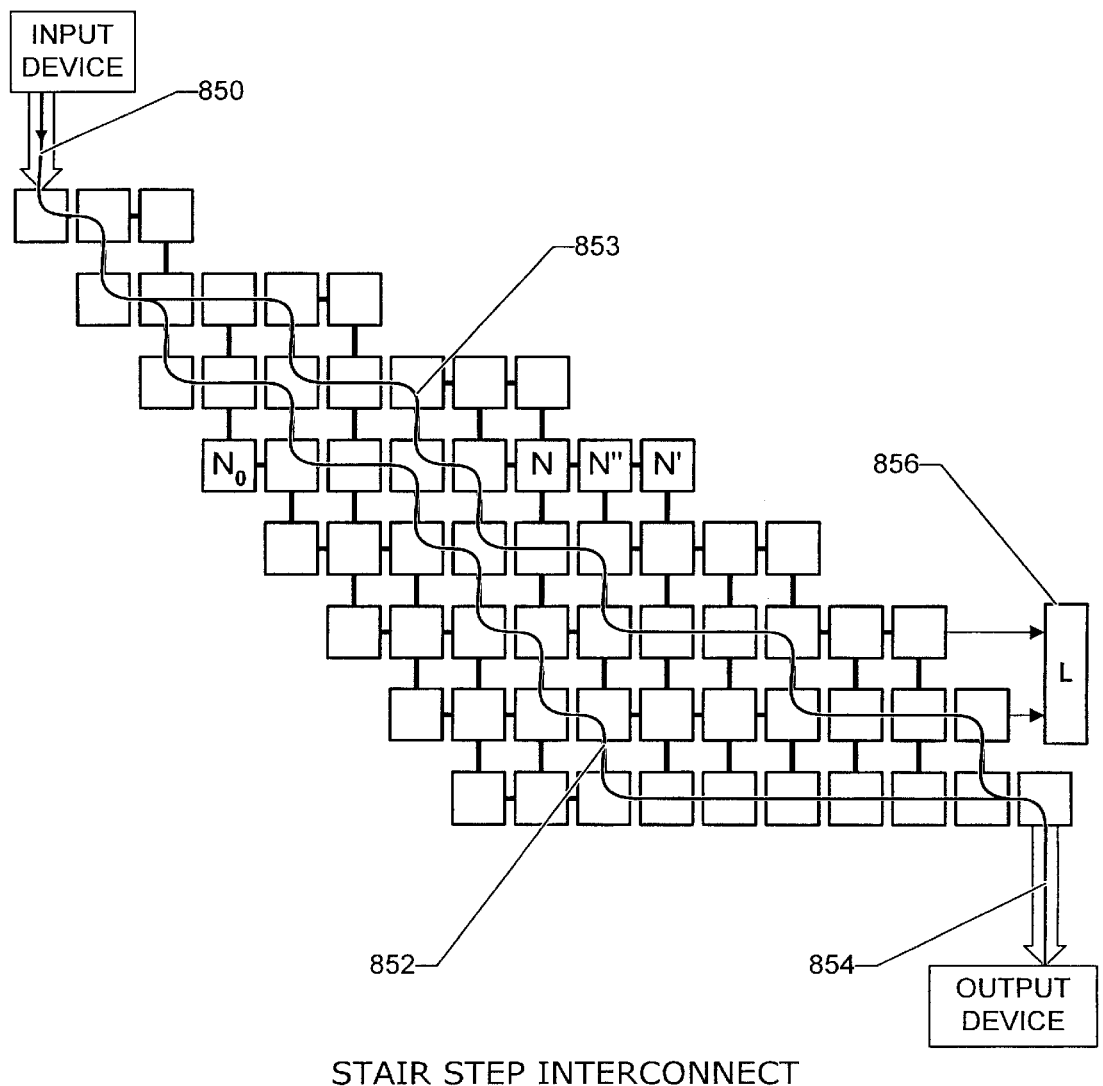
FIG. 8B is a schematic diagram showing a stair-step interconnect structure.
Figure 8C:
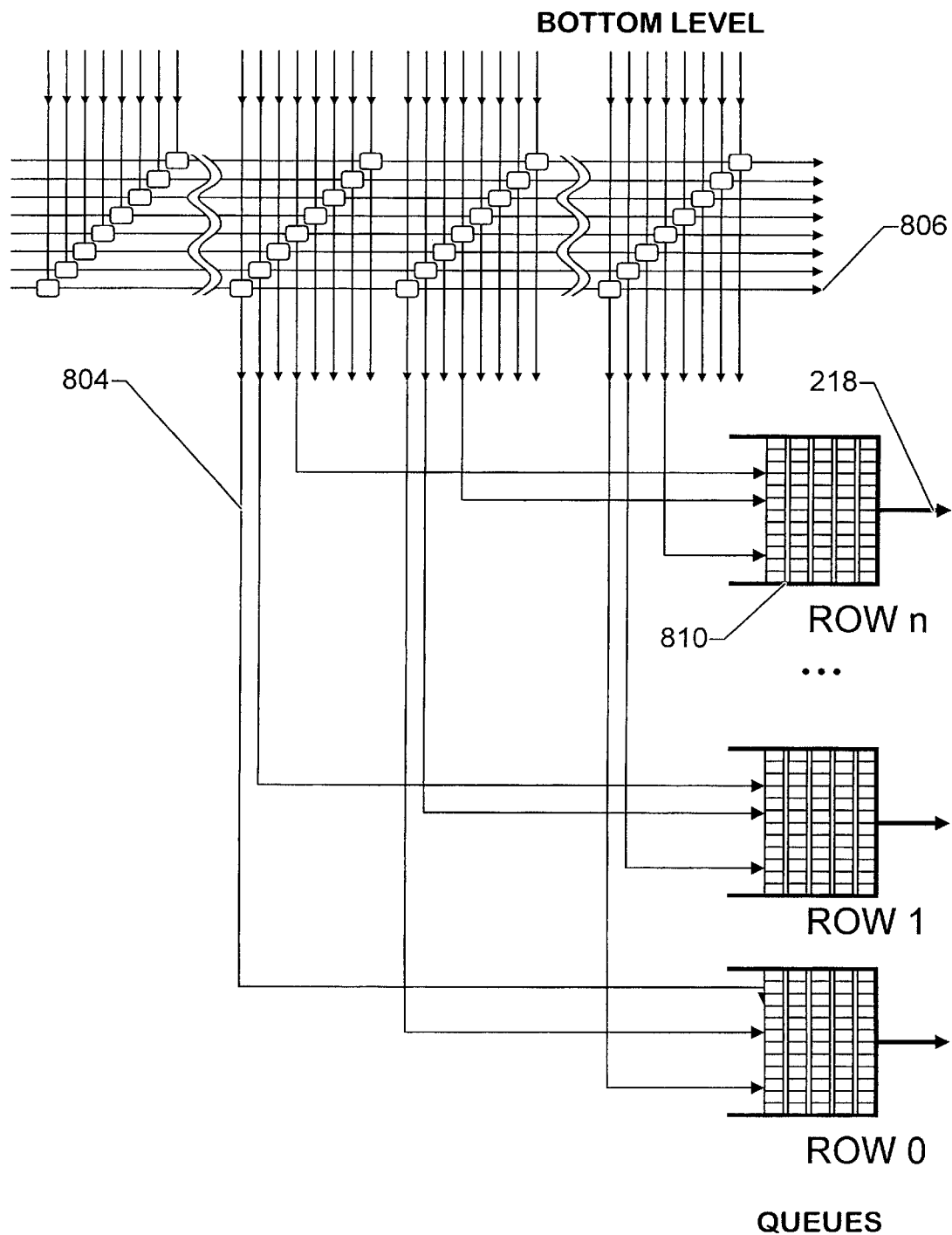
FIG. 8C is a simplified block diagram illustrating on-chip output queues that reduce the number of output connections while maintaining throughput under bursty traffic conditions. Cells at multiple columns on a bottom row supply a queue.

Referring to FIG. 8C, on-chip output queues 810 accept messages from multiple columns at the bottom level 804. One queue is allocated for each target address and each buffer in the queue holds one message. A message reaching the bottom level immediately exits the interconnect if the queue is empty, or is routed to an empty slot 812 in queue. If the queue is full the message remains on the bottom-level row and attempts to enter the queue at other columns. Messages are drained from the queue through output port 218. In some embodiments the queue accepts a control signal from an external output device, indicating when the device cannot accept data.

An ATM cell has a "quality of service" (QOS) bit that indicates whether the cell may be discarded under busy conditions. FIG. 3B shows a message with QOS field 332 for use within the interconnect. When the interconnect is not busy very few messages enter a FIFO. During busy conditions a message may be repeatedly blocked and forced circulate at one level where the message eventually enters a FIFO. In one embodiment the QOS field is examined when a message enters a FIFO. The message may be discarded if the interconnect is busy.

In the simplest case the QOS field is a single bit, such as the QOS field used in ATM cells, and the message is discarded when entering a FIFO if the bit is set. In another embodiment the QOS field is incremented/decremented when a message enters a FIFO, indicating the total number of times the message has circulated. When a certain value, for example zero, is reached the message is discarded. Messages entering the interconnect can have different initial QOS settings so that a wide range of priorities among messages is desirably supported. The QOS processing is most suitably performed at some lower levels when a message enters a FIFO at Q 820.

The cascade interconnect embodiment shown in FIG. 8A is a highly suitable design that exploits a single clock signal for all input ports, the reduced latency of two-cell nodes, low traffic density at top levels, and a cascade-like flow where messages are unlikely to enter FIFOs. One column is used to input messages and more than one for outputting messages. Simulations of a structure with 128 input terminals, 384 output terminals with three output ports per address, seven levels, 15 internal columns, and Monte Carlo distribution of traffic, shows that a message encounters about 10 cells on average while wormholing through the interconnect structure. In an alternate embodiment with 512 I/O ports, arranged as 256 input ports and 256 output ports, eight levels, 15 internal columns, but using output buffers shown in FIG. 8C, a message encounters about 20 cells before entering a buffer. Output buffers are used to smooth fluctuations in traffic. The use of on-chip buffers yields twice the number of input and output ports from the same pin count.

FIG. 8B is a schematic diagram showing a stair-step interconnect structure. The stair-step interconnect structure has only one input column, only one output column, no connections back from right to left, and no FIFOs. A property of some embodiments of interconnect 100 is that when no output port is sent more than one message during the same cycle then all messages establish wormhole connection paths from the input port to the output port. Stated differently, when no more than one input port sends a message to a given address, all messages wormhole to respective output ports without being deflected to the left. An advantageous consequence is that FIFOs are not needed and all messages reach the output port at the same time. The interconnect structure is referred to as a "stairstep interconnect." Messages enter at the left-most column 850 at the top level, spread to a small degree as the messages approach the bottom level, move horizontally at the bottom to the output port at the right-most column 854, and never recirculate. Two examples of the many possible paths that a message may take through the interconnect structure are shown as bold lines. For example, line 852 illustrates a message that rapidly steps down to the bottom level. Line 853 shows a message that is deflected to the right relatively more often before finally reaching the bottom. The stairstep interconnect shown in FIG. 8B is most suitable when messages have no duplicate output addresses during one cycle. The stairstep interconnect uses no FIFOs and fewer node arrays than a cascade interconnect of similar capacity. One suitable design rule is that the top level has at least three columns, and the total number of columns should be about 2.0 times the number of levels. The example in FIG. 8B has 8 levels and 17 columns, and follows the design rule.

In an application where the no-duplicate rule is occasionally violated, such that two or more messages are sent to the same address, then only one of the messages will be successful. The other unsuccessful messages advantageously do not prevent the successful message from reaching the target output port. The unsuccessful messages are deflected into the right-most nodes at lower levels for gathering by collection device L 856 for further processing.

In an alternate embodiment of the stairstep interconnect, multicasting of messages is supported by the use of multiple headers for a single payload. Multicasting occurs when a payload from a single input port is sent to multiple output ports during one time cycle. Each header specifies the target address for the payload, and the address can be any output port. The rule that no output port can receive a message from more than one input port during the same cycle is still observed. The first header is processed as described hereinbefore and the control logic sets an internal latch which directs the flow of the subsequent payload. Immediately following the first header, a second header follows the path of the first header until reaching a cell where the address bits determinative of the route for that level are different. Here the second header is routed in a different direction than the first. An additional latch in the cell represents and controls a bifurcated flow out of the cell. Stated differently, the second header follows the first header until the address indicates a different direction and the cell makes connections such that subsequent traffic exits the cell in both directions. Similarly, a third header follows the path established by the first two until the header bit determinative for the level indicates branching in a different direction. When a header moves left to right through a cell, the header always sends a busy signal upward indicating an inability to receive a message from above.

The rule is always followed for the first, second, and any other headers. Stated differently, when a cell sends a busy signal to upward then the control signal is maintained until all headers are processed, preventing a second header from attempting to use the path established by a first header. The number of headers permitted is a function of timing signals, which can be external to the chip. The multicasting embodiment of the stairstep interconnect can accommodate messages with one, two, three or more headers at different times under control of an external timing signal. Messages that are not multicast have only a single header followed by an empty header, for example all zeros, in the place of the second and third headers. Once all the headers in a cycle are processed the payload immediately follows the last header, as discussed hereinabove.

The stairstep interconnect advantageously functions as a self-wiring crossbar. The message headers generate latched input-to-output connections that desirably transmit payloads from all input ports to all output ports in parallel. The internal complexity and control of a crossbar scales as $N^2$, whereas the stairstep interconnect advantageously scales as. $N \cdot \log_2(N)$. In the example of a switch with 256 ports the crossbar has on the order of 64K internal switches that must be set by an external processor, whereas the self-wiring stairstep interconnect has on the order of $256 \times 8^2$, or 16K cells.

In the embodiment shown in FIGS. 8A and 8B only one column is used for an input port and messages from a plurality of input ports may each be addressed to the same output during one time period. The plurality of input ports can be accommodated by an embodiment having a plural number of output columns where the ratio of output ports versus input port is greater than one. However the use of a single output column, as opposed to a plurality, may be preferable because the total number of output connections, I/O ports on a chip, can be reduced. A single output column may desirably satisfy a fluctuating output condition by advantageously using FIFOs within the interconnect as buffers that are shared among output ports. In other traffic conditions, rows at bottom levels may fill with messages destined for the same output port. The messages can block other messages headed to nearby ports. FIG. 8C shows an embodiment that uses an on-chip queue 810 for each output port 218. When a message arrives at a bottom level row 806 the message is immediately sent to the lowest available slot 812 in the queue. If the queue is empty the message immediately exits through the output port. If the queue is full, the message remains on the bottom level row and makes additional attempts to enter the queue at other columns that are connected to the queue.

Each queue 810 is connected externally to a single output port 218, desirably minimizing the total number of I/O pins and reducing the amount of blocking within the network. Simulations of interconnects ranging in size from 64 to 16,384 output ports show that a depth of three to ten buffers per queue is adequate to accommodate most output rate fluctuations and keep bottom levels desirably uncongested. Messages are removed from the queue in a FIFO basis. When a message is repeatedly blocked within the interconnect, the message may take longer to reach the bottom level than another message that entered the interconnect at a later time. A consequence is that a sequence of messages sent to the same output port might exit out of sequence. In an alternative embodiment, positions in the queue are filled on a time stamp basis or by a sequence number in the message header. The queue is emptied in a "round robin" fashion, thereby desirably preserving an ordered sequence of arrival and exit.

In a two-speed embodiment of the interconnect a message enters an empty slot 812 in the queue at a clock speed compatible with the bottom level row 806 and exits through output 218 at a different clock rate, usually much slower. Alternatively stated, a slot in the queue is filled at a high rate and is emptied at a different rate that is compatible with the external output device. An application, such as a video-on-demand switch, accepts packets or messages into the switch at a high bit rate and distributes the messages at a slower rate. A smaller number of high-speed input ports advantageously supports a much larger number of output ports. FIG. 36B shows an input configuration where a relatively small number of top-level rows have input connections, a suitable configuration for the two-speed embodiment.

The interconnect network includes a plurality of levels with each level including a plurality of groups of cells. FIG.

9 illustrates six cell groups: U, V, W, X, Y and Z. Group U 902 is on the uppermost level of the three levels. Data can enter certain cells in group U through the lines marked IN. The lines may be connected to higher levels or may receive data from sources outside the network. Data leaves groups X, Y and Z through lines marked OUT 910. The lines may be connected to groups on lower levels or may be output ports of the interconnect. Groups V and W are on a level below the level of group U, and groups X, Y and Z or on a still lower level. Each group contains one or more data paths, each path organized into a loop or ring. Cell A 904 in group U is connected to other cells B, C, D, E and so on. In some embodiments where the message length is long in comparison to the number of cells, a FIFO is included in the loop so that a full message can fit within a level. A message circulating in a data loop 924 has multiple opportunities to move downward to cells in groups at a lower level, such as from group U to V, W, X, Y and Z. A message entering cell B has the opportunity to drop down to cell J in group V. Alternatively, if the message moves from cell B to cell C the message has an opportunity to drop to a cell in group W. In some embodiment groups V and W are upper and lower groups, respectively.

A message entering cell B may move downward on connection 912 to cell J to the lower level whenever cell J is located on a path that connects cell B with the message target port. Cell L is also connected to cell J; and if another message in the same time interval moves from cell L to cell J, then cell L at the lower level has priority over cell B to send a message to cell J. Priority is signaled by cell L sending a control signal 914 to cell B above, informing cell B not to send a message down. In some embodiments, switch 922 on downward path 912 is also opened by control signal 914, preventing any message from the signaled cell colliding with a message on shared path 918. Switch 922 advantageously prevents a collision of messages when an external device, such as input port 908, fails to honor the control signal. In some embodiments the downward path 940 skips one or more levels.

All cells have an exit path 918 to another cell, or to a FIFO, in a group of cells, and all cells have a direct 912 or indirect (not shown) control signal connection to one or more other cells that share a common path. If a cell does not send a message downward, the cell sends the message on a path 918 to another cell in the same group. A significant advantage of message routing that utilizes control signals is that an exit path is always available from the cell. A message is never buffered, stored, held or retained at a cell; and is always in motion passing through a cell. Additionally, a message remaining at a level does not lose the progress currently achieved in moving toward the message target. Otherwise stated, the message does not move further from the target when the message remains in a current group. The message rapidly encounters other cells in the current group that are connected to a lower group which are on a path to the message target.

Figure 9:
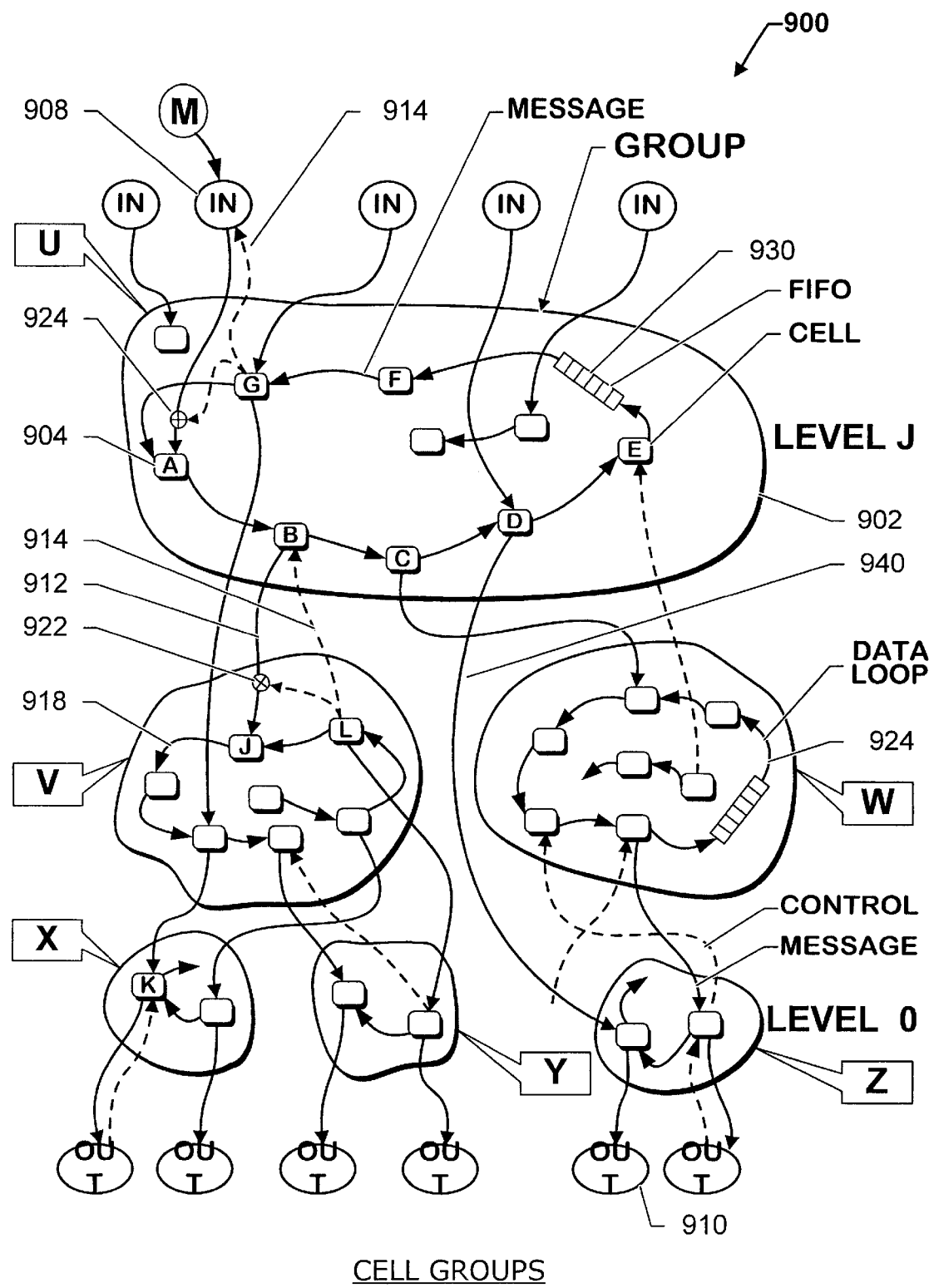
FIG. 9 is an abstract diagram showing relationships of cells, rows, signal paths, levels and groups. Multiple data paths extend from any input terminal or device to any output terminal or device.

Referring also to FIG. 2A, a data loop 924 corresponds to one or more rows 208 at the same level, link 912 to vertical data path 210, link 918 to a connection between columns, and control signal 914 to vertical signal path 206. In some embodiments of the interconnect the set of all groups form a collection of binary tree-like connection paths from any input port to any output port. Referring to FIG. 9, many paths exist from any input port to any output port.

A message M passes through a plurality of interconnected cells arranged in a hierarchy of J+1 levels arranged from the highest level, level J, to the lowest level, level 0. The interconnect structure transmits a plurality of unsorted, multiple-bit messages entering the interconnect structure through a plurality of input ports. An individual message M of the plurality of messages is self-routing and moves through cells using wormhole routing in which only a portion of the multiple bits of the message are in transit between two cells, the multiple-bit message extending among multiple cells. The individual message M moves in a plurality of ways including four ways which are sufficient for the message M to exit the interconnect structure through an output port designated by the header. The four ways are: (1) the message M enters a cell from an external device, the message M designating one or more output ports 910; (2) the message M moves through a cell A 904 in the interconnect structure without buffering to a designated output port; (3) the message M moves through cell L without buffering to a different cell J at the same level; and (4) the message M moves through cell B without buffering to a cell at a level nearer to the destination.

Figure 10:
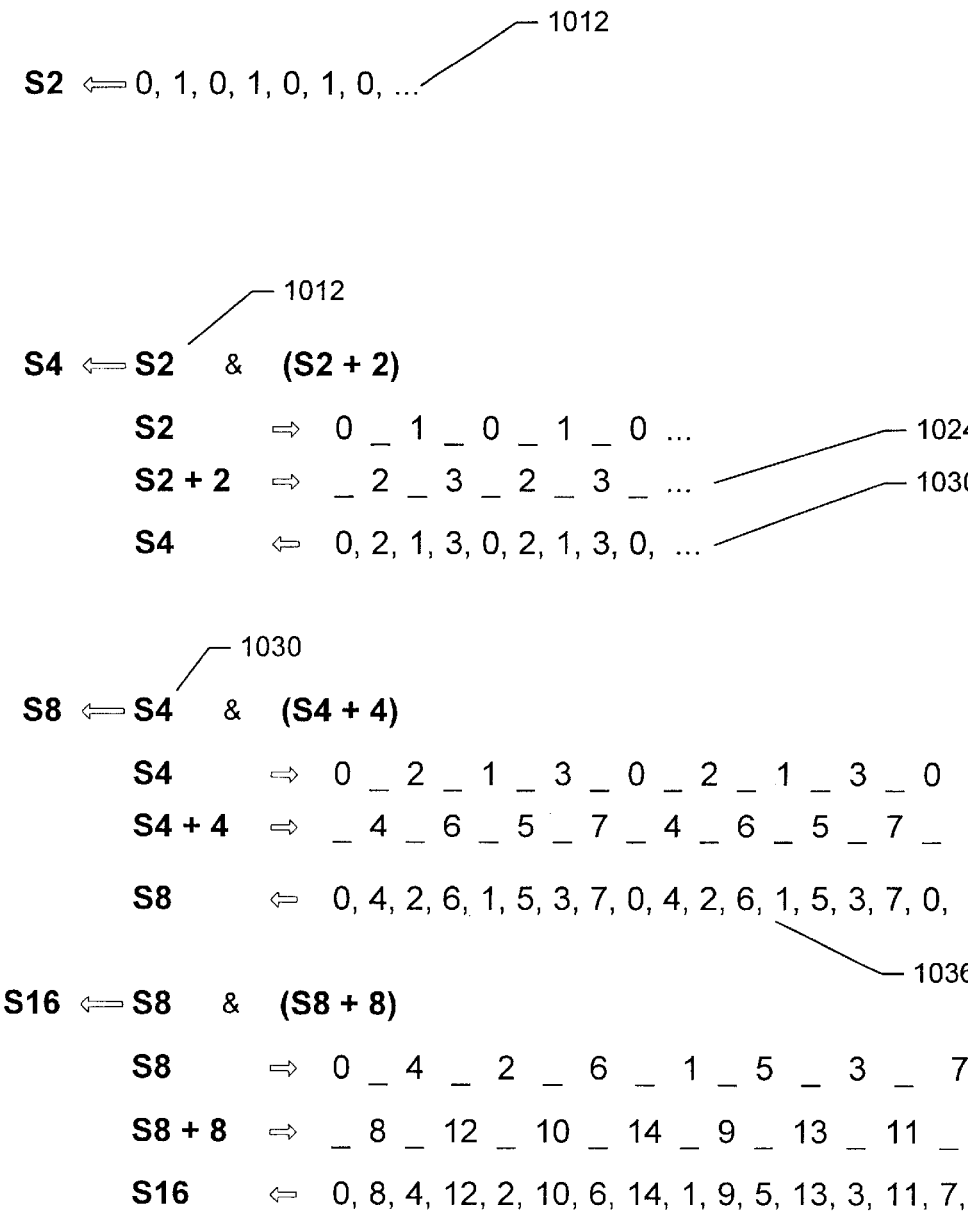
FIG. 10 is a table illustrating operations for generating numeric sequences that define permutation box layouts.

FIG. 10 is a tabular diagram that depicts a method for producing translation sequences, a first act in the operation of generating permutation box layouts. A simplest sequence, S2, is an alternating transition between two rows, which is stated numerically as 0,1,0. Translation sequences that are a power of two are constructed from the translation sequences S2, S4, S8, S16, and so on. Translation sequence S4 1030 is generated from two sequences, a first sequence S2 and a second sequence S2 incremented by 2 1024. The first translation sequence 0,1,0 is written with a blank after each value. The sequence. S2+2 is inserted at every blank position, yielding sequence S4, which is 0,2,1,3,0. Translation sequence S8 1036 is derived from sequences S4 and S4 incremented by 4, which yields the translation sequence 0,4,2,6,1,5,3,7,0. Similarly, translation sequence S16 is generated from sequences S8 and S8 incremented by 8, yielding a translational sequence 0,8,4,12,2,10,6,4,1,9,5,13,3,11,7, 15,0. When subscript R is a power of 2, the translation sequence $S_R$ is preferably generated by continuing to apply the increment and-merge method described here and shown in FIG. 10, until the desired value R is reached. These sequences are referred to as grand-tour sequences.

Translation sequence S4 is given as 0, 2, 1, 3, 0, 2 . . . Using 0-origin notation, the expression S4[i] refers to the $i^{th}$ value in the translation sequence. For example, S4[0]=0, S4[1]=2, for example. Note that translation sequence S4 repeats after four elements, that is, S4[i]=S4[i+4]. In general, a translation sequence Sn repeats after n elements, that is, Sn[i]=Sn[i+n], where i is a non-negative integer.

The terms "lower group" and "upper group" are defined here for subsequent use. A lower group includes the cells on all rows that are located in the lower half of the range of numbers in a translation sequence Sn, and a upper group includes all rows that are located in the upper half. For example, given translation sequence S2 (0, 1, 0, 1, 0 . . . ), row 0 is in the lower group and row 1 is in upper group. For translation sequence S4 (0, 2, 1, 3, 0 . . . ), rows 0 and 1 are in the lower group and rows 2 and 3 are in the upper group. In the example of the incremented translation sequence S4+4 (4, 6, 5, 7, 4 . . . ), rows 4 and 5 are in the lower group and rows 6 and 7 are in the upper group. In general, the definition of "upper" and "lower" when pertaining to a group may be determined from the binary representation of the row number, R, and the level, J, where the row is located. The rows are represented in binary form by the bits $R_L, R_{L-1}, R_{L-2} \ldots R_2, R_1, R_0$, where $R_i$ is either 0 or 1. At level J, row R is defined to be an upper row when $R_J=1$, and is a lower row when $R_J=0$. In an example of eight rows the transitions are described using binary notation, as follows:

At level 0 (J=0) rows 000, 010, 100 and 110 are in the lower group, and 001, 011, 101 and 111 are in the upper group (R0 is the right-most bit), At level 1 (J=1) rows 000, 001,100 and 101 are in the lower group, and 010, 010, 011 and 111 are in the upper group (R1 is the middle bit), and At level 2 (J=2) rows 000, 001 010 and 011 are in the lower group, and 100, 101, 110 and 111 are in the upper group (R2 is the left-most bit).

A desirable consequence of this method for creating a message translation sequence is that alternate positions are successively below and above the translation-sequence midpoint. For example, in the eight-row translation sequence S8 (0,4,2,6,1,5,3,7,0), values in the first set of alternating positions (0,2,1,3,0) are all less than the values of the second set (4,6,5,7,4). Thus a message following the path defined by sequence S8 always alternates between the lower and the upper groups, then repeats, a consistent consequence for all translation sequences generated by the method. An additional advantageous consequence of the translation sequences is that if messages $M_1$ and $M_2$ remain on respective same levels, message $M_2$ will not again be in position to block message $M_1$ until both messages have moved through $2^J$ columns, where J is the level of message $M_1$. In a specific example, if message $M_1$ is at level 5 blocked by message $M_2$ at level 4 then message $M_1$ and message $M_2$ must each be blocked 32 ($2^5$) times by other messages, a highly unlikely event, before messages $M_1$ and $M_2$ are again aligned. Thus, the illustrative structure avoids extended blocking of messages.

A message entering the top level of the interconnect alternates between connections down to rows that are in the upper half of the range of rows (upper group) and the lower half (lower group). When a message reaches a top-level cell that has a connection south to the target, the message drops to the next lower level where the range is reduced to one-half of the total number of rows. For example, if the interconnect has 16 rows at each level, a message entering the top level alternates between the upper eight row numbers and the lower eight row numbers, that is between the upper group and the lower group. The MSB is used to make the determination. At the next level the message alternates between groups of four rows each, and at the next lower level the message alternates between groups of two rows each. The size of the groups at each level starting at a 16-row interconnect is 8, then 4, then 2, and finally 1, where the message has reached the target row specified in the header and the message exits the interconnect.

Figure 11A:
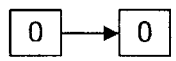
FIGS. 11A through 11H are detailed diagrams showing permutation boxes that determine row-to-row connection paths for messages moving to the next column. The operations of the permutation boxes are based on the translation sequences shown in FIG. 10.
Figure 11B:
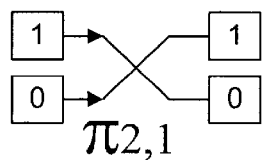
Figure 11C:
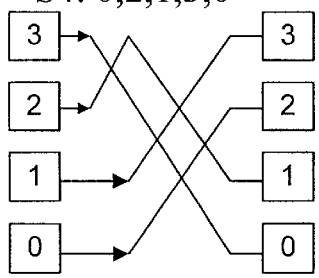
Figure 11D:
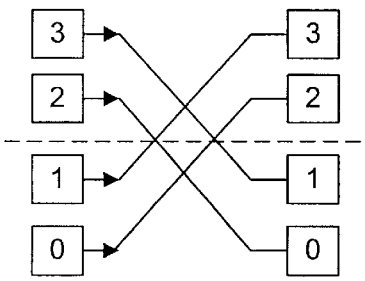
Figure 11E:
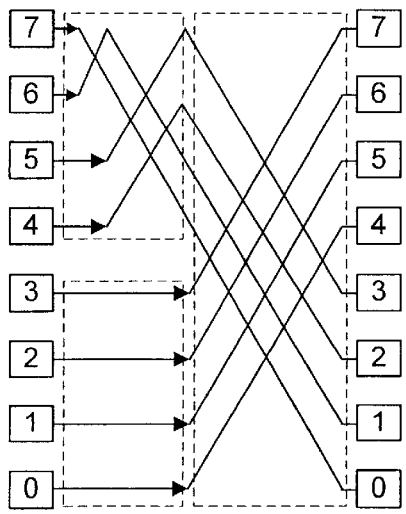

The notation Pn,m is used to designate a permutation box where n is the number of rows in the permutation box and m is the degree of the translation sequence. The degree of a translation sequence signifies the amount of translation in the sequence. A first degree translation translates between two nodes. An m-degree translates the amount of m translations in series. The term "permutation box" refers to a passive set of row-to-row connections between cells at adjacent columns on the same level. FIGS. 11A through 11F show translation sequence layouts for 1, 2, 4 and 8 rows. FIG. 11A is the simple case of a translation sequence π1,1 for one row. The sequence S1 (0,0,0 . . . ) specifies a straight-across connection: 0 to 0. The input row is at the left of the permutation box and the output row is at the right. FIG. 11B shows translation sequence π2,1 derived from sequence S2 (0,1,0,1 . . . ). Sequence S2[0] connects to sequence S2[1], that is, row 0 connects to row 1. FIG. 11C shows translation sequence π4,1 from sequence S4 (0, 2, 1, 3, 0 . . . ). Row 0 connects to row 2, row 1 to 3, and so on. FIGS. 11E and 11G are derived from sequences S8 and S16, respectively. An alternate method of graphically generating a permutation box (without reference to sequence S8) is shown in FIG. 11E. Permutation box π8,1 is formed from a combination of the 4-row translation sequence π4,1 placed in the upper-left quadrant, a series of four horizontal lines placed beneath the permutation box π8,1 in the lower-left quadrant, and a set of eight upper-to-lower and lower-to-upper connections placed at the right-hand side. Similarly, translation sequence π16,1 can be formed by placing permutation box π8,1 in the upper-left quadrant, eight horizontal lines beneath permutation box π8,1, and a 16-line, upper-to-lower, lower-to-upper crossover to the right shown in FIG. 11G. The recursive graphical method can be continued indefinitely to obtain any power-of-two permutation box.

Translation sequences do not necessarily have to be the same for all rows, nor do the sequences have to repeat with a period related to the level number or to other similar rules. For example, at level 2 the translation sequence 0,1,1,0,2, 2,3,3 could be used instead of the preferred translation sequence S4 (0,2,1,3,0 . . . Probabilistically, such translation sequences do not have desirable statistical properties of equitable message flow, minimal blocking and low time of flight. FIG. 11D shows an undesirable example of a permutation box, a simple layout π4,1 that is generated by parallel connections that cross the midline. Desirably, every message crosses the midline to always alternate between upper and lower groups. In other embodiments any translation sequence may be used that allows a message to visit upper and lower rows at least once per level. The performance of these translation sequences is inferior to the grand tour translation sequence.

Figure 11F:
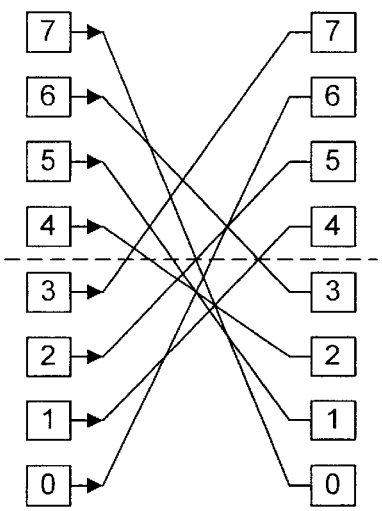
Figure 11G:
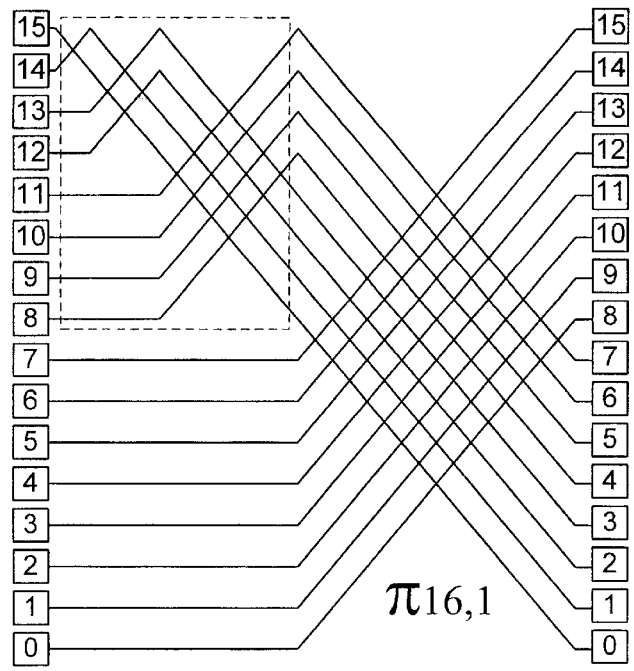
Figure 11H:
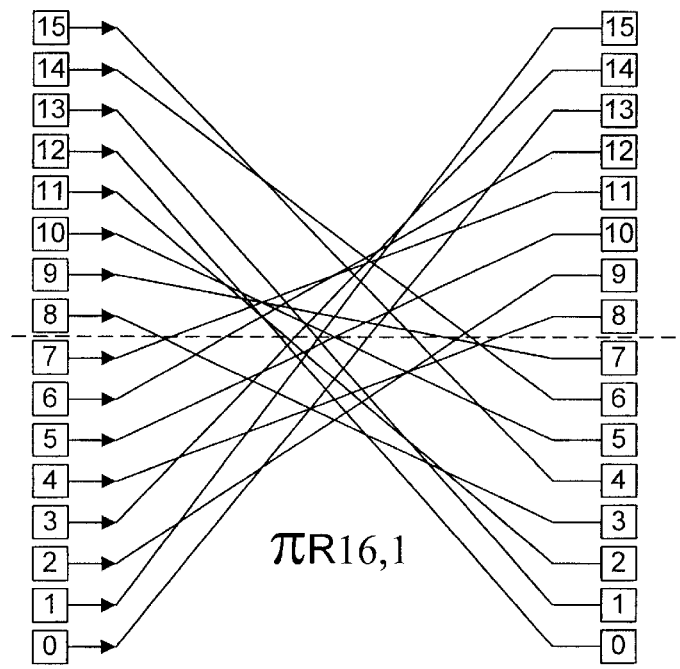

FIGS. 11F and 11H show permutation boxes that are derived from a random shuffle. FIG. 11F is shows an 8-row translation sequence, π8,1, that is derived by a random shuffle. The bottom set of rows connects in random fashion to the rows in the top half, and vice versa for the rows in the top half For example, rows 0, 1, 2 and 3 randomly connect with rows 6, 4, 5 and 7, and similarly for top row connections. FIG. 11H is a random permutation box πR16,1 for 16 rows. In preferred embodiments of interconnect 100 random translation sequences are different at every column of the interconnect. In alternative embodiments the randomly generated pattern may be used in multiple locations. Simulation of message flow through various embodiments of interconnect 100 have shown that random translation sequence, such as that shown in FIGS. 11F and 13B, may produce acceptable throughput rates. Advantageous structures of interconnect 100 use grand-tour translation sequences.

In general, the construction of a permutation box πn, 1, generated from translation sequence Sn, is given by the rule that for all i in the range (0, 1, . . . , n−1), input port Sn[i] is connected to output port Sn[i+1]. The random permutation box πRn,1 is generated by randomly shuffling row targets while insuring that every connection crosses the half-way line.

Translation sequence S8 describes the flow of a message through a set of eight rows which is used to construct permutation box π8, 1. FIGS. 4B and 7C show layouts that have only a single permutation box at each level. In these examples the column-to-column row connections are straight across, that is, a message does not change row number as the message moves east. Two modifications convert the flow description to the eight-row translation sequence S8. A first modification is the use of a degree-m permutation box 706. A second modification is a different inter-level arrangement of cells in the node array, as is described hereinafter.

Figure 12A:
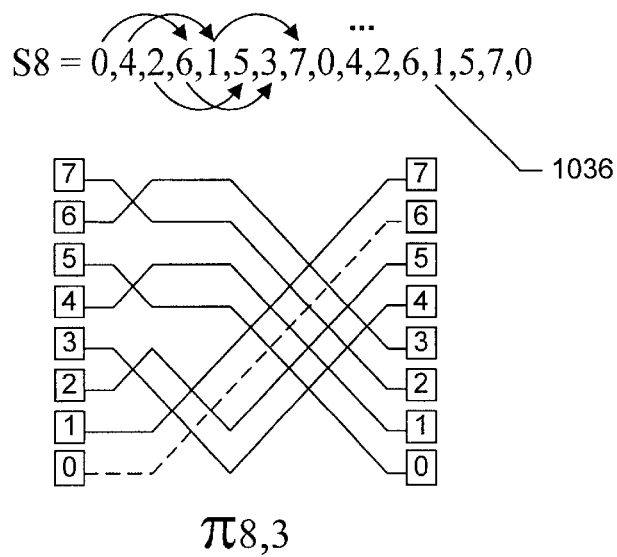
FIGS. 12A through 12D are detailed diagrams illustrating "degree-M" permutation boxes that influence message flow in the manner of M permutation boxes of degree 1 connected in series.
Figure 12B:
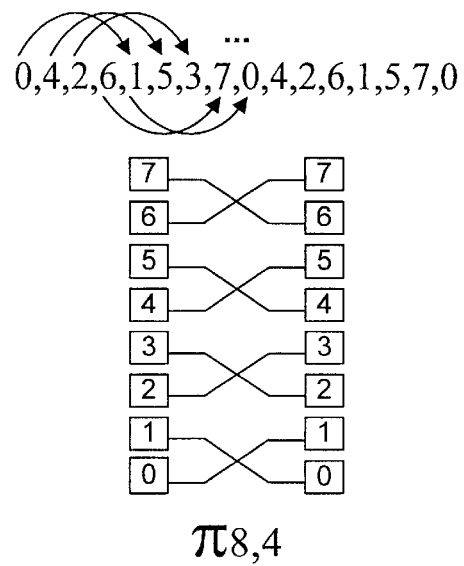
Figure 12C:
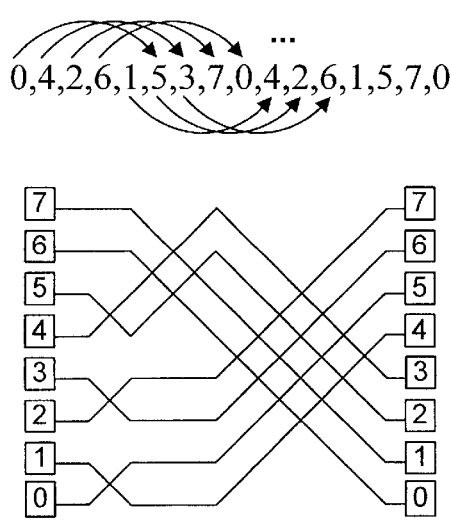
Figure 12D:
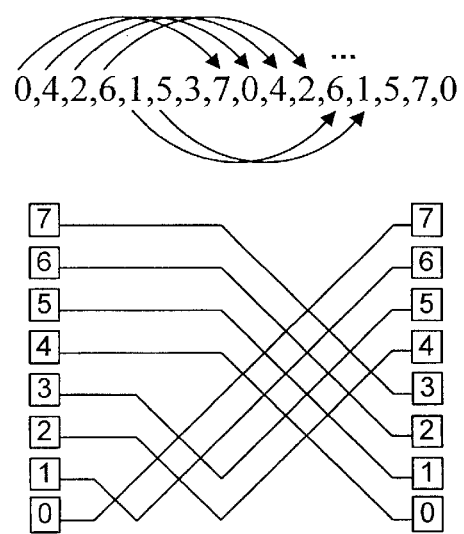

A degree-M permutation box produces the same effect on message flow as M permutation boxes (of degree 1) connected in series. FIGS. 12A through 12D illustrate examples of permutation boxes of degree M. For a translation sequence S8 (0,4,2,6,1,5,3,7,0 . . . ), a message starting at row 0 moves to row 6 after three steps, shown as a dashed line. A message starting at row 1 moves to row 7 after three steps. Permutation box π8,3 produces the effect of three π8,1 permutation boxes connected in series; FIG. 12B shows the degree-4 permutation box π8,4 generated by four steps. FIG. 12C shows π8,5 generated after five steps; and FIG. 12D shows π8,7 generated after seven steps. Not shown is π8,8 which is the same as π8,0, a set of straight-across connections. One advantageous configuration of interconnect 100 uses a single permutation box per level, illustrated in FIG. 7C. Alternative configurations employ a single permutation box per column, as shown in FIGS. 1A, 1B, 7A and 7B.

Permutation box π8,9 is the same as π8,1. In general, permutation box Pn,m is the same as permutation box Pn,q, where q=m+n·(integer). The construction of a permutation box Pn,m is given by the rule that for all i in the range (0, 1, . . . , n−1), input port Sn[i] is connected to output port Sn[i+m], where m is the degree of the translation sequence. A random permutation box PRn,m is by definition the same as PRn,1 when m is odd. When m is even the translation sequence is a simply a random shuffle where the connections do not cross the halfway line.

Figure 13A:
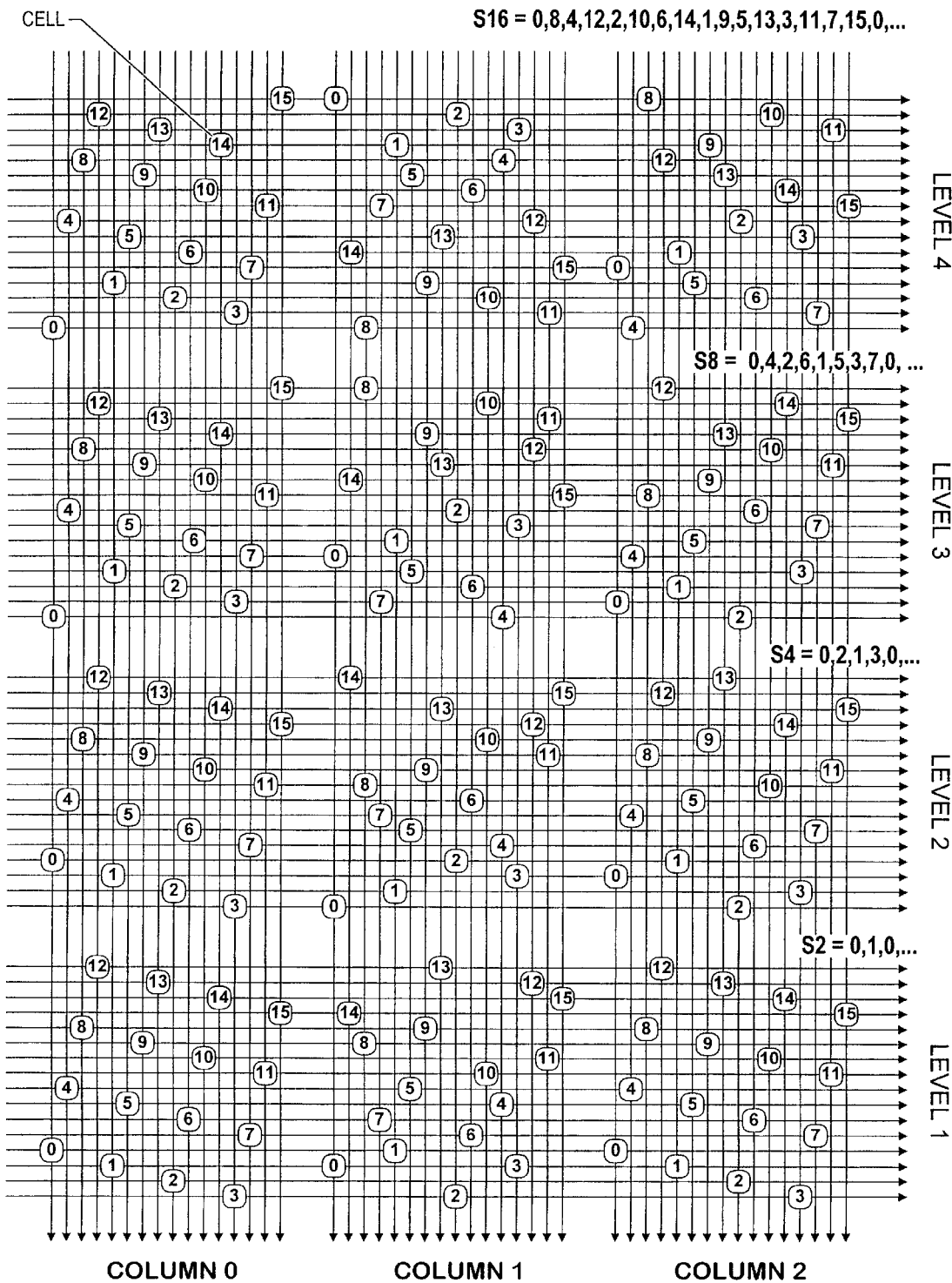
FIG. 13A is a block diagram illustrating a compact physical placement of cells on horizontal and vertical interconnection paths.

The block diagram layouts shown in FIGS. 4A and 4B illustrate application of the translation sequences to a message moving through the interconnect structure. FIG. 13A shows a more efficient use of the silicon real estate by arranging cells close together in a compact "square" layout versus the previously illustrated sparse configuration. The effect of translation sequences between columns is created by specific placement of cells on horizontal 208 and vertical 210 connection paths. Three columns and the top four levels of a 5-level, 16-row interconnect are shown. Level 0 is not shown. Examination of message movement across any row verifies that the grand tour translation sequence Sn for that level is achieved. For example, row 0 at level 4 follows the 0, 8, 4 . . . series of translation sequence S16. A desirable side effect of the layout is that a cell is always located relatively close to cells connected to the south and to the east. Desirably, no long traces occur in the interconnect layout, and all cell-to-cell connections have similar length.

Figure 13B:
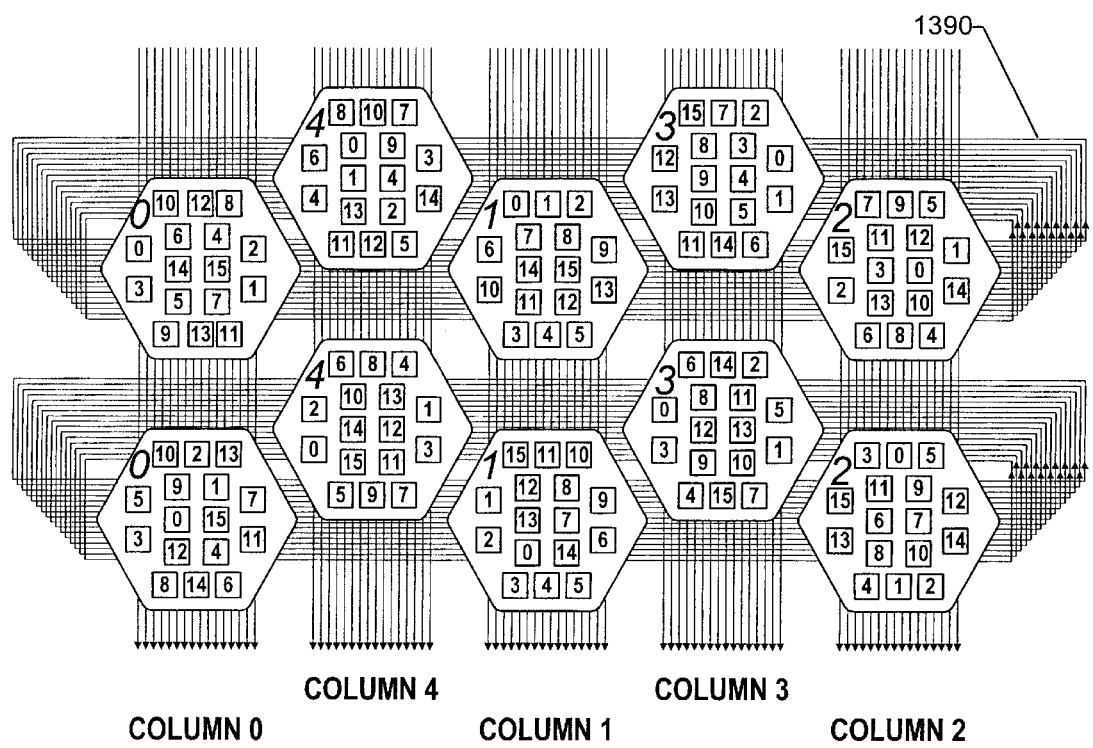
FIG. 13B is a block diagram showing a physical layout that improves over the horizontal and vertical interconnection paths to use silicon more efficiently and to minimize cell-to-cell wiring lengths. The improved layout produces a "racetrack flow" at each level.

FIG. 13A illustrates a compact positioning of cells within each node array advantageously minimizing the maximum cell-to-cell distance along each level. However, the right hand column must loop back to the left-most column. FIG. 13B shows a racetrack layout where the return path 1390 is occupied with node arrays, desirably minimizing the maximum connection distance. A set of FIFOs (not shown) can additionally be placed along the loop.

Figure 14:
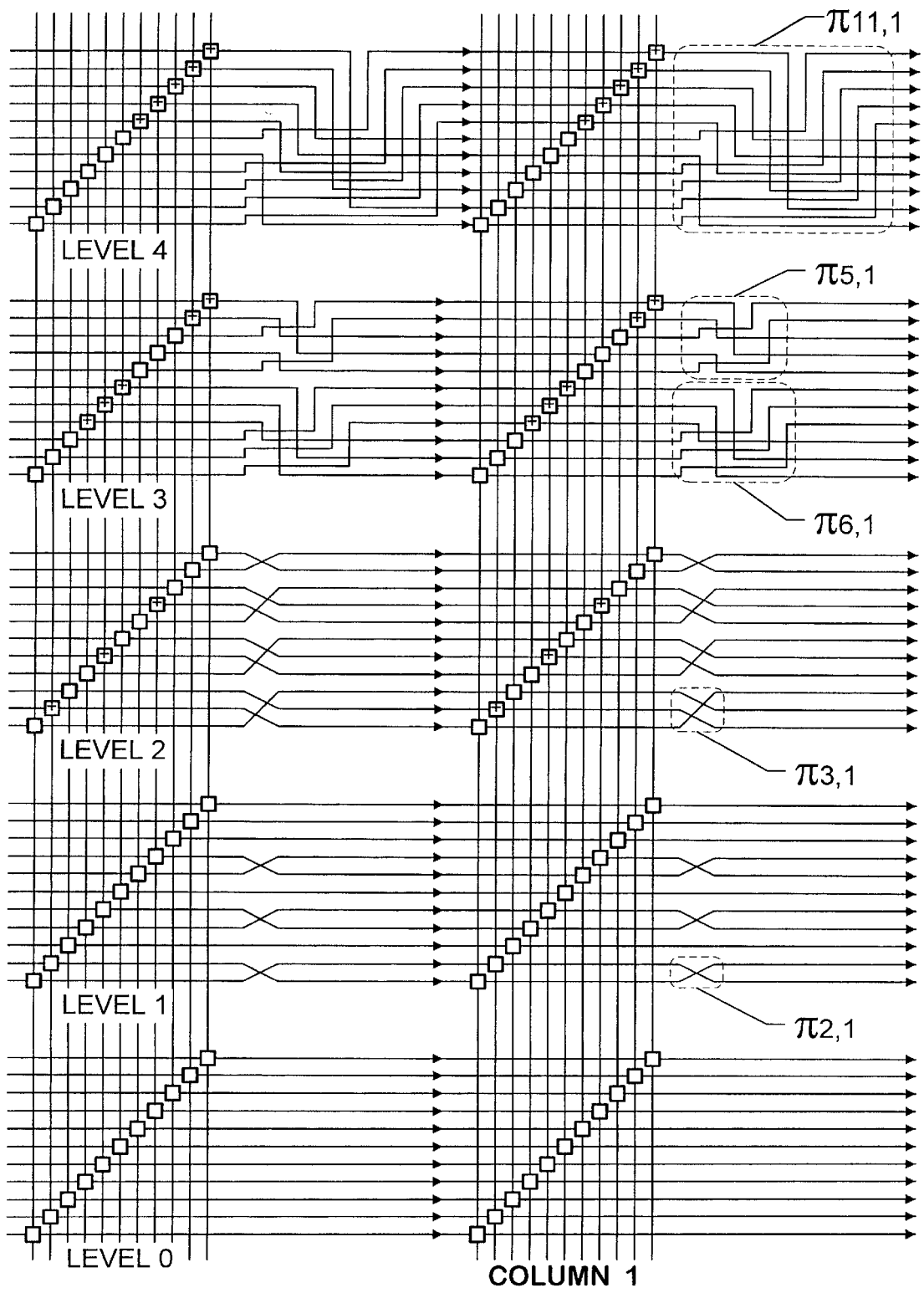
FIG. 14 is an interconnect diagram showing an 11-row interconnect structure with a class of interconnects that extend beyond typical power-of-2 sizes and designs.

For some implementations an interconnect structure may be configured with nonstandard properties, such as a size that is not a power of 2. FIG. 14 in combination with FIG. 1A shows an 11-row interconnect. The smallest integer L such that $2^L$ is greater than or equal to 11 is 4 ($2^4$=16), so the interconnect structure has levels 0 through 4. Each level has 11 rows. The 11 rows at the top level belong to a single group in the manner of the structure shown in FIG. 9. As messages drop from level 4 to level 3 the messages move to one of two groups. The groups are as close to equal size as possible. Therefore, the bottom group at level 3 contains 6 rows and the top group contains 5 rows. A message M that moves from level 4 to level 3 also moves from a level 4 cell at row R, column C to a level 3 cell at row R. If C<K−1 where K is the total number of columns, then message M moves to column C+1; if C=K−1, then M moves to column 0, referred to as the next column.

Level 2 includes four groups. The bottom two groups receive messages from the bottom group at level 3; the latter contains 6 rows, which divides into two 3-row groups at level 2. The top two groups receive messages from the top group at level 3; the latter contains 5 rows, which divides into a 2-row group and a 3-row group at level 2. A message M that moves from level 3 to level 2 moves from a level 3 cell at row R, column C to a level 2 cell at row R. Level 1 includes twice as many groups as at the higher level; here 8 groups. A 3-row group connects down to a 1-row group and a 2-row group. A 2-row group connects down to two 1-row groups. The eight groups at level 1 contain 2, 1, 2, 1, 2, 1, 1 and 1 rows, respectively. Level 0 includes eleven 1row groups, and each row is a target for a message. As before, a message M that moves from level 1 to level 0 moves down to the same-numbered row.

Referring to FIG. 9, a message moving along a row, a data loop, moves through cells that either are connected or are not connected down to a row that connects to a path to the output. In general, a binary tree-like method of directing a message to the eventual target row is achieved. A message initially makes a large move from row to row at a top level and subsequently makes smaller moves at successive lower levels. In preferred embodiments a message at the top level alternatively connects to cells at the next lower level that are located in the upper half and then the lower half of the rows at the lower level. Advantageously, a message moving east transverses no more than two columns before arriving at a cell that is connected down to a cell at a lower level that eventually connects the message to a destination specified by the message. At the next lower level the range of movement among rows is preferably one half that of the previous level. Finally, when the message reaches level 1, the message alternates between two rows, such that only one remaining bit of the message header is to be examined before the message can exit the interconnect from the target row of the message.

The number of rows at a level is not necessarily a power of 2, as shown in FIG. 14. A method for generating an 11-row translation sequence is described. The objective is to produce a permutation of row numbers that specify the row-to-row transitions of a message moving east while remaining at any given level. The first step of the method is to decompose R, the number of rows at the top level, 11 in this example, into approximately equal halves. The value 11 is divided into two integers: 6 and 5. The larger value, 6, is always written first. The two resulting values, 6 and 5, are similarly decomposed. The value 6 is broken into 3 and 3. The value 5 is broken into 3 and 2. The value 3 is broken into 2 and 1. The process stops when 2 or 1 is reached.

In the following discussion sequence "Sn" refers to a sequence containing a translation sequence of n values. After decomposing R, the next task is construction of the 11-row translation sequence S11. Steps of the previous process are reversed: sequence S3 is generated from sequences S2 and S1, sequence S5 is generated from sequences S3 and S2, sequence S6 is constructed from sequences S3 and S3, and finally sequence S11 is constructed from sequences S6 and S5. In each case, the two smaller translation sequences are used to produce the larger translation sequence. The translation sequence S1 is defined to be 0,0 . . . . The translation sequence S2 is defined to be 0,1,0,1 . . . , which means a message moving east is alternatively connected down to cells at rows 0 and 1. The translation sequence S3. is generated from translation sequences S2 and S1 by first writing translation sequence S2 with a blank position after each value: 0, _, 1, _, . . . . The next higher integer not contained in translation sequence S2 (0,1,0,1 . . . ) is 2, so 2 is added to translation sequence S1 yielding (2,2 . . . ). The latter translation sequence (S1+2) is placed at the blank positions of S2. S3 becomes the translation sequence 0,2,1,0, . . . . This means that a message moving east on a 3-row group alternatively visits rows 0, 2, 1, 0, 2, 1, 0 . . . in that order.

Translation sequence S5 is generated from the translation sequences S3 and S2. The larger translation sequence S3 is written first with a blank after each value: 0,_,1,_,2. The next higher integer not in the sequence S3 is 3, and so 3 is added to each value of sequence S2 (0,1). The result (3,4) is inserted at the blank positions of S3. Sequence S5 therefore becomes the translation sequence 0,3,2,4,1,0 . . . . Translation sequence S6 is generated from sequence S3 (0,2,1) and sequence S3 plus the next available integer: 3. As before, sequence S3 is written with a blank position after each value: 0, _, 2_, 1, _. The value 3 is added to sequence S3 and the result (3,5,4) inserted at the blank positions. Sequence S6 becomes the translation sequence 0,3,2,5,1,4,0 . . . . Sequence S11 is generated from the translation sequences S6 and S5. Again, the larger sequence S6 is written first with a blank after each value: 0,_,3,_,2,_,5,_,1,_,4. The next higher integer, 6, is added to sequence S5 giving 6,9,8,10,7, which is inserted at the blank positions of translation sequence S6. The resulting translation sequence is S11: 0,6,3,9,2.8,5,10,1,7,4,0 . . . .

In summary, a general method for producing a translation sequence Sn is to start with the count of rows at the top level, R, and divide the row count in half. If R is an odd number the two closest integers that sum to that value are taken, writing the larger value first. The integer or pair of integers that result from the first step are similarly decomposed, and the process repeated until the 2 and/or 1 number are reached. The resulting list of integers, 11, 6, 5, 3, 2 and 1 in the example, are used in reverse order to generate row-translation sequences. Using translation sequences predefined for sequences S1 and S2, sequence S3 is derived from the sequence pair S2 and S1, sequence S5 from the sequence pair S3 and S2, sequence S6 from the sequence pair S3 and S3, and sequence S11 from the sequence pair S6 and S5. The first value of the pair is written with a blank position after each number and the incremented second value is written at the blank positions. The increment value is always the next integer greater than the highest integer in the first translation sequence. Any translation sequence is considered to have unlimited length by repeating the sequence, for example, sequence S3 (0,2,1) is expanded to 0,2,1,0,2,1,0,2,1,0 . . . .

A desirable outcome of the method for routing a message as the message moves east at a given level is that the message alternately moves over each of the two groups at the next lower level. For example, when R is 11, the translation sequence S11 (0,6,3,9,2,8,5,10,1,7,4) alternately places a message over the upper set of five rows 6,9,8,10,7 and the lower set of six rows 0,3,2,5,1,4. In the case where the MSB of a message at the top level is 1, the target row is defined to be in the upper group. If the message happens to be over a row in the lower group, the message has to move only one column east to be advantageously located over a row in the other group. At the next lower level, the same alternation occurs. Thus, when descending to the next level, a message has approximately a 50% chance of being able to immediately move south from that level, or else the message moves only one more column to the east where the message can then move south. A message on average visits approximately 1.5 cells at each level as the message moves south though interconnect 100. In the case of odd-number groups, at some columns the message will have to move two columns east to reach the target group, only slightly increasing the average number of visits per level for all even-numbered groups.

Figure 15A:
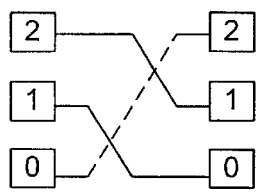
FIGS. 15A through 15D are detailed diagrams showing examples of permutation boxes that may be employed in the 11-row interconnect shown in FIG. 14 to extend beyond typical power-of-2 sizes and designs.
Figure 15B:
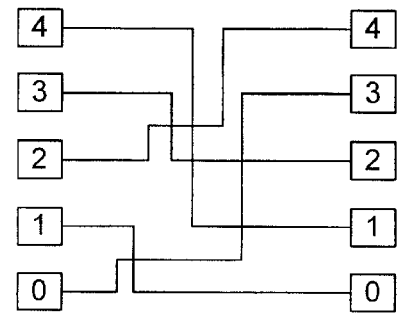
Figure 15C:
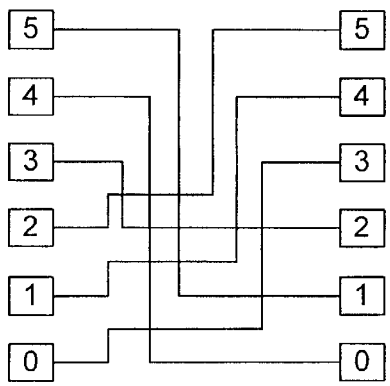
Figure 15D:
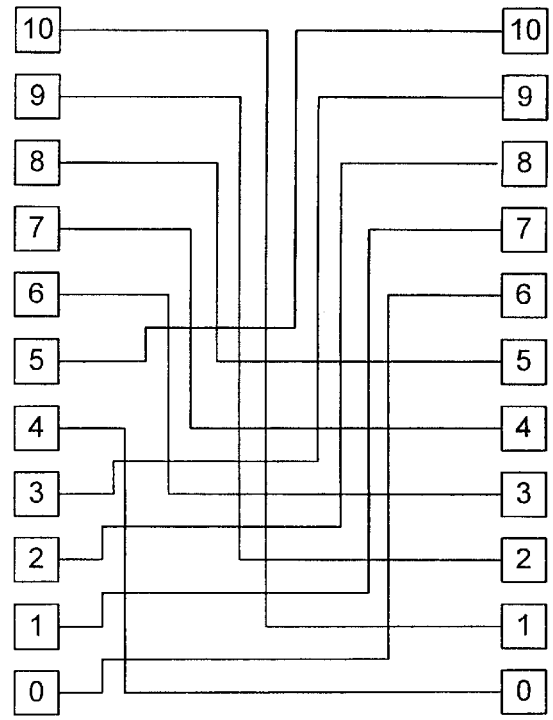

FIGS. 15A through 15D show permutation-box layouts for translation sequences S3, S5, S6 and S11. Translation sequence $\pi 3,1$ for sequence S3 shows a message moving east between columns follows the sequence S3 row-to-row sequence 0,2,1,0. A message at row 0 moves to row 2 at the next column, a message at row 1 moves to row 0 at the next column, and a message at row 2 moves to row 1 at the next column. FIG. 15B shows the translation sequence $\pi 5,1$ for sequence S5 (0,3,2,4,1,0). A message at row 0 moves to row 3 at the next column, and so on, for the remaining rows. FIGS. 15C and 15D show translation sequences $\pi 6,1$ and $\pi 11,1$, respectively.

FIG. 16 shows a method for generating translation sequence for a base-3 interconnect structure. The method is similar to that for the base-2 interconnect structure shown in FIG. 10. The smallest sequence $S_3 3$ has 3 rows and is defined as 0,1,2,0 . . . The next power of 3 is 9, and sequence $S_3 9$ is generated from three copies of $S_3 3$. The first copy is written with two blank places after each number. The next sequence is incremented by the next available row number, 3, and written at the first available blank to the right of each number. The third sequence is incremented by the next row number, 6, and written at the remaining blank places. The resulting sequence $S_3 9$ is 0,3,6,1,4,7,2,5,8,0 . . . . The next power of 3 $S_3 27$ is generated by the same method. $S_3 9$ is written with two blank positions after each number and the successive, incremented sequences are written in between, producing the sequence $S_3 27$.

Figure 17:
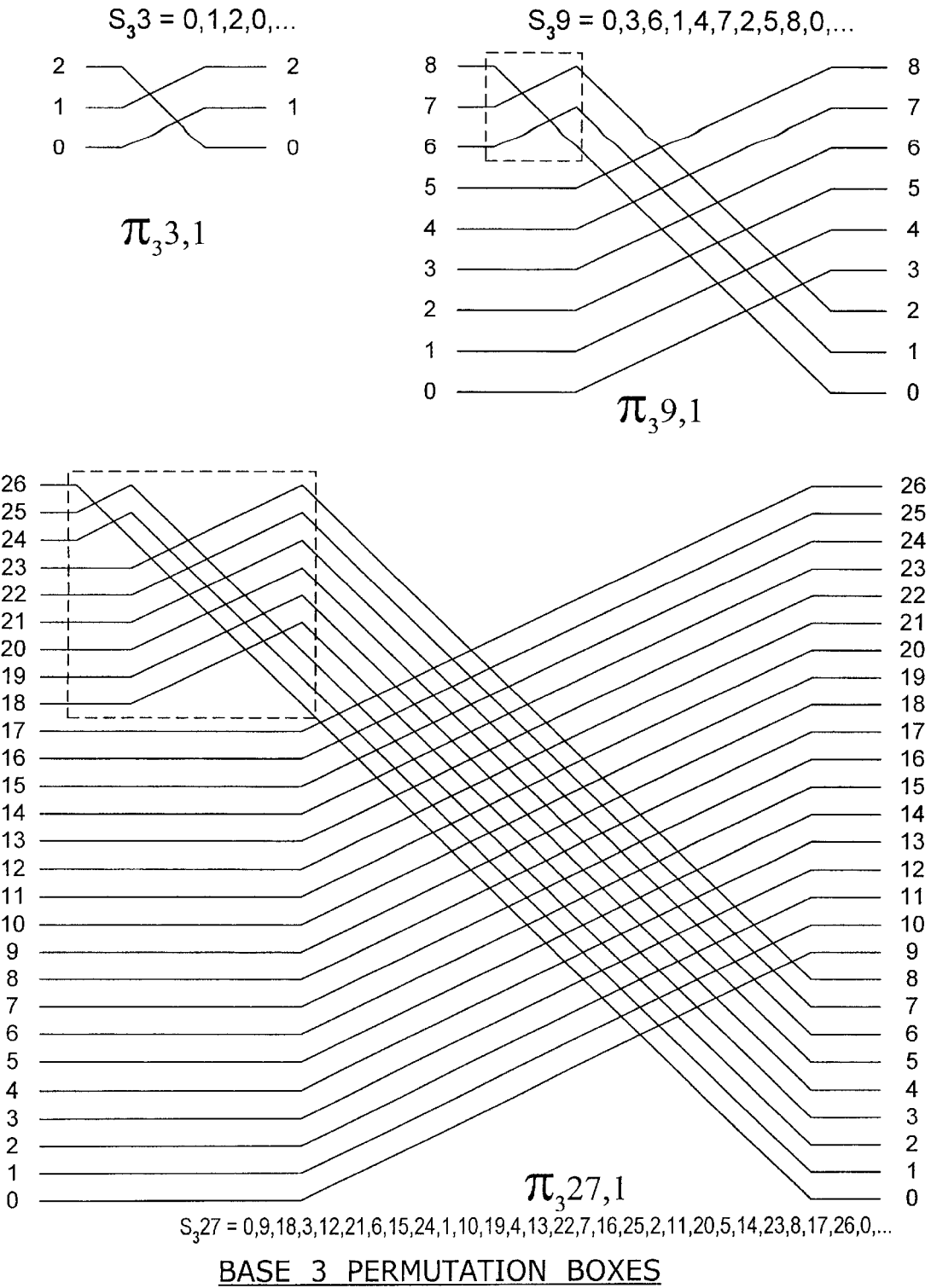
FIG. 17 are detailed interconnection diagrams showing permutation boxes with row-to-row connection paths for messages moving to the next columns derived from the base-3 translation sequences shown in FIG. 16.

Base-3 permutation boxes are laid out using the $S_3 N$ translation sequences. FIG. 17 shows a 3-row permutation box $\pi_3 3,1$ generated from translation sequence $S_3 3$. Permutation box $\pi_3 9,1$ is derived from translation sequence $S_3 9$. Placing translation sequence $\pi_3 3,1$ in the upper-left corner, placing six horizontal rows beneath the translation sequence $\pi_3 3,1$, and making a 3 to 6 crossover can also graphically generated the permutation box $\pi_3 9,1$. Permutation box $\pi_3 27,1$ is generated from translation sequence $S_3 27$. The graphical method is illustrated by the translation sequence $\pi_3 9,1$ in the upper-left corner, 18 horizontal rows beneath the translation sequence $\pi_3 9, 1$, and a 9–18 crossover.

Figure 18:
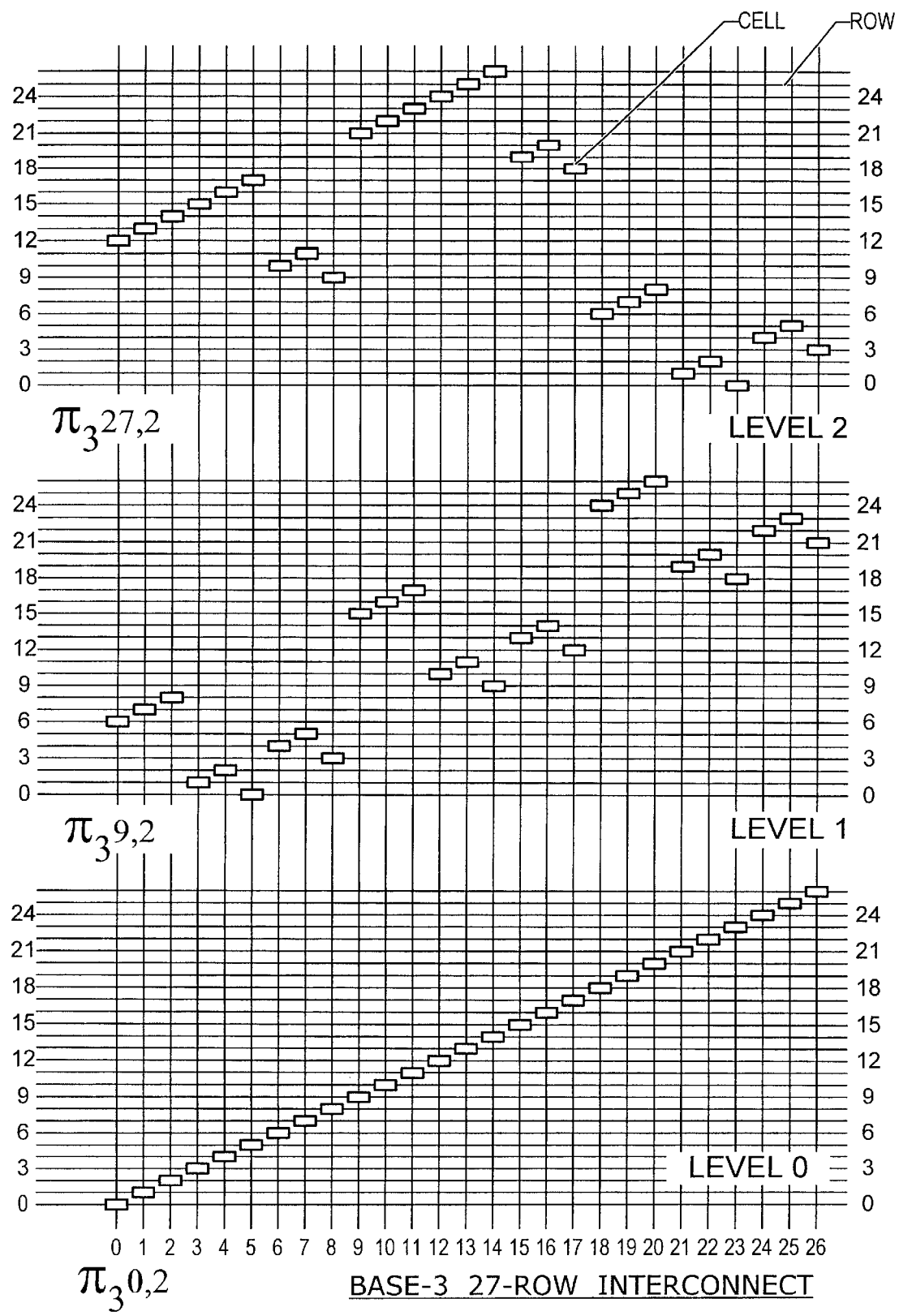
FIG. 18 is a detailed interconnect diagram showing one column and three levels of a 27-row interconnect using base-3 design. Multiple columns form a complete interconnect.

FIG. 18 shows column 1 of a base-3, 27-row interconnect. The identity-matrix layout repeated at all three levels of column 0. An advantage of base-3 processing is fewer levels than for base 2 processing. For example, the illustrative 3-level interconnect structure supports 27 ports. A base-2 system would require five levels and would support 32 ports. The disadvantage of base-3 processing is that the message header is preferably expressed in base-3 notation with two binary bits used to express ternary values 0,1,2. A base-3 cell examines two header bits to determine whether a message should be sent south. The interconnect structure uses a single-cell per-node design; a 3-cell design may be advantageous but involve additional complexity. Details of the design are omitted here and can be derived by examining the discussion for two-cell (base-2) designs. Embodiments of interconnect 100 can use any base value to lay out a system. Base-2 is naturally supported by binary processing and makes efficient use of logic gates and address space. The advantages of a design where the base is other than a power of 2 are limited. However, higher order base systems are superior in cost and performance when compared to large "low-latency" networks currently available in the market.

Figure 19A:
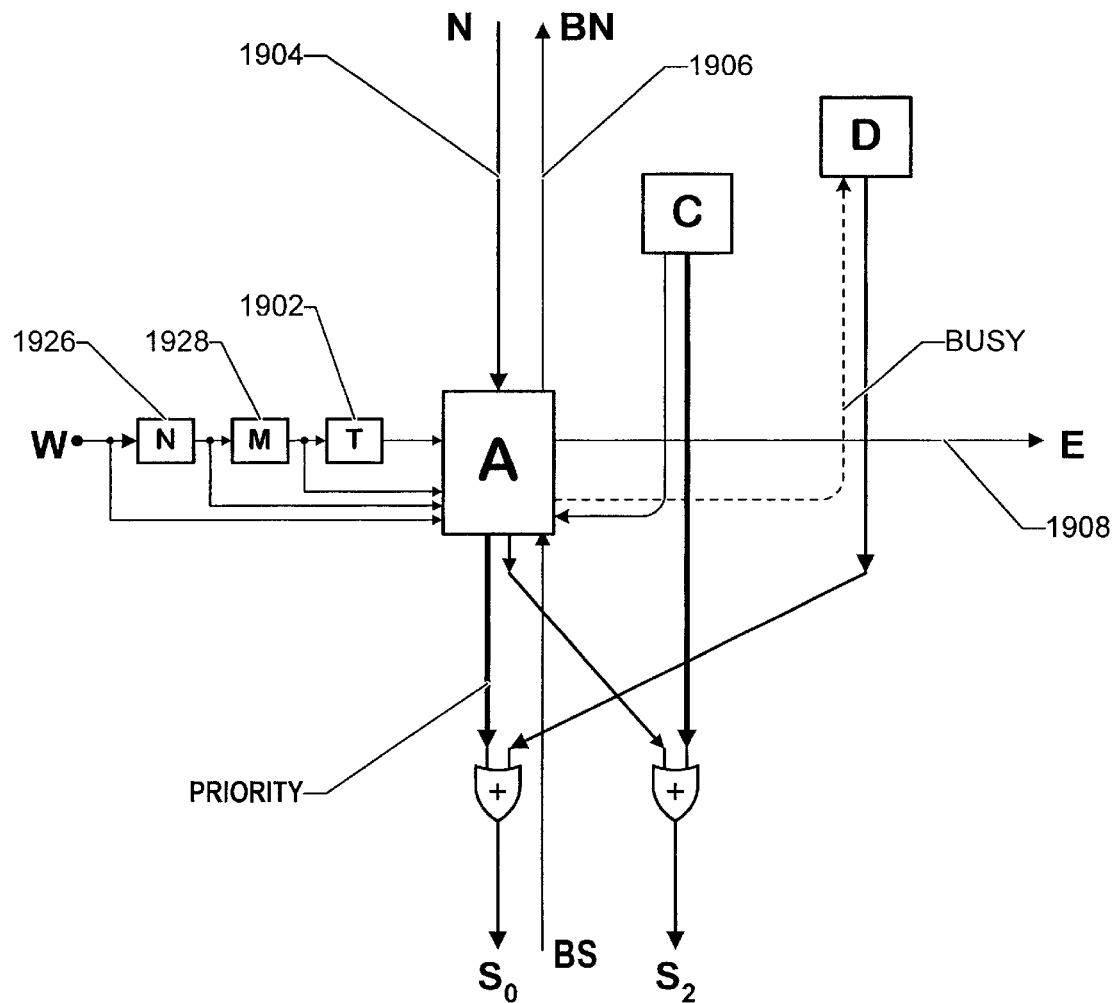
FIG. 19A is a detailed block diagram showing one cell of a logic associated with a base-4 node and intra-node control signal connections to other cells. The logic examines two header bits at a time to determine message routing.
Figure 19B:
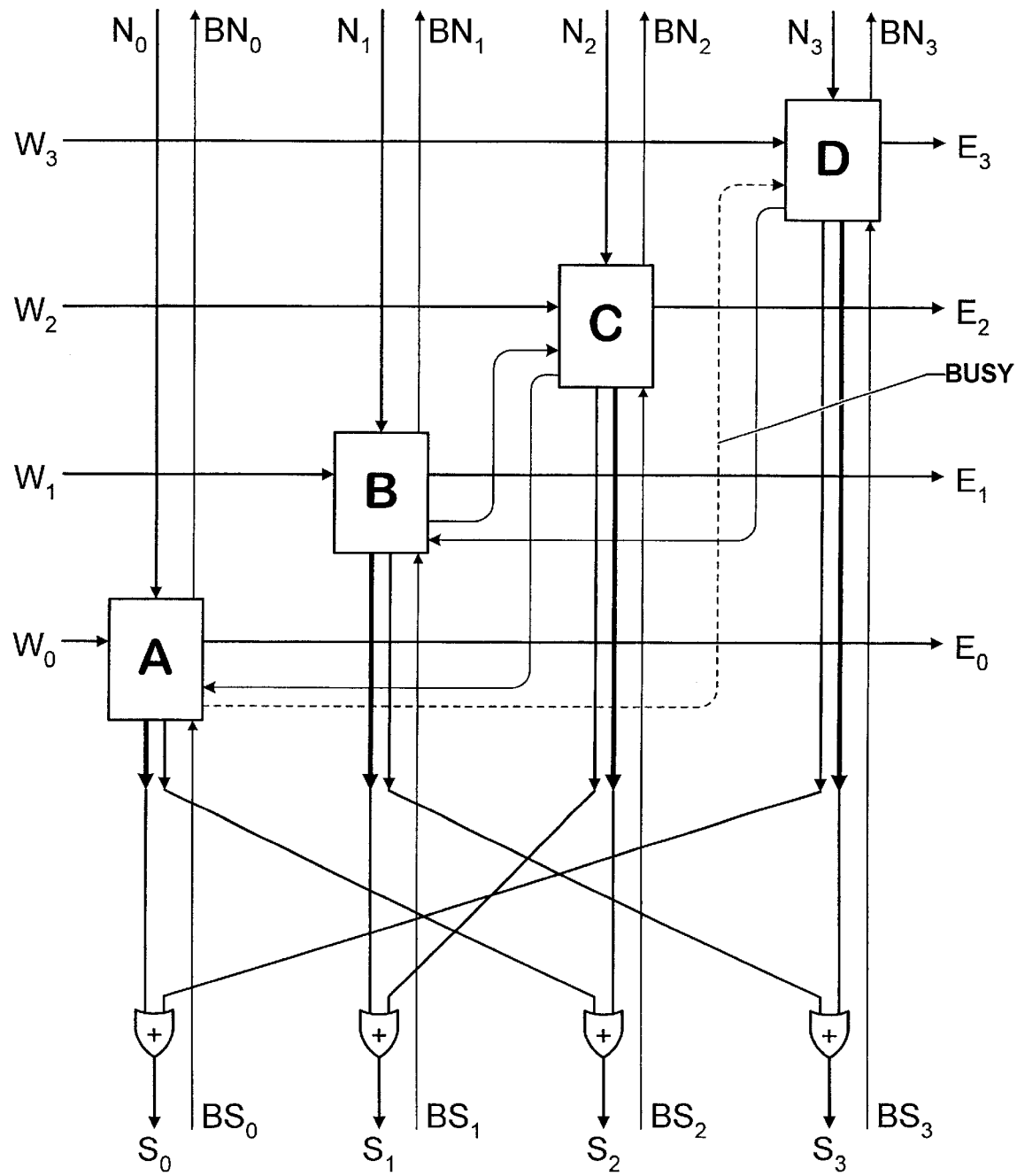
FIG. 19B is a block diagram showing interconnections and intercommunication of four base-4 cells to form a base-4 node. Lines are included that show message-routing priorities among the cells to control paths to a lower level.

An example of interconnect structure 100 that uses base-4 design reduces by a factor of 2 the number of levels compared to the base-2 embodiments previously discussed. FIG. 19A shows a base-4 cell. FIG. 19B illustrates four nodes A, B, C, and D, all on the same level, that route information using control signals. Each of the nodes has two data input ports, two control signal input ports, three data output ports, and two control signal output ports. A node V (not shown) is on a level below the level of the node A and receives data from the line S0. A node U (not shown) on the same level with node V sends data directly to node V. A node W (not shown) on the same level with node V, receives data directly from node V. Data sent down line $S_0$, from node A or node D, passes through node V and moves directly to node W. Node V is not able to influence the flow of data arriving from the line S0. A priority relationship exists among the nodes V, A, and D to send data to node W. Node V has highest priority. Node A has next highest priority and finally node D has the lowest priority to send data to node V.

The set of system output ports O that includes all ports reachable from node A, is identical to the set of system output ports reachable from each of nodes B, C, and D. Each of the node output ports $S_0, S_1, S_2$ and $S_3$ leads to a different node on the next lower level. The set of output ports reachable from a node in the next lower level contains one fourth of the output ports that are in the output port set O.

In FIG. 19B, the node A receives a busy signal through control line BS0 and relays that signal to node D. An alternative design includes a line running directly from the source of control line BS0 to node D, and a control line from the node A to the node D. A control signal is used to control data flow. The particular path taken by the control signal is unimportant. The four cells of FIG. 19B along with the AND gates below the four cells can be viewed as a single node X with eight data input ports, four control signal input ports, eight data output ports, and four control signal output ports.

The data input signals from the north always pass through the node directly to the east. Each data input from the west can be switched three ways. Data from the west that exits to the east always exits through an output port on the same level as the input port. A priority relationship exists among the input ports that is inherited from the priority relationship among the individual cells in the node. Data from node X input port $W_0$ has priority over data from node X input port $W_3$ to send data out of node X output port $S_0$.

For each node X output port opx that is positioned to send data to node SW (not shown), a set of input ports IPX of node X are positioned to send data out of the output port opx. The input ports are ordered from a highest ranked member of the input port set IPX to send data through output port opx to a lowest ranked member of the input port set IPX to send data to through the output port opx. In this way, access of messages to the output port opx is defined by a priority-based-on-position scheme. Each message entering an input port of set IPX has a target. The target may be an output port of the interconnect structure or may be a target ring feeding another structure. One such structure is a computational element taught in U.S. patent application Ser. No. 09/693,603 entitled, "Scaleable Interconnect Structure for Parallel Computing and Parallel Memory Access".

A priority relationship exists among the members of the set of input ports IPX to send data to output port opx. In the priority relationship, input port p is a member of the set of input ports iPX.

If a message $M_p$ arrives at an input port p of the set of input terminals IPX, and a path exists from output port opx to a target of message $M_p$, then one of the messages arriving at input terminal set IPX will conditionally be sent through output port opx. The condition for sending the message is that the output port opx is not blocked by a message that is not traveling through node X. If an input port q is included in input terminal set IPX such that: 1) input port q has higher priority than input port p to send to the output port opx; and 2) a message $M_q$ arrives at input port q and a path exists from output port opx to a target of message $M_q$, then message $M_p$ will not be sent to output port opx.

The example combines the logic and control of two levels as described hereinbefore within a single level. The base-4 node provides four output paths to the south, and duplicates the effect of dropping a message through two levels. An additional desirable property of skipping past omitted levels is the reduction in time of flight through the interconnect structure resulting in a lower latency. Referring also to FIG. 9, cells at one level are connected to two groups at the next lower level, referred to respectively as "upper" and "lower" groups. Base-4 cells connect to one of four groups at the next level, effectively creating a "base-4 tree" path, versus a binary tree-like path. Each base-4 cell has connections to two of the four groups to the south. Multiple cells interconnect to share paths to the south. In the illustrative base-4 embodiment, a base-4 cell has a connection to two of the four groups below. At the next column the cell has connections to the other two groups.

The message layout and header for a base-4 interconnect is the same as shown in FIG. 3A. Referring to FIG. 19A, cell A examines the MSB 1902, next-significant bit 1926, and traffic bit 1902, to determine to which of the four groups the message should go. Each cell has two paths to the south. A probability exists that the message cannot use one of the paths, and therefore must be routed east. The routing is analogous to a message being routed east from the base-2 cell in state 640. As discussed hereinbefore, when a message is sent east the cell to the north that shares the path is informed by control signal BN 1906. Alternatively, the header may indicate a move on one of two paths to the south, S0 or S2. Path S0 is shared with another cell in the same node array, and cell A has priority over the other cell in the use of path S0. Therefore, if the message header indicates a target through path S0 and the control signal from the south indicates the path is not blocked, then cell A sends a message down path S0. Cell A also sends a control signal to the cell D which shares path S0. In the case cell A attempts to send a message on the non-priority path S2, cell A checks the status of control signal from cell C which has priority in the use of path S2. A base-4 cell can be blocked by a cell directly below or by a cell in the same node array that has priority over the shared output path S2. Cell A shares priority output path S0 with another cell D and communicates the use of path S0 by a control signal to cell D. Cell A shares a non-priority output path with cell C and receives a control signal from cell C.

FIG. 19B shows an arrangement of four base-4 cells in the same node array. Cell A has priority, shown by dashed line, over cell D in the use of path S0. When cell A sends a message south on path S0, cell A concurrently sends a control signal to cell D. Each cell has two paths to the south, a heavy line indicates which path has priority. The priority arrangement is A-D-B-C-A, where cell A has priority over cell D, and cell D has priority over cell B, etc. When a cell is destined to send a message on a non-priority path the cell first examines the control signal from the cell having priority.

In the illustrative example, the basic building block for constructing the base-4 interconnect structures is a node capable of switching the four signals coming from the east and passing signals from the north directly to the east. Other nodes of the same type can be used in the same interconnect structures. Illustrative embodiments are shown in FIGS. 19C and 19D.

Figure 19C:
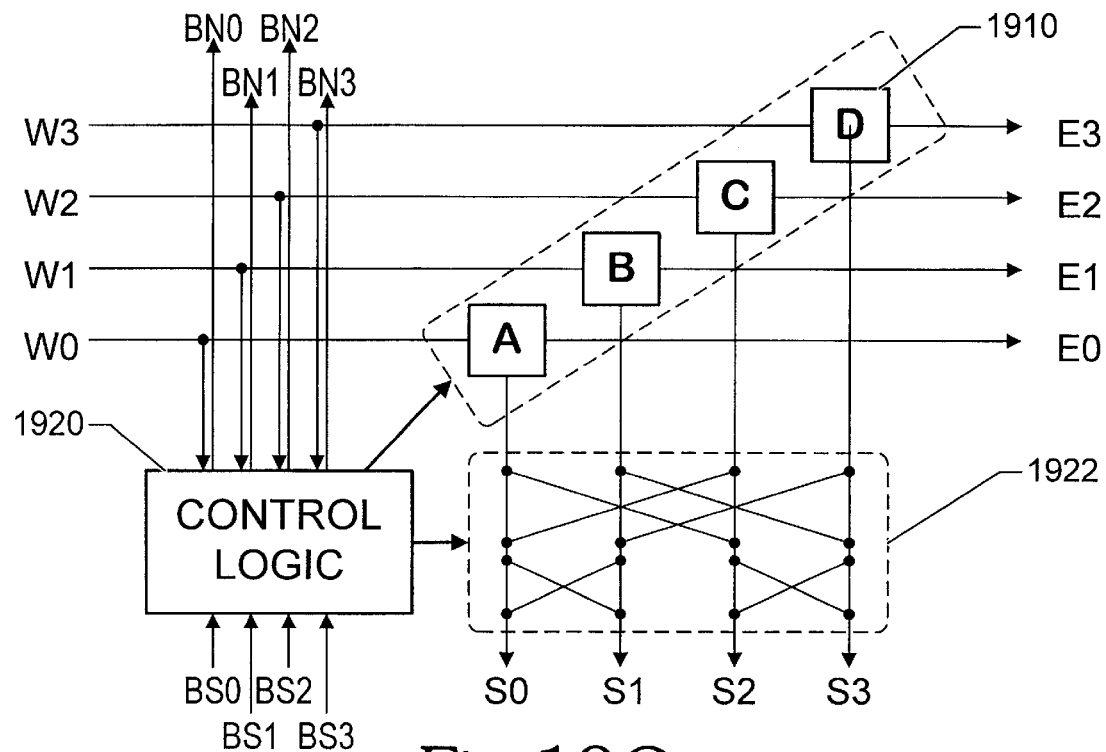
FIG. 19C is a detailed block diagram showing an embodiment of a base-4 node that includes a plurality of connection paths to the south to reduce congestion.
Figure 19D:
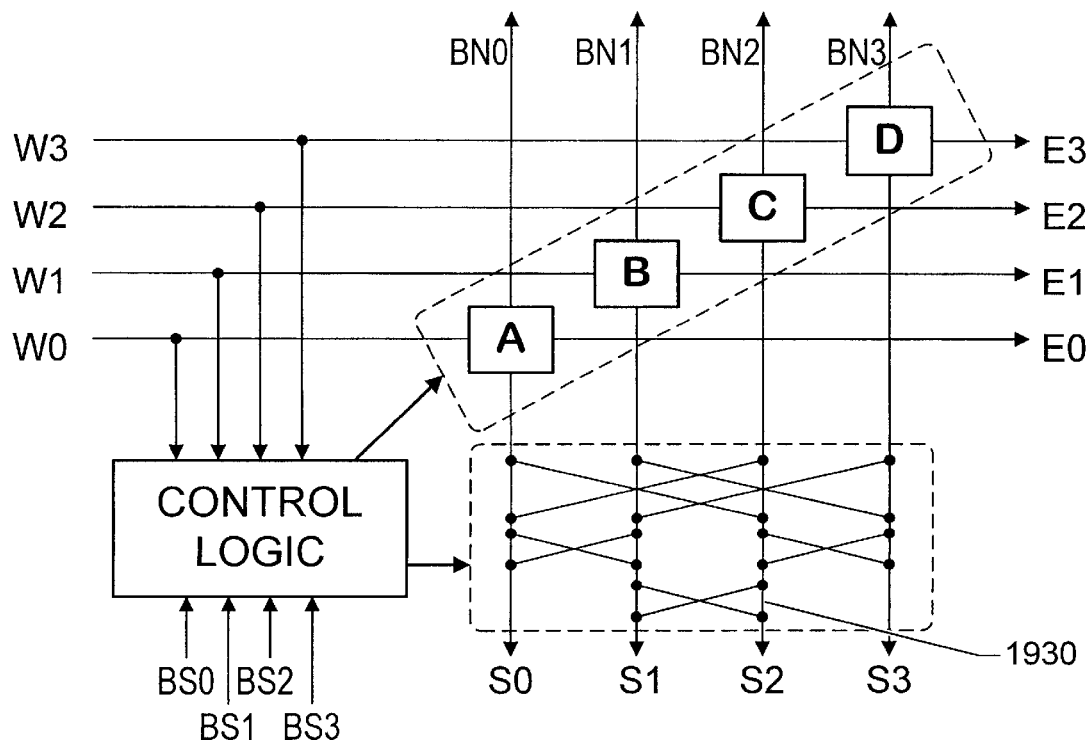
FIG. 19D is a detailed block diagram showing another embodiment of a base-4 node that includes additional connection paths to the south to further reduce congestion.

In FIGS. 19C and 19D, line S0 leads to a location W. Location W can be considered as either a node or a cell within a node. A cell V on the same level as location W has a highest priority to send data to location W. Among four cells A, B, C, and D, no one cell of the four has priority over the other three cells to send data to location W. A common logic resolves contention to send messages from cells A, B, C, and D to location W. Cells A, B, C, and D can be considered individual nodes. Node set O denotes a set containing a single node V. Node set R denotes a node set containing the four nodes A, B, C, and D. Messages from node set O have priority over messages from node set R for sending to location W.

The node shown in FIG. 19C contains four 2×2 switches 1922 and the four switches at the cells A, B, C, and D 1910. The node is able to direct a message arriving at any input port from the west to an output port on the east on the same row or to any of the output ports to the south. Control logic 1920 associated with the node receives sixteen input bits including the four busy signals from the south, the traffic bits from the four incoming messages and the two most significant bits from each of the four incoming messages. The logic sets the four switches at cells A, B, C, and D, and also sets the four 2×2 switches. The logic associated with the node accepts 16 bits as an input signal and produces eight bits representing the node state, including busy signals. The busy signals to the north can be produced by the controlling logic unit 1920, or by the nodes A, B, C, and D 1910, as shown in FIG. 19D.

Suppose that the rule used by the logic employs a priority scheme that gives node A top priority to access path $S_0$. Assume that a message at node A is targeted for path $S_0$, a message at node B targeted for path $S_0$, a message at node C targeted for path $S_1$, and no message at node D. Allowing the message at node A to go to node A's target only allows one messages to move south, while another rule allows two messages to go south. A set of such examples shows a disadvantage in using any rule where priority is based strictly on position. An effective strategy for the messages at a given level to have priority over messages from higher levels and messages at a given level to have a priority possibly based on other schemes. Two such schemes include: (1) allowing the maximum number of messages to drop down a level, and (2) giving priority to messages according to quality-of-service (QOS) priority bits in the header.

Referring to FIGS. 19C and 19D, compound node N is composed of multiple cells, control logic elements, input ports, output ports, and switches. Compound node N includes four cells A, B, C, and D, control logic 1920, and switch 1930. The compound node N has four data input ports W0, W1, W2, and W3 and eight output ports. Four of the output ports S0, S1, S2, S3 are grouped into an output port set S. Four of the output ports E0, E1, E2, and E3 are grouped into an output port set E. Data traveling through the output ports S enter nodes one level lower and one column to the right of the node N. Data traveling through output ports E enter nodes on the same level with node N one column to the right of node N. The control logic unit 1920 determines control decisions based on control signals and header bits of a group of messages that are sent through a set of output ports T. The output ports in output port set T are connected to input ports of the node N.

For each message M entering the compound node N, a path to a target output port designated by the message M exists through compound node N. Based on the headers of the messages and the control signals received by the control logic 1920, the control logic 1920 controls switches in the node N and the switches between nodes. The nodes and switches are set by the logic unit 1920 to increase or maximize the number of messages M that can be sent to a node $P_M$ such that: 1) the node $P_M$ is on a level lower than the level of node N; and 2) a path exists through node $P_M$ to a target of message M.

The node of FIG. 19D has an additional 2×2 switch 1930 and is desirably able to perform any permutation of messages arriving from the west. Control logic accepts 16 bits of input signal and produces 10 bits representing the state of the node. Even in this case, the control logic might employ a complicated strategy because conflicts can still arise among the messages at nodes A, B, C, and D for a given output port.

In an alternative embodiment, the logic governing the flow of messages through the nodes illustrated in FIGS. 19C and 19D can use QOS bits in message headers to give higher priority messages a higher priority to move to lower levels in contrast to messages with lower priority. In one case, priority is firstly based on a QOS setting, and secondly based on position in the node.

Figure 20A:
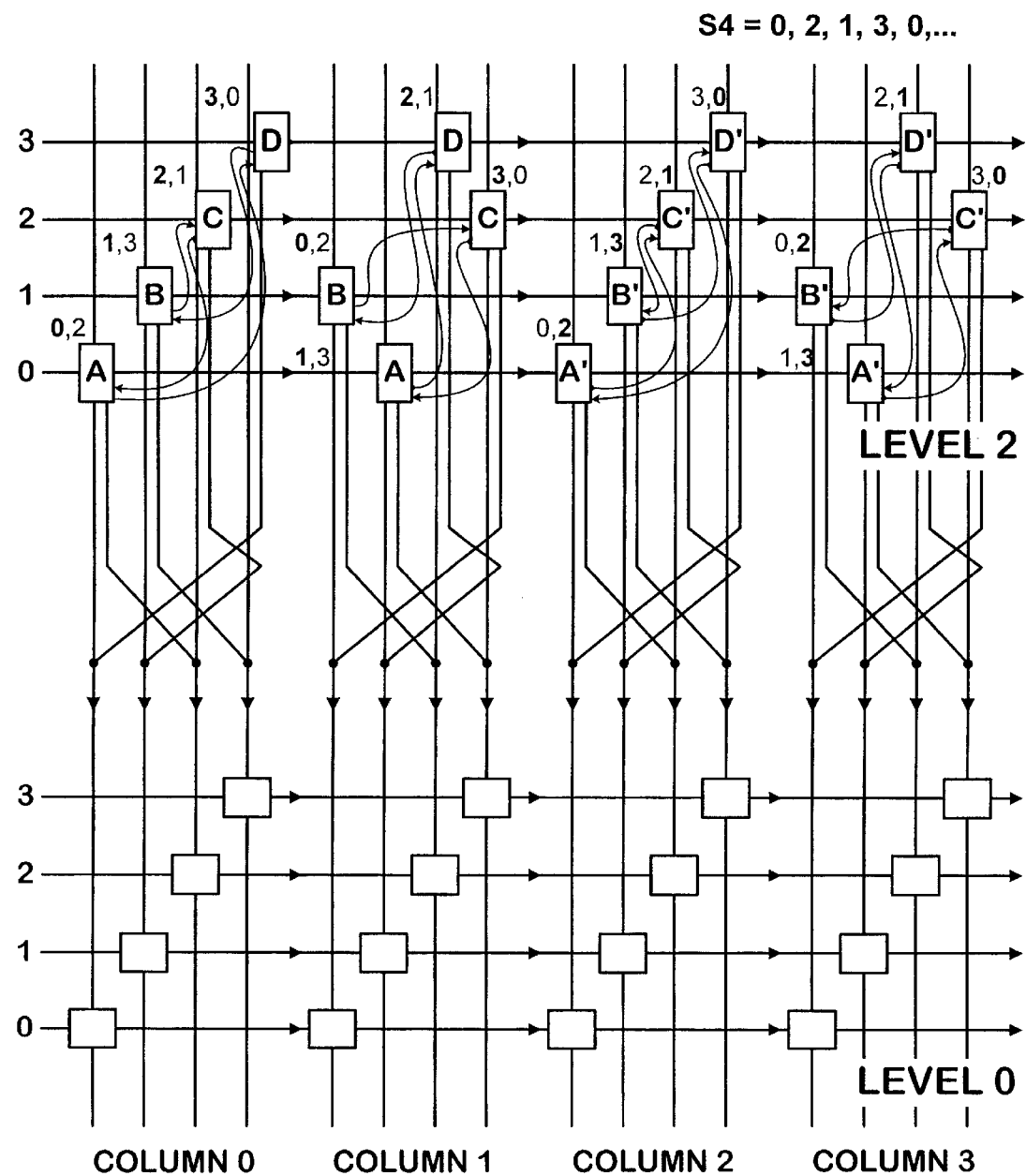
FIG. 20A is a block diagram showing a base-4, 4-row interconnect with cells connected at multiple columns and levels, and showing a technique for changing priority at successive columns for balanced traffic flow.

FIG. 20A shows how base-4 cells are connected within a node array and between levels. Cells at level 0 are laid out along the diagonal. At level 2 cell A is located at row-column-level position [0,0,2]. Cells on row 0 connect to the south in S4 translation sequence (0,2,1,3,0 . . . ), as indicated by a notation above each cell. The value shown in bold indicates which path has priority. Cell A shares the south connection to row 0 with cell D. Cell A has priority over cell D to use row 0. At column 0, level 2, cells are placed on the diagonal with the connection directly to the south having priority. At the next column, column 1, the next two positions of translation sequence S4 are effected, and translation sequence S4 repeats at subsequent columns. During the second repetition, the values that did not have priority in the first repetition are given priority. Examining the values shown in bold along a row shows relative priorities along a row. At level 2 when a message moves east through any two columns the message has an opportunity to descend to any of the four rows at level 0.

The method of laying out the cells at level 2 in node array begins at the first column where cells are placed along the diagonal. Referring to sequence S4 (0,2,1,3,0 . . . ), priority is assigned to the value that is the same as the row number. The next number gives the other row number of the pair in translation sequence S4. For example, cell A on row 0 is connected to the south to rows 0 and 2. Since 0 is also the row number of the cell, the 0 value has priority. At the next column, column 1, cell A employs the next two values in translation sequence S4: 1 and 3. The first value of the pair has priority. Similarly, the remainder of the cells at column 1 are placed following the rule of continuing translation sequence S4, and giving the first value priority. At the next column, column 2, translation sequence S4 is again continued, and since all four values of the translation sequence have been satisfied in only two columns the translation sequence is repeated again, but with reversed priorities. Cell A' on row 0, column 2 is connected to the south to rows 0 and 2, the same rows as cell A at column 0. However, message flow priories are reversed, indicated by the prime notation and the reversed direction of control signal arrows. The advantageous result is that a message moving east through four columns has opportunities to drop south to all four rows with priority, as well as an opportunity to reach any row if the message is not blocked from below and the other connected cell is not using the shared path. Translation sequence number S4 determines the interconnection of pairs of cells.

In the present example messages jump two levels, desirably eliminating odd-numbered levels. Two header address bits are examined and a cell has two of four paths available to the south. The number of levels and the amount control logic is reduced, advantageously reducing the travel time. In an illustrative control scheme two rows share a single message path to the south with equitable priority distribution. Base-4 cells are arranged in combination with other cells in the same node array and with cells to the west and south to attain a desired control and message flow. A message moving east in a base-4 embodiment advantageously has almost a doubled opportunity to move down the equivalent of two levels compared to a message moving east in a single-path embodiment.

Figure 20B:
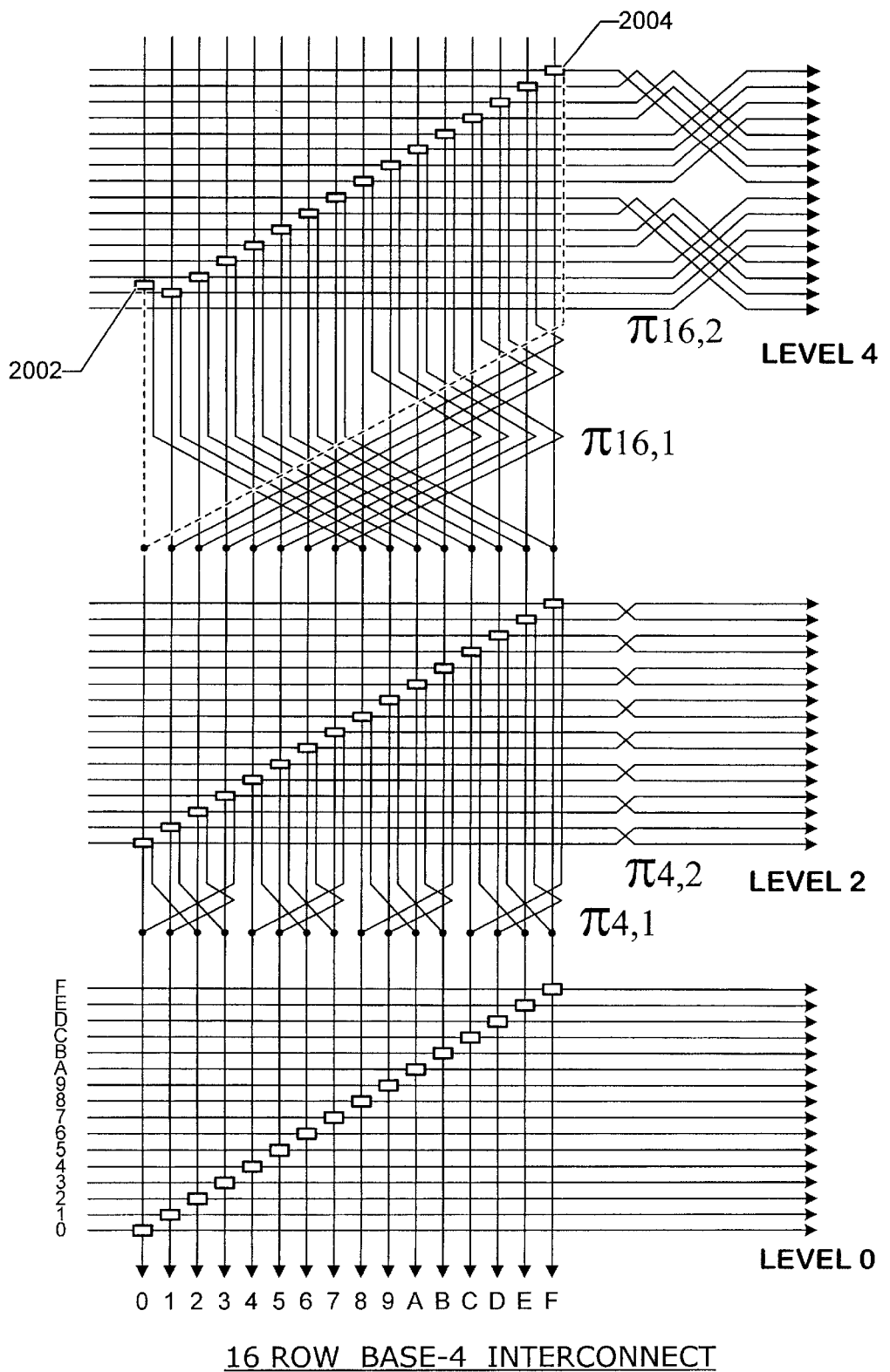
FIG. 20B is a detailed block diagram showing base-4 cells in one column of a 16-row interconnect and depicting translation sequences between levels and columns and the round-robin priorities among groups of cells.

FIG. 20B shows one column of 16-row, base-4 switch. A pair of cells that share a common path to the south communicate by a same-level control signal that connects cell 2002 to cell 2004. For simplicity, control signal connections are not shown. The layout of base-4 cells is given by placing the cells along the diagonal at each level. A permutation box of the proper size and degree is located to the east of the node array. The base-4 layout achieves two steps of the translation sequence and therefore the translation sequence is of degree 2. Permutation box $\pi 16,2$ is used at level 4, and permutation box $\pi 4,2$ is used at level 2.

The process discussed for FIG. 20A generates the layout of base-4 cells. For level 4, the interconnection pattern to the south is the same as given for permutation box $\pi 16,1$, rotated 90 degrees, and laid over the parallel vertical paths to the south. At the top level, priority among the 16 cells is round robin since all 16 cells are in the same list. Similarly, the interconnection pattern to the south of level 2 is the same as given for permutation box $\pi 4,1$ laid over the vertical connections to the south. At level 2 are four priority lists, similar to the condition shown in FIG. 19B.

The interconnect of FIG. 20B has the property that on level 2 the cells can be grouped into groups of four to form nodes of the type illustrated in FIG. 19B. However, each set of FIG. 20B level 4 nodes is connected to control interconnect lines to other nodes on level 4. Therefore, the nodes in level 4 cannot be decomposed into groups of four to form nodes of the type illustrated in FIG. 19B. The nodes in the 16-row base-4 interconnect illustrated in FIG. 20C can be grouped into sets of four to form nodes of the type illustrated in FIG. 19B. Many choices can be made for the permutations used in the interconnects. The three permutations $P_4$, $Q_4$ and $R_4$ are used between columns of switch arrays. Permutation S4 may optionally be used to improve throughput. When used, the permutation $S_4$ is used only every fourth time. The rows in level 2 are divided into four groups of four rows each. Messages traveling on rows 0, 1, 2 and 3, and for the other three groups of rows, can exit only through output ports at height 0, 1, 2 and 3. The permutation $P_4$ is designed so that each four-cell node is capable of sending data to each of the four groups of rows on level 2.

Figure 20C:
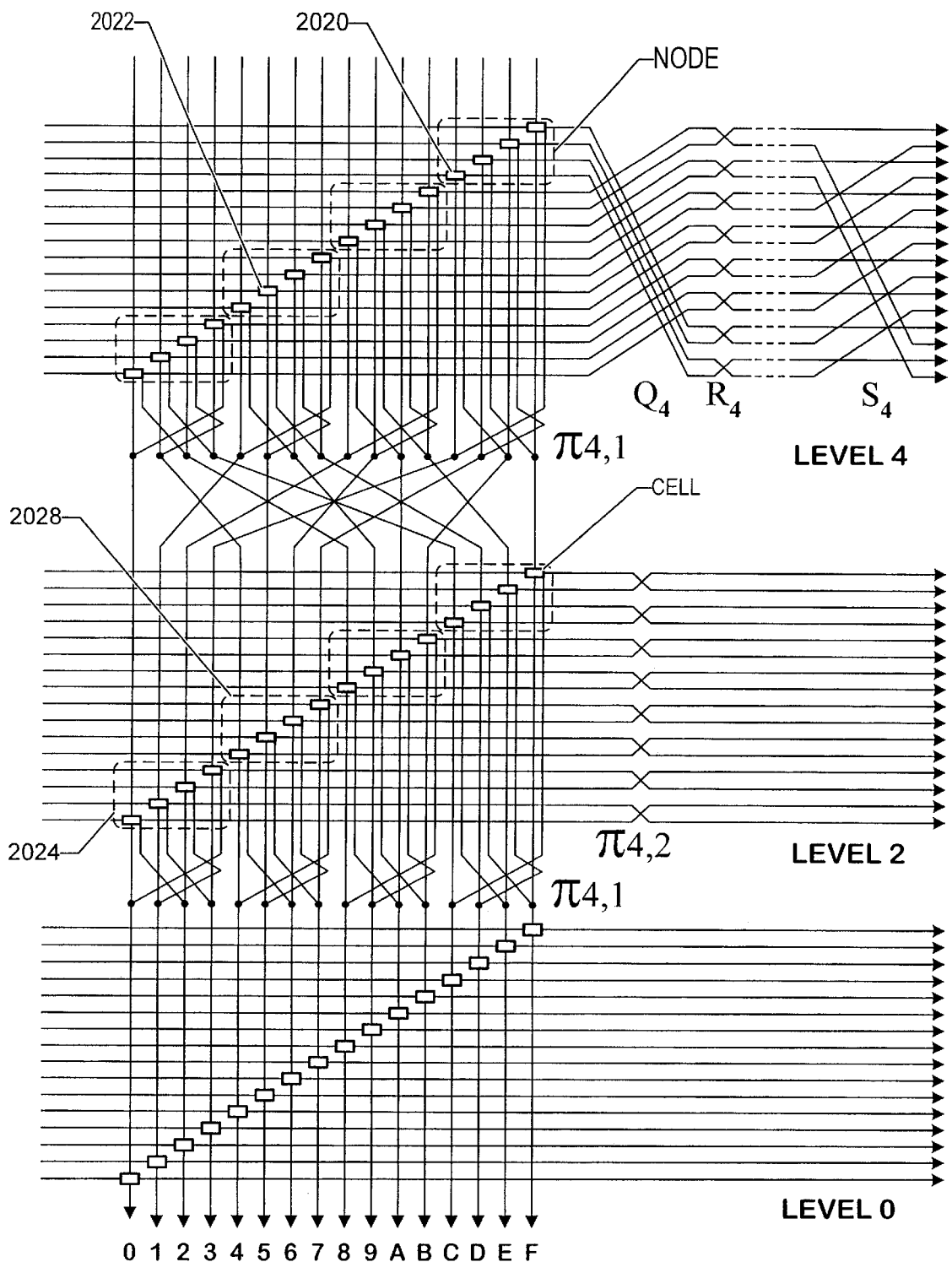
FIG. 20C is a detailed block diagram showing one column and three levels of an embodiment of a base-4 interconnect.

Referring to FIG. 20C, a leftmost cell of a node 2020 on level 4 sends data to the leftmost node 2024 on level two. A cell second from the left 2022 sends data to node 2028 second from the left in each column of level 2. The pattern continues for each of the four nodes on level 4. The permutation $Q_4$ guarantees that no message on level 2 is capable of blocking messages from the same level 4 nodes in consecutive time steps. The permutation $R_4$ guarantees that no level 4 message is in position to block a second level 4 message in consecutive steps. The permutation $S_4$ further reduces contention between messages remaining on the same level for four or more time steps.

The patterns can be continued to make larger interconnect structures using four-cell nodes. An interconnect structure with 64 rows on each level uses permutations $P_6$, $Q_6$, $R_6$ and $S_6$ defined as follows: The leftmost node on level 6 has four output ports connected to rows 0, 16, 32 and 48 on level 4. The node next to the leftmost node has output ports connected to rows 1, 17, 33 and 49. This process continues so that the nth node from the right has output ports connected to rows 0+n, 16+n, 32+n, and 48+n. The permutation $Q_6$ is such that the bottom 60 rows r are taken to row r+4 and the top four rows r are taken to row r−60. The permutation $R_4$ swaps even and odd rows and the permutation $S_4$ takes the bottom 30 even numbered rows r to row r+4, takes the top two even numbered rows to rows R−60 and leaves the other four rows fixed. The wiring patterns that produce permutations $P_4$, $Q_4$, $R_4$ and $S_4$ are repeated four times at the 64-row level 2.

The process continues so that a structure with 256 rows on each level has the four output ports of the leftmost node connected to rows 0, 64, 128, and 192. In general, a structure with $4^P$ rows on each level has the leftmost node of the top level connected to rows 0, $4^{P-1}$, $2 \cdot 4^{P-1}$ and $3 \cdot 4^{P-1}$ on the next level down, and a node n to the right of the leftmost node on the top level is connected to rows 0+n, $4^{P-1}$+n, $2 \cdot 4^{P-1}$+n and $3 \cdot 4^{P-1}$+n on the next level down.

Many other different permutations also work effectively. One way to produce good permutations is to generate random permutations with the desired connections to the next column and lower level, and score the various permutations by simulating traffic through the structure.

Figure 21A:
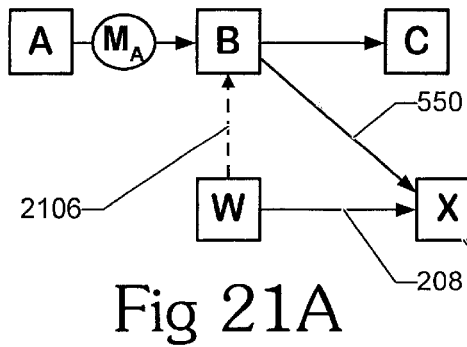
Figure 21B:
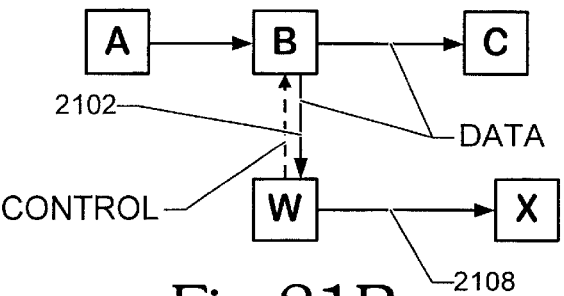

In many examples of the interconnect, a cell transmits data to one cell on the same level and to one cell on a lower level as depicted in the topology shown in FIGS. 21A and 21B in which not all connections are shown at all nodes. In the simplest example of the network, each node has two data input ports, two data output ports, one control line input port and one control line output port. A node contains exactly one cell. Cells W and X are on a lower level than cells A, B and C. The cell A is in a first column, cells B and W are in a second column, and cells C and X are in a third column. In the most basic example, a node or cell is not allowed to receive more than one message at a time. In FIG. 21A, cells B and W are both capable of sending data directly to cell X. A priority relationship exists between cells B and W for sending data to cell X, such that cell W has priority over cell B for sending data to cell X. When cell W sends data to cell X, cell W also sends a control signal 206 to cell B indicating that cell W has sent data over path 208 to cell X. In examples where a cell X can receive only one message at any given time and cell W sends a message to cell X, then cell B cannot send a message to cell X. When a message $M_A$ arrives at cell B, the logic at cell B examines the header of message $M_A$ to determine whether cell X is on a path from cell B to the target of message $M_A$. Cell B sends the message $M_A$ to cell X only if both of the following two conditions are satisfied: (1) a path exists from cell B to a target of message $M_A$ through cell X, and (2) the cell X is not blocked from receiving data from cell B. The logic at a cell uses header information in message $M_A$ along with the control signal from cell W in order to determine where to send message $M_A$.

In FIG. 21A, the message interconnect line 550 from cell B to cell X, the message interconnect line 208 from cell W to cell X, and the control interconnect line of control signal 2106 from cell W to cell B are all separate lines. The configuration introduces two different schemes for carrying data to B. In one of the schemes, illustrated in FIG. 21B, the message interconnect line from cell B to cell X passes through the cell W. In this way, cell B sends data to cell X using the same message interconnect line 2108 that cell W uses to send data to cell X, so that data from cell B to cell X first travels from cell B to cell W on path 2102, and then from cell W to cell X on path 2108.

Figure 21C:
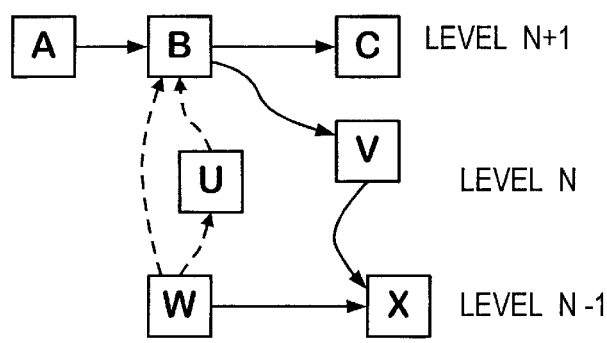
Figure 21D:
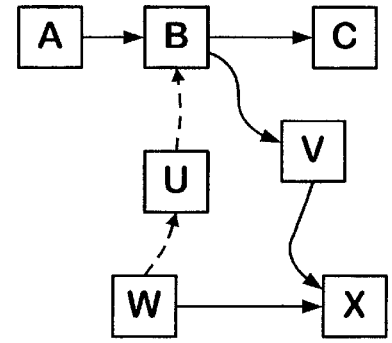

One having ordinary skill in the art can envision other schemes for the placement of the message interconnect lines and the control interconnect lines that support transmission of a message from either cell B or cell W to cell X, and where one cell has priority over others. For example, FIG. 21D illustrates a message interconnect line from cell B to cell X that passes through the cell V, and the control interconnect line from cell W to cell B passes through the cell U. Further, the control interconnect line can pass through a plurality of cells. In FIG. 21C, cell W sends one control signal to cell B and one control signal to cell U. The control signals may or may not be equal. The control signal from node U to node B may or may not depend on the control signal from node W to node U. The physical placement of the message interconnect lines and control interconnect lines is not critical. However among the cells that send data to a given cell X, a priority relationship exists for sending data to cell X so that a cell W has priority over a cell B for sending data to cell X. The method uses control signals for enforcing priority. The control signal is unlike the handshaking used in other networks: the cell B does not need to know the status of cell X to send a message to X. Instead, cell B uses information about the status of cells distinct from cell X to determine where to send messages. In fact, control signals indicating the status of nodes distinct from cell X could pass through cell X. The paths that the control signals take is not important. The control signal can be, with substantially the same functionality, a separate signal or part of a message. Efficiency and throughput improvements are gained by the described method of generation of the control signals, the content of the control signals, and the topology of node interconnections.

The priority-based-on-position method is used in an advantageous way. Since the cell W is on a lower level than cell B, messages at cell W have probably been in the network longer than messages at the cell B. The method is correlated with how long messages have been in the network, and desirably gives priority to older messages. The method also enables implementation of the advantageous property that a free path out of a cell always exists for a message, and that the free path is always on a route to the message output port(s). Moreover, since each message interconnect line from a cell B either leads to another cell C on the same level, or to a cell X on a lower level, messages never "lose ground" in progress to targeted output ports. These desirable features can be embodied in a large collection of varying interconnections.

Figure 21E:
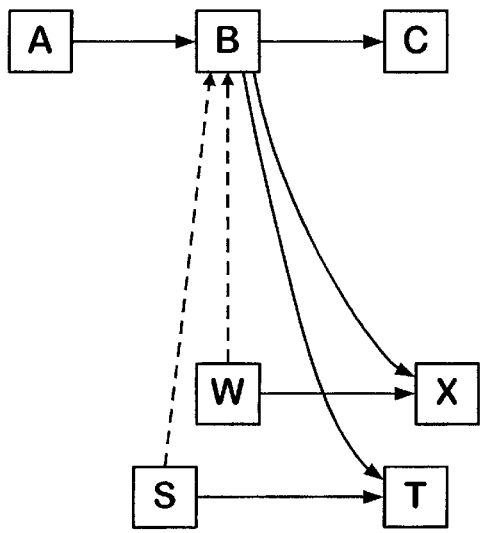
Figure 21F:
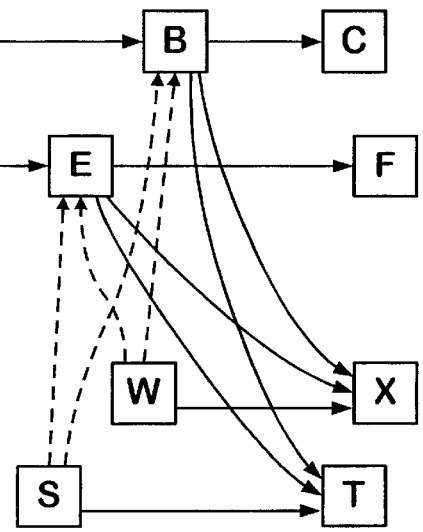

In an alternative collection of embodiments, each cell transmits data to one or more cells on the same level and to two or more cells on a lower level. FIG. 21E illustrates a part of a circuit with a control cell B having data transmission lines to cells C, X and T. Cell W has priority over cell B to send data to cell X, and cell S has priority over cell B to send data to cell T. Control interconnect lines extend from cell W to cell B, and from cell S to cell B, to enforce priority. FIG. 21F expands on the illustration of FIG. 21E by adding the cells E, D, and F at the same level as cell B. The additional priority relationships for the added control cells are: cell W has priority over cell E to send data to cell X, and cell S has priority over cell E to send data to cell T. Other control interconnect lines extend from cell W to cell E and cell B, and from cell S to cell E and cell B, to enforce the priority relationships. A number priority assignments assign priorities between cell B and cell E to send data to cell X and cell T, including the following four assignments:

(1) cell E has priority over cell B to send data to both cell X and cell T, (2) cell B has priority over cell E to send to both cell X and cell T, (3) cell B has priority over cell E to send data to cell X, and (4) cell E has priority over cell B to send data to cell T.

Figure 21G:
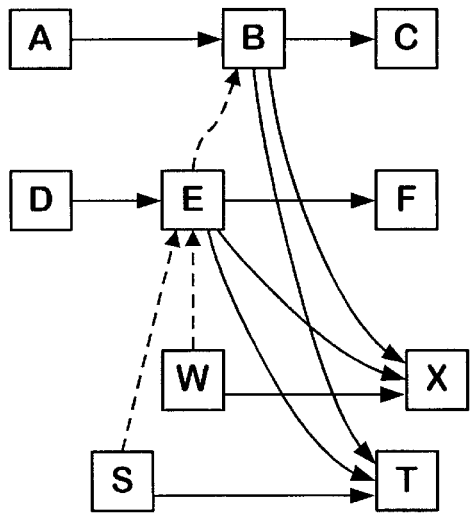

In case (1) where cell E has priority over cell B to send to cell X and cell T, a control interconnect line from cell E to cell B is added. FIG. 21G illustrates an alternative example where the control interconnect lines from cell W and cell S pass through cell E. Logic associated with cell E can modify the control signals passing through cell E, or cell E can be passive in this respect and leave these signals unchanged. The control signal from cell E to cell B indicates the availability of a path from cell B to cell X, the availability of a path from cell B to cell T, the availability of both paths, or the availability of neither path.

Referring to FIG. 21G, cells B and E are on the same level. For a cell N of the interconnect structure, P(N) is used to denote the set of output ports that are accessible from cell N. In many embodiments of the interconnect structure, output ports P(B) accessible from cell B are the same as the output ports P(E) that are accessible from cell E. Output port sets P(S) and P(W) do not intersect, and the set P(B) is the union of the sets P(S) and P(W). As message $M_A$ moves south from level to level, the set of output ports that are accessible by message $M_A$ is reduced until eventually the target row is reached. The message moves one column to the right. A large number of cell to-cell interconnect topologies share these properties, including the topologies illustrated in FIGS. 21A through 21N. Interconnection, priority, and control properties distinguish the illustrative interconnect structures from conventional networks, not the specific circuit topologies of cells and nodes alone. For example, the circuits of FIG. 21F through 21L are physically or topologically different, but functionally similar.

Figure 21H:
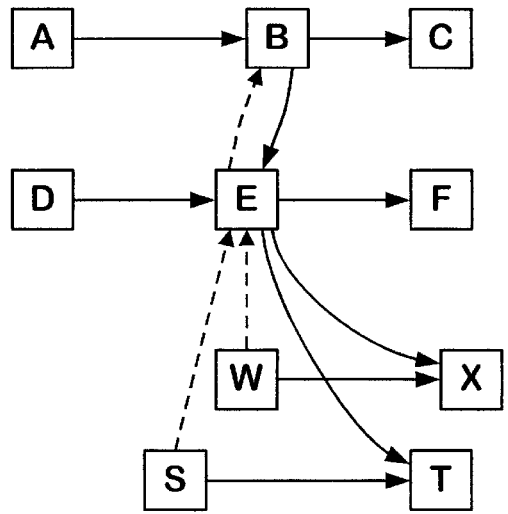
Figure 21I:
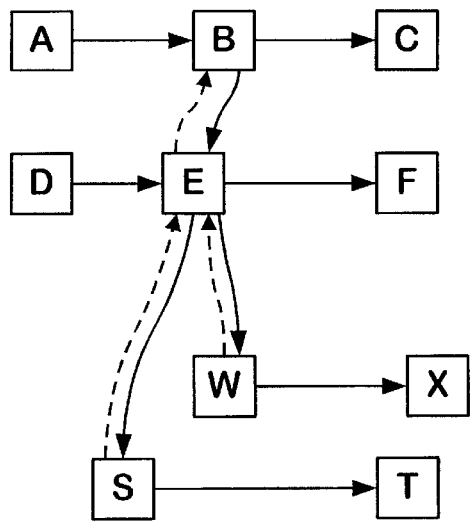
Figure 21J:
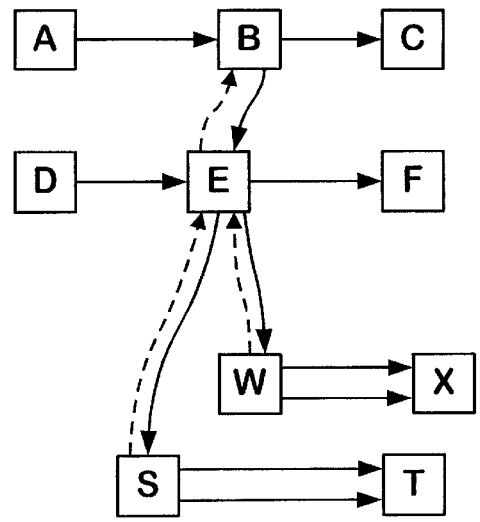

In many examples disclosed herein, cells are not allowed to accept two messages as input signals in the same time period. In these cases, a number of logically equivalent ways are used to allow the sharing of message interconnect lines. FIG. 21H illustrates one example that allows messages from the cell B to cell X or cell T to pass through the cell E. Alternatively, FIG. 21I illustrates a message interconnect link from cell E to cell X passing through cell W, and a message interconnect link from cell E to cell T passing through cell S. The interconnect structure shown in FIG. 21J is functionally equivalent to the structure shown in FIG. 21H except that a message moving down from cell E to cell T first passes through cells S and W, respectively, and advantageously uses only horizontal and vertical lines in an electronic layout. The circuit of FIG. 21J compared with the circuit in FIG. 21I advantageously allows two messages to enter each of the cells T and X. A diagonal construction can be replaced with a connection path that passes through the cell below in the same column, plus a second horizontal path to the next cell, as shown in FIG. 21J.

Figure 21K:
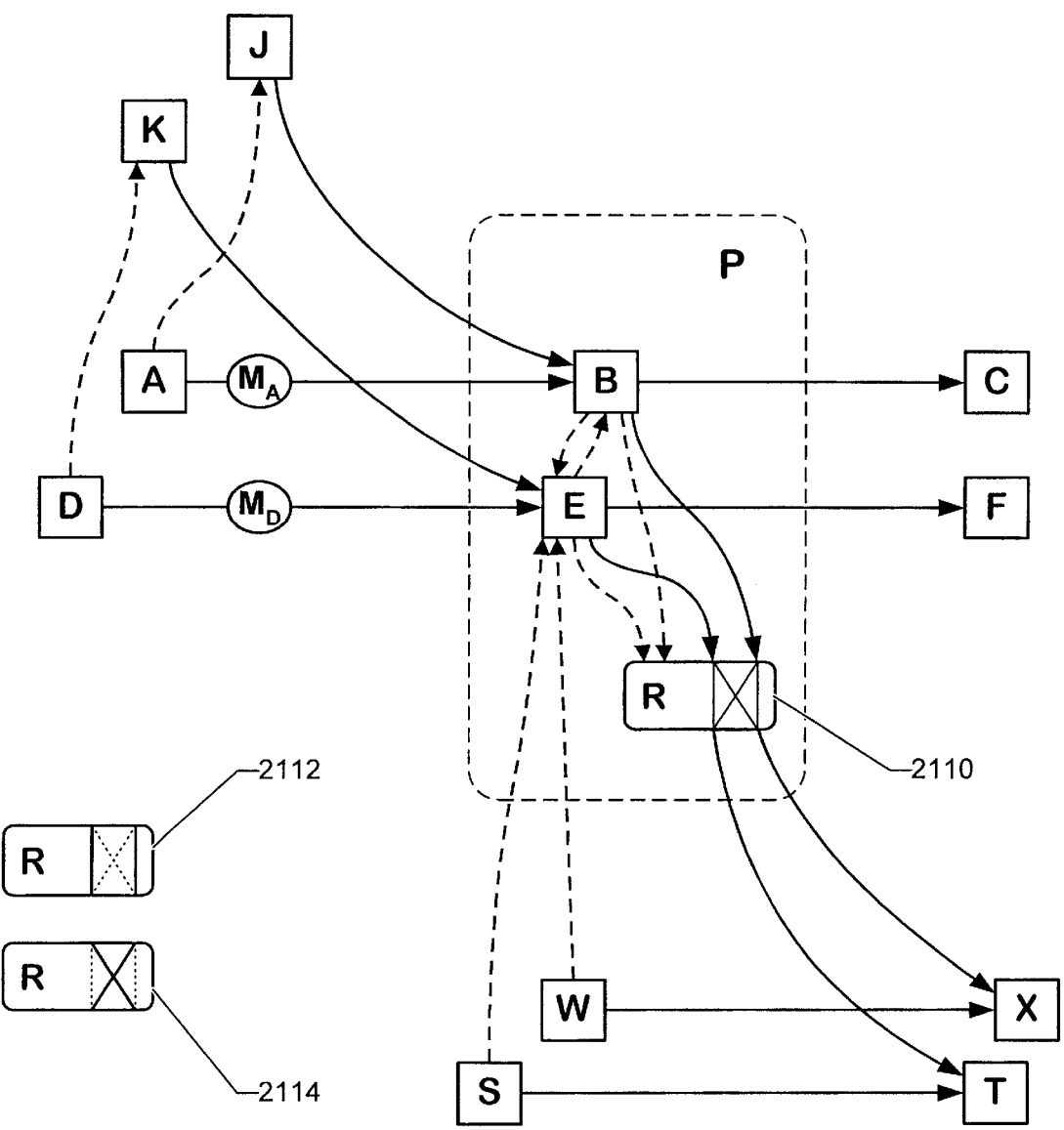

FIG. 21K illustrates another example where messages from cell B or cell E destined to cell X and cell T pass through a 2×2 switch R 2110. The switch is set in the bar 2112 or cross 2114 position by cells E and B. The case where cell E has priority over B to send to cell X and T is equivalent to cell E having priority over cell B to set the switch R. The control and priority logic is as follows. Cells W and S inform cell E if either cell X or cell T is blocked from receiving a message from cells B or E. If a message $M_D$ is arriving at cell E, the header of message $M_D$ is examined to determine which of cells X and T is on a path from cell E to the target of meesage $M_D$. If the cell on the path is not blocked from receiving message $M_D$, then cell E sets the switch R to send message $M_D$ down the correct path to the message target. If the correct path is blocked, then message $M_D$ is sent to cell F, and control of switch R is passed to cell B. Similarly, control over switch R is also given to cell B in the event that no message arrives at cell E. If cell E sets the switch R so that message $M_D$ can move down to another level toward the target, and a message $M_A$ is present that can pass through the switch in this configuration toward a target, and both cells X and T are not blocked, then messages $M_A$ and $M_D$ move down through switch R towards the targets designated by the message headers of messages $M_A$ and $M_D$. This is the only condition under which cells B and E can send messages down to the next level at the same time. The control signal from cell E to cell B indicates the availability of an open path to cells X and T, and whether cell B has the right to set switch R. If the control signal from cell E to cell B indicates that cell B has the right to set the switch R, and a message $M_A$ arrives at cell B, then cell B examines the header of $M_A$ to decide which of cell X and cell T is on a path to the target of message $M_A$. If the cell on the path is not blocked, then cell B sets the switch R to cause message $M_A$ to continue toward the destination and sends message $M_A$ down to the next level. When the cell on the next level down is blocked by either a message from cells S, W, or E, then message $M_A$ is sent to cell C. Since cell B has top priority to send to cell C, the path is always available. Moreover, the number of hops from cell C to the message's target row is the same as the number of hops from cell B to that same row.

FIG. 21K also illustrates an alternate priority scheme where cell B has priority over cell E to send messages to cell X, and cell E has priority over cell B to send messages to cell T. In the priority scheme the switch R is set in the bar position 2112 whenever a message can pass through toward a target. If no message can be properly sent down to the next level with the switch in the present position, then the switch is set in the cross position. Therefore, the priority for one switch position over another, the bar versus the cross in this case, is equivalent to the priority of cell B over cell E sending to cell X, and cell E over cell B sending to cell T. Cells B and E exchange control signals in the priority scheme. The control interconnect lines and message interconnect lines may be laid out in a plurality of ways to implement the logic.

Figure 21L:
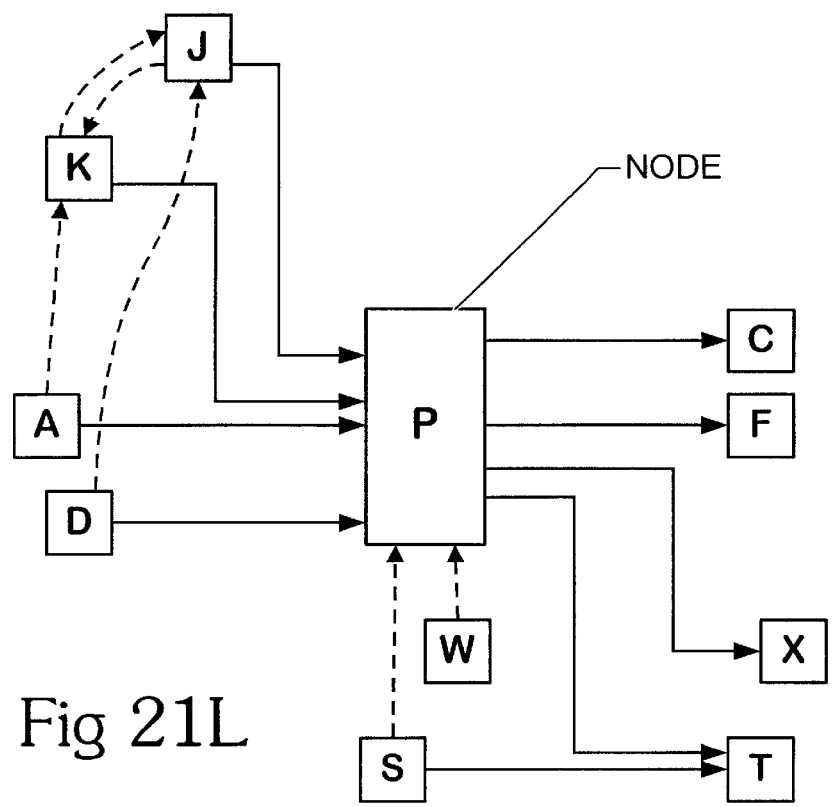
Figure 21M:
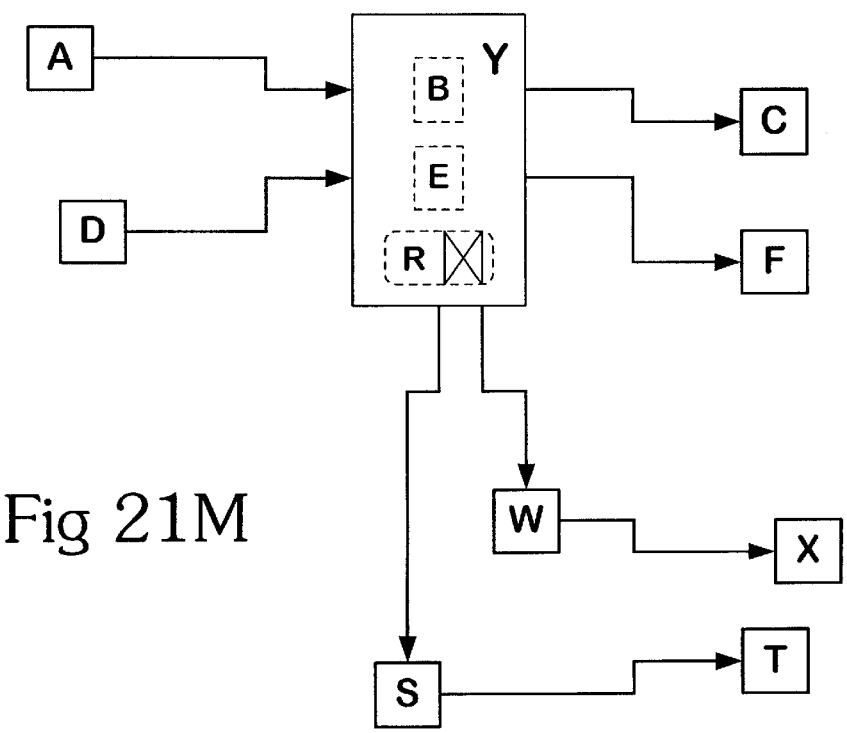
Figure 22A:
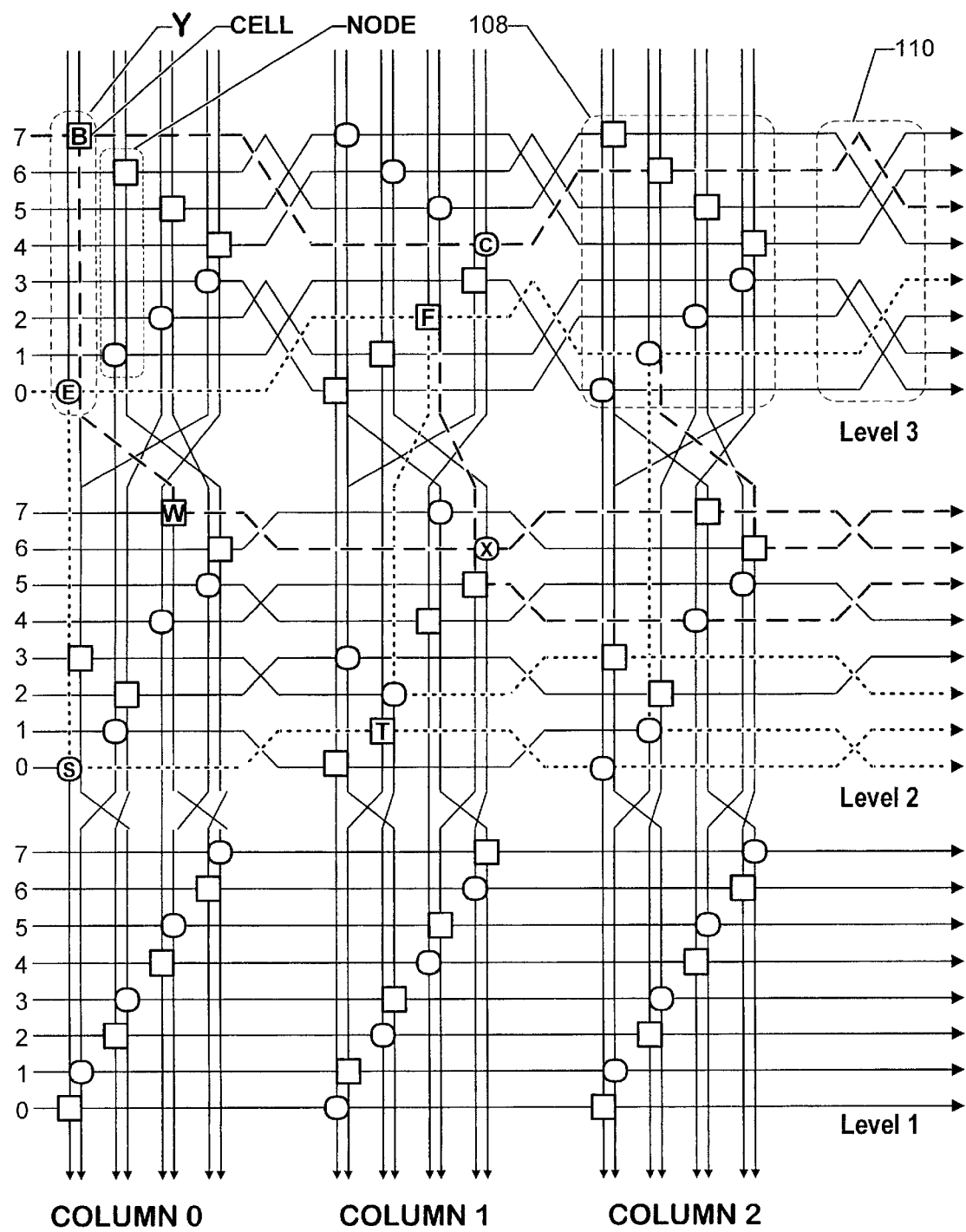
FIG. 22A is a detailed interconnect diagram showing an embodiment that uses 2-cell nodes with a rich set of connection paths through the interconnect. Multiple paths originating from a same node efficiently reach any target row with paths diverging to eliminate hot spots.
Figure 22B:
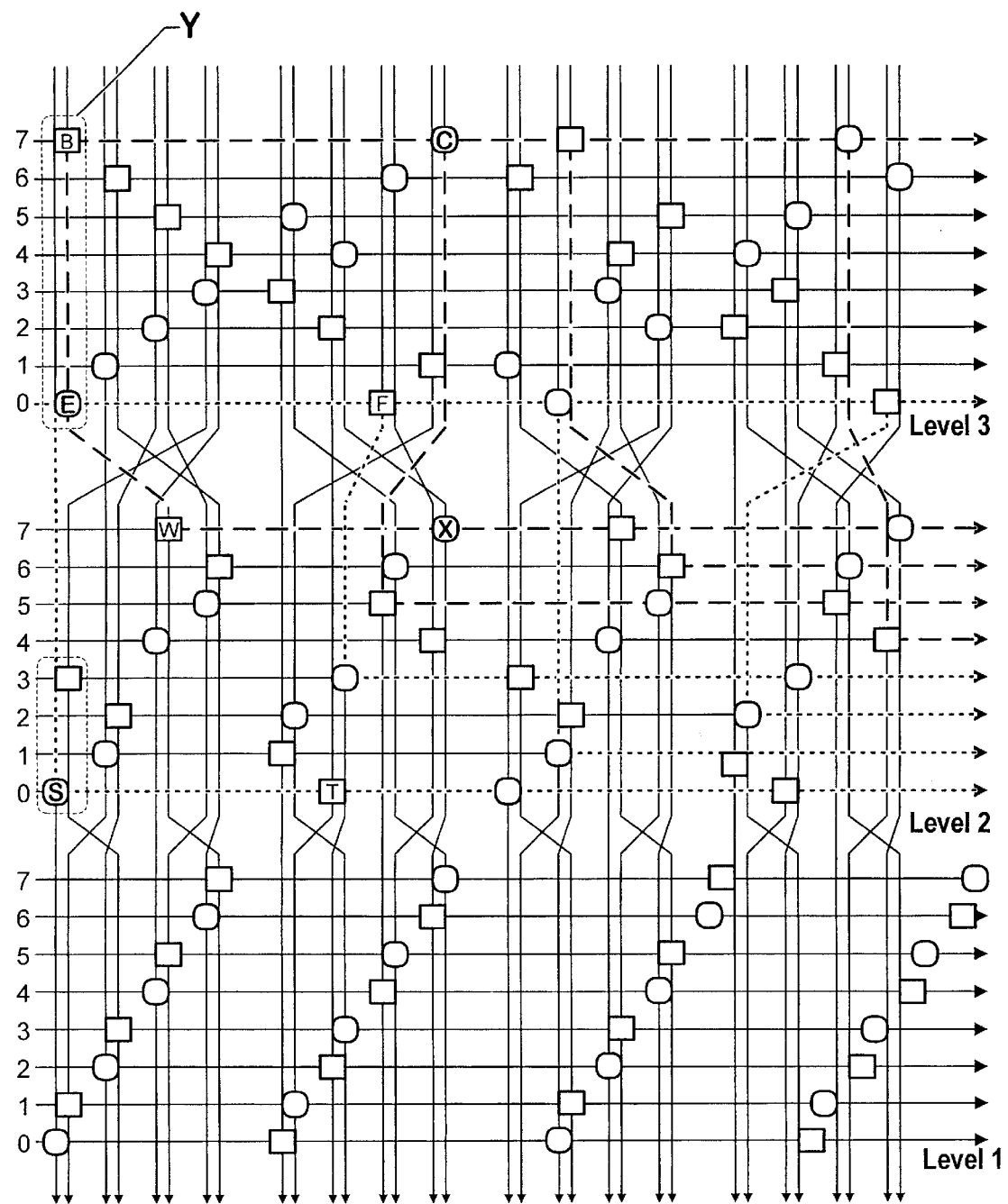
FIG. 22B is a detailed interconnect diagram showing an example of an 8-row, 4-column interconnect using 2-cell nodes with multiple paths extending from input terminals to output terminals. Messages originating from a same node have multiple paths to any output with the paths diverging to eliminate hot spots.
Figure 23:
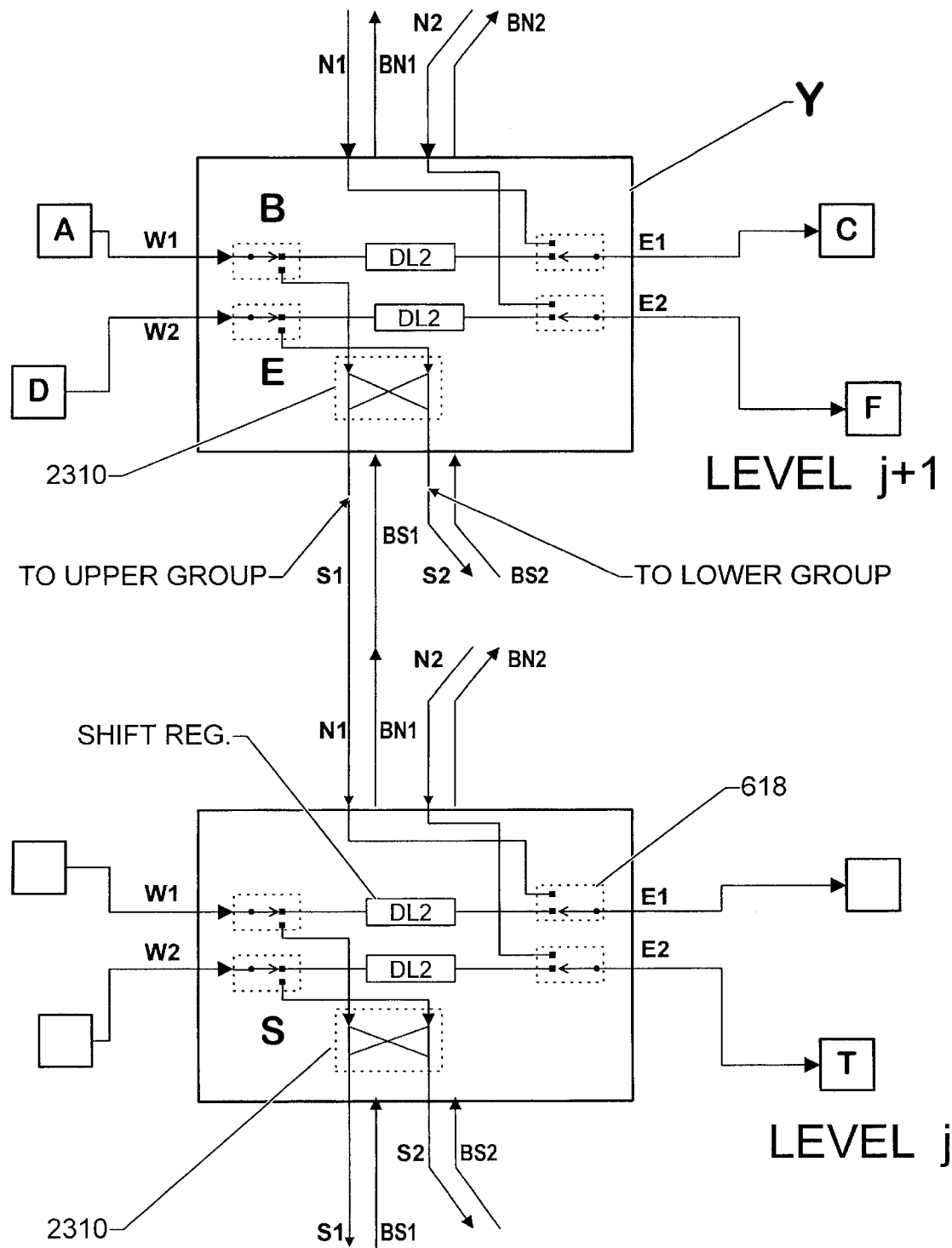
FIG. 23 is a schematic block diagram illustrating two-cell nodes, message wormholing through the nodes, and connections of the nodes by data and control signal paths at two levels.

For the two-cell nodes illustrated in FIGS. 22 and 23, the two cells B and E and the switch R are advantageously combined into a single node P as is illustrated in FIG. 21L. The cells B and E each had two input ports and two output ports, the combined node P has four input ports and four output ports. Priority for sending messages to a given node's input port depends not only on the position of the sending nodes but also upon which input port of the node P a message enters. FIG. 21M illustrates a node Y which is formed from the cells B and E of the circuit shown in FIG. 21I, with the addition of a switch R to provide connection paths from cells B and E to cells T and X. An advantage of the node Y is usage of relatively few logic gates compared with the richer internal structures discussed hereinbelow. Another advantage of the node Y is an improved throughput efficiency in comparison to operation of single-cell nodes such as is illustrated in FIGS. 21A and 21B. The node Y is essentially as good a performer as other two-cell nodes. In FIGS. 1B, 1C, 21K, 21L, 21M, and others, data moves diagonally down to cells in the next column.

In addition to combining the logic of the two smaller cells into a more efficient computation unit, the interconnect structure in the larger node can desirably be richer than the interconnect structure of a combination of the smaller cells. Whereas the structure shown in FIG. 21K does not support a message travelling from cell K to cell C, from cell D to cell C, from cell A to cell F, or from cell J to cell F, those connections could be made in the node P of FIG. 21L. Advantageously, node P has the ability to switch any of the four input lines to any of the four output lines. In another embodiment, control lines inform cell J of the status of cells D, A and K, and inform cell K of the status of cells A, D and J. The node P is always able to accept up to two messages at a time because two guaranteed unblocked paths exist from node P to cell C and cell F. As before, cells A and D have priority over cells K and J to send messages to node P. An additional priority relationship exists between cells K and J. The richer node P of FIG. 21L has an advantage over the cells B and E of FIG. 21K in that circumstances exist when messages are able to progress down to a lower level, whereas the messages would remain on the same level in the circuit of FIG. 21K. For example, if messages are present at nodes D and K but not at nodes A and J, then both of the messages would be able to enter node P, but only the message at node D would be able to enter the cell E of the structure shown in FIG. 21K.

Figure 21N:
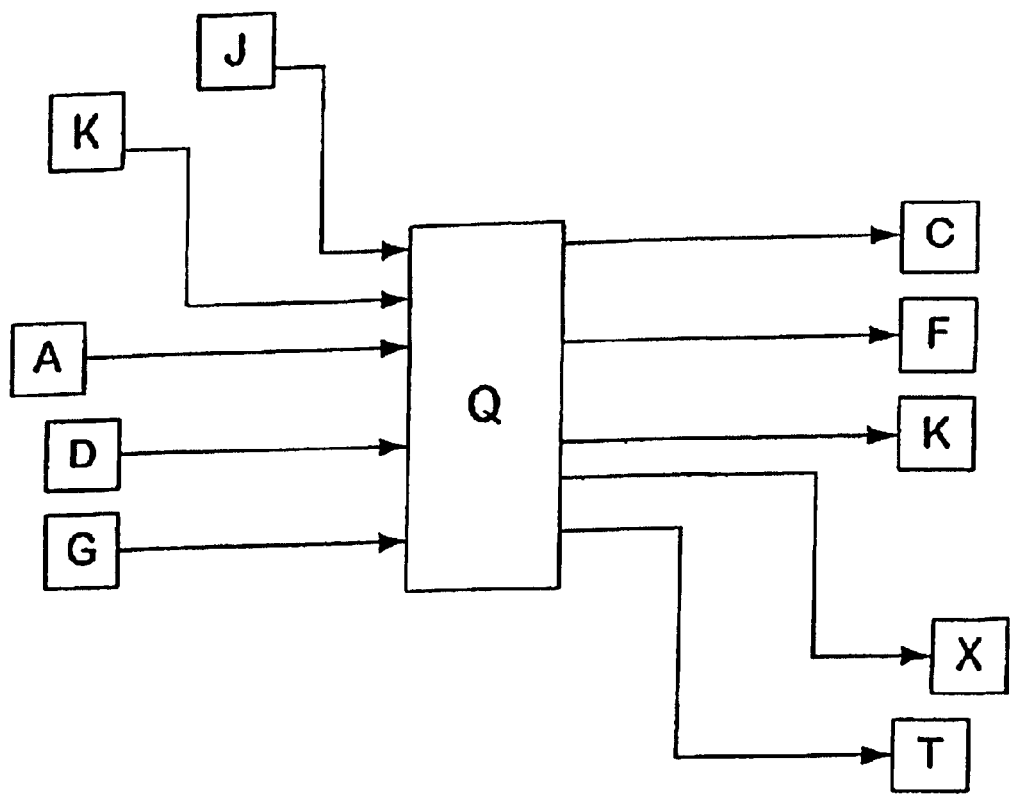

Combining the two smaller cells B and E shown in FIG. 21K yields the richly connected node shown in FIG. 21L. Once the cells are combined, the internal interconnect structure and logic of the node can be advantageously enlarged and enriched in a number of ways. For example, more than two interconnection lines can be inserted between nodes on the same level. FIG. 21N illustrates a node Q with five data input lines and five data output lines. Three of the data output lines go to nodes on the same level and two of the data output lines go to nodes on a lower level. The three data output lines from the node Q can go to three separate nodes C, F and K, as illustrated in FIG. 21N, or two or more of the lines can be directed to the same node. For example, all three of the lines from node Q could be connected to node C so that message interconnect lines can be buses that carry several messages in parallel. The buses can be parallel connections, such as electronic buses, or can be a single optical fiber carrying multiple messages using time or wavelength division multiplexing. Buses are discussed in more detail hereinafter.

The priority-based-on-position scheme can be combined with other priority schemes. For example, information in the header, such as a priority bit or a QOS field 332, advantageously gives a higher or lower priority to a message competing with other messages for the same set of output ports. FIG. 21L illustrates the a circuit where messages at nodes A and D have priority over messages at nodes K and J, but the priority between competing messages at nodes K and J, can be based on a priority field in the header. The same technique can advantageously be used in the node P so that for two messages in node P that both are destined for node X, then the message with the higher priority wins. The priority indicated in the header can be set before the message initially enters the switch, or can be an indicator of the duration the message has been in the switch, or can be based on application-related factors. Still another technique is to allow certain priorities to be based on position, and other priorities to be assigned randomly at different times. Randomizing has the advantageous property that certain undesired flow patterns cannot develop in the interconnect.

The sub-circuit illustrated in FIG. 21B was introduced in U.S. Pat. No. 6,289,021. Once again, the nodes W and B are both capable of sending data to node X. The logic associated with node B uses information concerning the routing of messages through node W to route messages through node B to node X. The information is passed through the control information-carrying line between nodes W and B. The only use of the control information-carrying line is to send control information from node W to node B. The node W is capable of sending data directly to node X. The node B sends data indirectly to node X through node W on line 205. Although node B has the ability to send data through node X, node B is not able to send data directly to node X, so that node W is not able to change the course of data from node B that passes through node W. The design advantageously uses data-carrying line 208 from node W to node X to carry messages sent from node W to node X, and also carry messages sent from node B to node X.

The sub-circuit illustrated in FIG. 21B was introduced in U.S. patent application Ser. No. 09/009,703. Once again, the nodes W and B are both capable of sending data to node X. The logic associated with node B uses information concerning the routing of messages through node W to route messages through node B to node X. The information is passed through the control information-carrying line between nodes W and B. The only use of the control information-carrying line is to send control information from node W to node B. The node W is capable of sending data directly to node X. The node B sends data indirectly to node X through node W on line 205. Although node B has the ability to send data through node X, node B is not able to send data directly to node X, so that node W is not able to change the course of data from node B that passes through node W. The design advantageously uses data-carrying line 208 from node W to node X to carry messages sent from node W to node X, and also carry messages sent from node B to node X.

FIG. 22A is a block diagram of an example of an 8-row, 3-column interconnect structure containing two-cell nodes, such as the node illustrated in FIG. 21M. The interconnect structure includes a node array 108 and a permutation box 110 at each column. Node Y contains two cells E and B. Starting at the top level (level 3), each node Y includes two cells, one cell chosen from rows 0, 1, 2, and 3, and one cell chosen from among rows 4, 5, 6, and 7. At the next lower level, a node includes two cells such that either: (a) one of the cells is chosen from rows 0 and 1, and one of the cells is chosen from rows 2 and 3, or (b) one of the cells is chosen from rows 4 and 5, and the other cell is chosen from rows 6 and 7. Because permutation boxes are used between all columns, the same layout is used in all node arrays at a given level. Because each two-cell node at level 1 is connected to two output ports the two-cell interconnect does not need or use a level 0. A message moving horizontally along a row at level 1 is directly connected to both ports. Alternatively stated, the level 1 node examines the header least-significant bit 310 and routes the message to the target output port.

Cells on the same vertical path are part of the same two-cell node, Y. Cells that have priority are shown as rounded. Two messages entering level 3 at cells E and B, respectively, may compete for the same path to the south, that is, both messages might be targeted to the same group but the message at E has priority. At the next column the priority is reversed. A dashed line indicates that a message starting at cell B, which does not have priority, moves to cell C where the message gains priority, and then loses priority at the next column. Similarly, a dotted line indicates that a message starting at cell E, which has priority, moves to cell F where the message loses priority and advantageously does not compete with a message from B. The drawing shows that priority alternates as a message moves along a row, and that messages move out of each other's way. The respective dashed and dotted lines show that messages entering node Y at E and B desirably do not compete again at the next column. The message at cell E moves to cell F, and cell B moves to cell C, where cell C and cell F are not in the same node. Multiple paths exist from any input port to any output port. Messages originating from a same node utilize the multiple paths to reach targets. The paths desirably diverge from each other, eliminating repeated contention between messages, and preventing hot spots within the interconnect.

Translation sequence S4 (0,2,1,3,0 . . . ) defines the height of a message moving horizontally beginning at row 0 at level 2. For a message M having a first bit that moves from cell E located at row 0 of level 3, column 0, to cell F located at row 2 of level 3, column 1, and then continues to move on level 3. The first bit of the message progresses from height 0 to height 2, then to height 1, and so forth so that the first bit moves along the sequence of heights (0, 2, 1, 3, 0, 2, 1, 3, 0, . . . ). Notice that cell E is connected downward to cell S at row 0 of level 2, column 0. Cell F is connected downward to cell T at row 1 of level 2, column 1. Continuing the process as the first bit of message M moves across the top level of the switch, the message is connected downward to cells on level 2 on rows (0, 2, 1, 3, 0, 2, 1, 3, . . . ), as indicated by the dotted lines. Additionally, as the message M moves across level 3, the message is connected downward to nodes on level 2 at heights in the sequence (7, 4, 6, 5, 7, 4, 6, 5, 7, . . . ), as indicated by the dashed lines. Therefore, a message at any column at the top level advantageously has a connection to both the upper and lower groups at the next level, and the desirable properties of the permutation boxes are achieved. At each cell an unblocked message always has a connection down to the target designated by the message header.

FIG. 22B shows an alternate layout that is essentially equivalent to that shown in FIG. 22A, but has the permutation boxes removed. Elimination of permutation boxes desirably reduces the amount of silicon and metallization. The effect of the inter-column translation sequences is achieved by the particular placement of cells along the rows.

A message moving through four columns at level 3 advantageously has connections down to all of the eight rows at level 2. FIG. 13B shows a racetrack floorplan that makes maximum use of chip space and minimizes the maximum cell-to-cell connection distance.

The discussion of FIG. 4A expressed that an unblocked message moving through interconnect 100 encounters, on average, 1.5 cells per level. A message randomly encounters a cell and has a 50% chance that the message does not have a downward connection to the message target. Undesirably the message must frequently move to the next column. To decrease the time-of-flight of a message, a two-cell node Y desirably has connections to upper and lower groups. Referring to FIG. 23 a two-cell node contains two cells E and B that are each capable of connecting to an upper and lower group. Node logic examines both input signals from the west W1 and W2 to determine the direction of each message that may be entering. The two-cell nodes contain 2×2 switches 2310 that can route a message from either of the two input ports to either of the two connections to the south S1 or S2. The node additionally examines control signals from the south to determine if a path to the desired group is available.

When two messages from the west compete for the same available group via a path to the south, one message has priority. Priority is usually determined by the location of a cell in relation to other cells at the next column. Priority is alternated such that a message that does not have priority at one column will have priority at the next, as illustrated in FIG. 22. When each message from the west is destined to go to a different group and the paths to the south are not blocked then both messages are desirably routed south. When only one message arrives from the west, the message is desirably routed to an unblocked path to the south. A connection is also made from the north to the east allowing access from the cell above to a path east. Input port N1 is connected to output port E1 when no message is available from input port W1 using the lower group, and input port N2 is connected to output port E2 when the lower group is unused. When a message from the west cannot be routed to an available path to the south, the message is sent east through output ports E1 or E2. Whenever the path to the east is in use a control signal is sent north.

FIG. 23 is a more detailed diagram of the circuit shown in FIG. 21M. The circuits of FIG. 21F through 21N can be used to embody different priority schemes and advantageously implement a richer internal interconnect. Node Y of FIGS. 21M and 23 uses a minimal amount of logic and performs efficiently in interconnect structure 100.

Referring to FIG. 5B, message M1 arriving at cell B may be destined to move south to cell F where the message immediately would move east on serial path 522. However, a concurrent message $M_2$ moving east at the lower level has priority over message $M_1$ in the use of the shared path from cell F. To enforce priority, the lower cell sends a control signal north in a timely manner so that the higher cell can react and not send a message down. Thus the control signal from cell F is to reach the higher-level cell B in sufficient time for cell B to act upon the control signal. To this end, message $M_2$ arrives at cell F before message $M_1$ arrives at cell B. In a some suitable circuits the timing of message arrival at a given level is one clock period, $T_c$, ahead of the level directly to the north.

Messages move continuously through shift registers in cells and FIFOs along a row. Traffic bit T 302 of message $M_2$ arrives at the lower cell one clock period before traffic bit of message $M_1$ arrives at the cell above. The two delay elements in a cell function as a two-bit shift register driven by the clock. At routing-decision time, traffic bit T and the most significant bit M of message $M_2$ are in the two shift registers of the lower cell, shown in FIG. 24A. The lower cell receives timing signal 2404 which causes the lower cell to examine the two bits T and M and the control signal from the south to determine which direction to send message $M_2$. The single-cell node control logic has only to examine three bits to make the routing decision, which is easily completed within one clock period, Tc. In the example, internal connections are made to send message $M_2$ east, and a control signal '1' is sent north. Before the upper cell has received the first two bits of a message the lower cell has generated and sent a control signal. Alternatively stated, the upper cell has received only the traffic bit T of message $M_1$ at the time the control signal is sent to the upper cell. At the next clock period the upper cell will have available all the information to determine where to send message $M_1$. A two-cell node examines six bits to determine a routing decision, an examination that is easily completed in one clock period.

At any given level, messages on different rows move east in parallel fashion. Header bits of each message move east in "vertical alignment" such that each header enters a cell at the same time as all other messages in the same node array. Similarly, messages dropping south from cells in the same node array move together in horizontal alignment.

The relative timing of messages at the same column at different levels is shown in FIG. 24B. At a given column, a cell at a lower level receives the first bit T of a message prior to the cell at the level above. Level J routing decision signal RD[J] 2404 occurs one clock period, $T_c$, ahead of level J+1 timing signal RD[J+1] 2406, and so on for higher levels. All cells in a given node array 108 operate synchronously, all driven by the same timing signal. The trailing edge 2430 signals end of message. In examples with two delay elements in each cell and no FIFO between columns, the timing signal at the next column is two clock periods, $T_{clm}$ 2408, after the previous column to the west. Referring to FIGS. 5A and 6A a message that moves south bypasses the cell's shift registers and is connected immediately to the cell at the next column; in this case there is a small propagation delay, $T_p$ 2426, as the message moves through gates 626 within cells. A message that moves south advantageously avoids passing through shift registers, but may experience an accumulated propagation delay that is proportional to the number of cells successively passed through. To account for the delay when moving south, the clock at the lower level is advantageously delayed by $T_p$ at each level so that a message moving south is desirably in synchronization with other messages moving from the west at the lower level. An alternate means to account for propagation delay is shown in FIG. 7E where a one-bit shift register 716 is placed between appropriate columns. Messages that exit the shift register are desirably in synchronization regardless of their previous routes. Some circuits may use both techniques to establish and insure consistent timing of messages entering a node array.

A message has a predetermined maximum length, $L_{max}$. Message transmission time $T_m$ 2430 is the time for the full message to pass through a cell, that is, $T_m = L_{max} \cdot T_c$. Shortly after a message has finished passing through a cell a subsequent message is allowed to enter the cell. Message transmission time $T_m$ determines when the next timing signal is sent 2412. Timing of cells in the node array at the next column is determined by the number of delay elements in each cell, nominally two, plus the length of a FIFO that may be between some columns.

Timing signals for all levels, and for input and output control operations, are generated by a clock and control subsystem that sends timing signals to all node arrays in the interconnect structure. Timing specifications are advantageously simplified because of the locality of cell-to-cell communication: a cell does not have to communicate further away than an adjacent column or level; and all cells in the same node array have the same timing. Shift registers in cells and FIFOs form the great bulk of switching elements. All cells at the same level use the same clock. Clocks at different levels are slightly staggered with respect to each other to account for the propagation delay when moving south through a cell. Staggered timing at different levels desirably smoothes on-chip power demands. The clock 2420 at level J is delayed an amount $T_p$ 2426 by element 2456 relative to the higher level clock 2418 shown in FIG. 24C. Desirably, the clock signal is easy to distribute, and delay elements $D_p$ 2456 can serve a double duty as amplifiers or buffers. Within a node array the clock can be fanned out using a tree so that all nodes receive the same timing.

The same timing signal as well as the same clock signal controls all cells in the same node array. Typically two shift registers are included in a cell so that a message remaining on a level reaches the next column two clock periods later. The message timing signal 2460 of the first column at the top level is passed through a two-bit shift register D2 2450 to generate the timing signal for the next column (at the same level), and so on for remaining columns. If a FIFO is included between columns, a similar FIFO is used as the delay element for the timing signal for nodes to the east (not shown). To account for the propagation delay $T_p$ of messages dropping south, the timing signal at a lower level is delayed the same amount 2458. Desirably, the timing signal 2460 is easy to distribute and delay elements $D_p$ can serve a double duty as amplifiers or buffers. FIG. 24C shows the clock signal propagation from the first column by advantageously passing through a relatively small number of delay elements. A large single-chip embodiment of interconnect structure 100 advantageously uses only a small number of gates to control the cells and nodes, affording a large number of columns and levels which desirably furnish high throughput. Timing and control advantageously scales upward to easily support large interconnects. On-chip power distribution is desirably simplified and power supply noise is minimized because the clocks that drive the shift registers and FIFOs are skewed at adjacent levels. FIG. 24D is a schematic diagram showing a conventional structure with a tree-based fanout for distributing timing signals to all nodes equally within one node array.

As a message flows through the interconnect, the node determines whether to route the message east or south. All message routing is performed within nodes. FIG. 25 is a flow diagram showing operations performed by logic for a cell or node. At startup or reset the cell's output terminals and latches are set to all-zero condition, indicating that no message is transmitted from the cell. Messages flow across a level uniformly and synchronously. The first bit of all messages moving east at the same level move uniformly in a west-to-east progression such that a message on any row reaches a cell at the same time as all other messages entering the same node array. Some sets of cells, or nodes, have a plural number of input signal paths from each direction.

At time 2402 traffic bit 302 and MSB 308 have entered the node. For each input path from the west the control logic looks for a traffic bit to determine if a message is present. If a message is not present then no further message processing is performed for that input path. Otherwise, the node examines one or more header bits to determine if a valid header is present. If no valid header is present or no message is present, the state of the node is reset to start condition. The test for a valid header need only be performed at the top level of the interconnect because invalid messages are never sent to lower levels. For each input path from the west the logic determines the appropriate direction of message(s) in relation to available connection(s) to the south. For example, if the header indicates that a message must move to an upper group and no connection to the upper group is available, the message is not routed south. Alternatively, if the node is connected to a path to the target, the message is routed south if unblocked. A message that cannot be routed south is sent east. When a message is sent east, a control signal is sent to the north to indicate that a message cannot be accepted from above.

For each message that has a connection path south to the message target the control logic determines whether the path is available by examining control signal(s) from the south. Additionally, when more than one output path to the south is present, multiple messages entering the node may compete for the limited number of paths to the south. When more messages are present than available paths, a priority scheme is used to decide which message(s) are routed south. A message destined to go south is sent east when blocked by a control signal from the south or by another message with higher priority at the same level attempting to use the same path. When a message is sent south the MSB of the header is removed from the message; the next-most significant bit thereby becomes the MSB at the lower level, and the traffic bit is always retained. Upon determination that the message can be transmitted south, control logic sends the traffic bit south at the next clock period, and then makes a connection from the west to the south so that the current MSB is lost and the nextmost significant bit becomes the MSB at the lower level. A latch or other storage element within the node maintains the connection state of the node until the next message cycle. At end-of-message the node is reset and waits for the next timing signal 2402; at message arrival time the node is again ready to process the next message or set of messages.

In summary, global timing signals are used to inform the node when to examine header bits in the cells' shift registers to determine whether message(s) exist and, if so, what are the message direction(s). When message(s) are sent east, control signal(s) are sent to the cell(s) to the north so that the latter do not send message(s) down. Control logic to the north observes and enforces the control signal. If a message is destined to go south, the node examines appropriate control signal(s) to determine whether a path is available. If multiple messages are competing within a single node for a limited number of paths to the south a priority scheme is used to determine which message(s) moves south. The state of each node is saved in one or more latches or registers to control the routing of messages until the end-of-message signal. A desirable outcome of the control logic and interconnect topology is that a message always has an open path to exit the cell, and the message never has to be buffered at a cell, and, desirably, a minimal amount of control logic is used to execute the routing decision.

Figure 26:
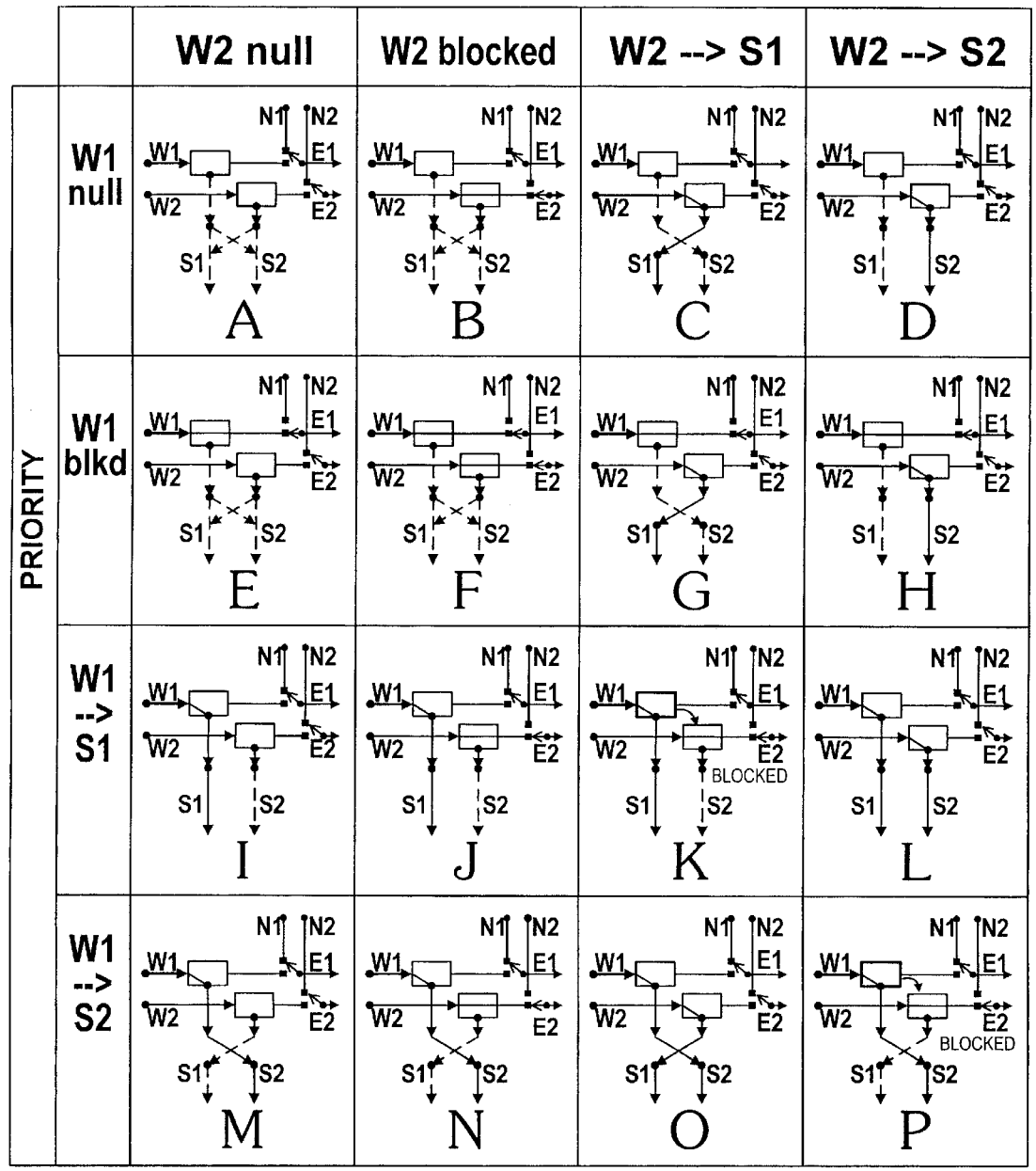
FIG. 26 is a table showing connection states of the two-cell node shown in FIG. 23 and illustrates the determination of the node's internal connections and message routing based on the content of message headers of messages entering from the west in conjunction with control signals received from the south.

FIGS. 6A through 6C show the three connection states of single-cell node: west-to-south and north-to-east; north-to-east; and west-to-east. Referring to FIGS. 21M, 23 and 26, a two-cell node has 16 connection states, labeled A through P. A message from the west, if present, may be destined to move to an upper or lower group. The four possible states at path W1 are (1) no message is present (null) or the header is invalid, (2) a message is present but is blocked from moving south, (3) the message connects to an upper group through S1, or (4) the message connects to a lower group through path S2. Similarly, the same four conditions hold for path W2.

FIG. 26 is a tabular chart of the 16 states for an example of a two-cell node, where input path W1 has priority over input path W2. State A represents the case of no message present at either input path, therefore both connections from the north N1 and N2 are respectively connected to paths E1 and E2. Whenever no message is present in paths W1 or W2, the respective input signal from the north is connected to the east. State B represents the condition when no message is present at path W1 and a message at path W2 is blocked so that the message at path W2 is sent east. When a message is sent east a control signal (not shown) is always sent north to block a message from above. State C represents the condition when no message is present at path W1 and an unblocked message at path W2 is destined to connect to path S1. The 2×2 switch 2110 connects path W2 to path S1. State D is similar to state C except that path W2 connects to path S2. States E, I and M are similar to states B, C and D except that input conditions at paths W1 and W2 are reversed. State F has both input signals blocked from moving south. States L and O represent the case where two messages enter the cell and both are routed to unblocked paths to the south. States K and P represent the condition when both messages are destined to go to the same unblocked path to the south. Since path W1 has priority, path W1 blocks path W2 internally, within the node, and path W2 is connected to the east. In an alternate version of the node, path W2 has priority over path W1.

Figure 27:
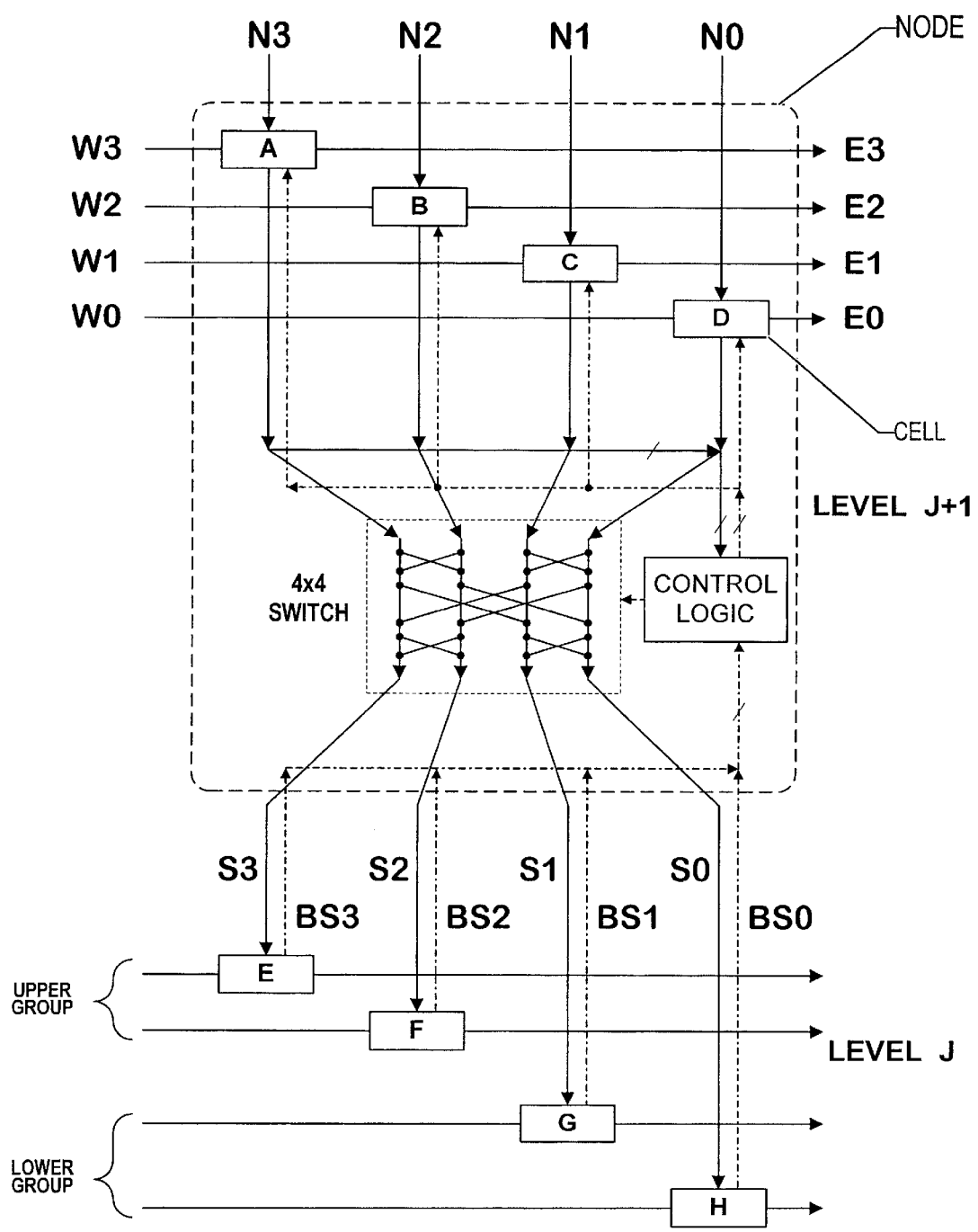
FIG. 27 is a block diagram that shows an example of a 4-cell node with internal switches that form a rich set of interconnection paths to a subsequent level, and shows connections to cells in multiple nodes at a lower level.

Interconnect structures that use two-cell nodes have greater throughput and lower latency than a single-cell version. FIG. 27 is a block diagram showing a four-cell node that has four input connections from the west and four input connections from the north; the four-cell node contains four cells, A, B, C, and D. The four-cell node desirably provides even greater throughput and lower time-of-flight than a similar sized two-cell embodiment, and can be thought of as an extension of the two-cell interconnect design. Similarly, the method for implementing a four-cell node, which is based on the two-cell node design, can be extended to N-cell, where N is an even number. A 4-by-4 switch allows a message entering at any of the cells from the west to connect on any path to an upper or lower group to the south. Two connections are made to each group. In the case of more than two messages contending for the same group, an "A-B-C-D-A" priority scheme is used to decide which row has priority over another. A message that is not routed south moves to the next column where priority is rescheduled with the advantageous result that no row has a consistent advantage over another row.

A four-cell node differs from a base-4 node in that the former examines only one header bit and sends a message down one level. The latter examines two header bits and a message skips a level to progress two levels in one cycle.

Control logic examines the traffic bit and MSB of each message from the west in conjunction with the four control signals from the south to determine how to route the messages. The logic determines which messages have an available path to the south and applies priority when multiple messages compete for the same path. When a message is routed east a control signal is sent to the north (not shown). Cells E, F, G, and H at the lower level may be inside different nodes.

Figure 28A:
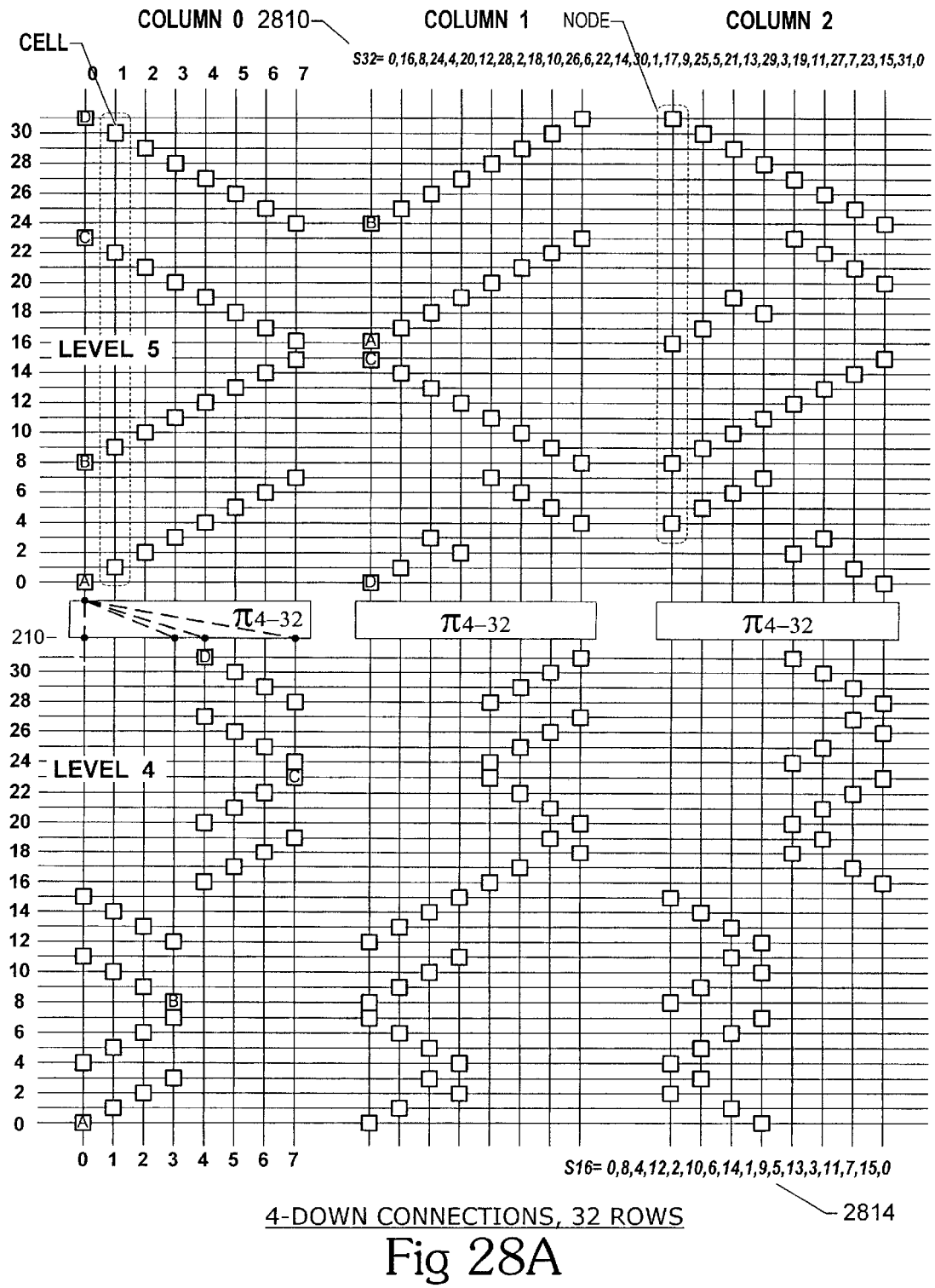
FIGS. 28A and 28B are detailed interconnect diagrams showing a 32-row interconnect structure formed using 4-cell nodes and showing connections of a cell connected to cells in adjacent columns and levels.
Figure 28B:
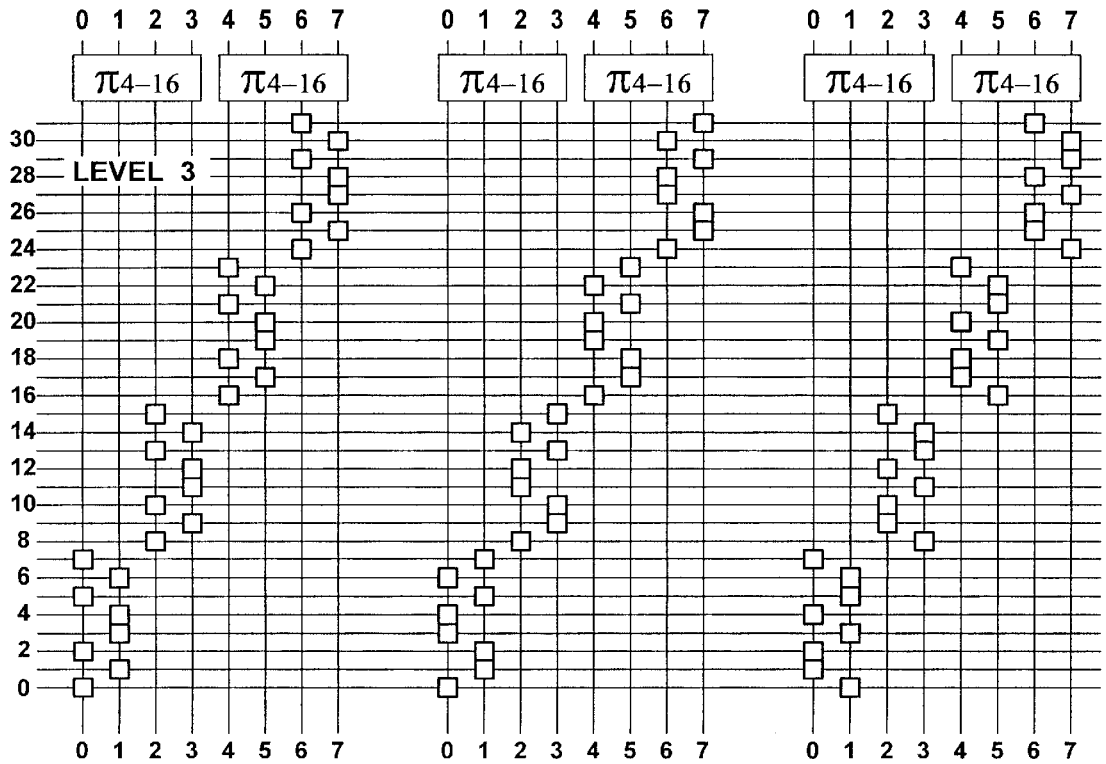
Figure 28C:
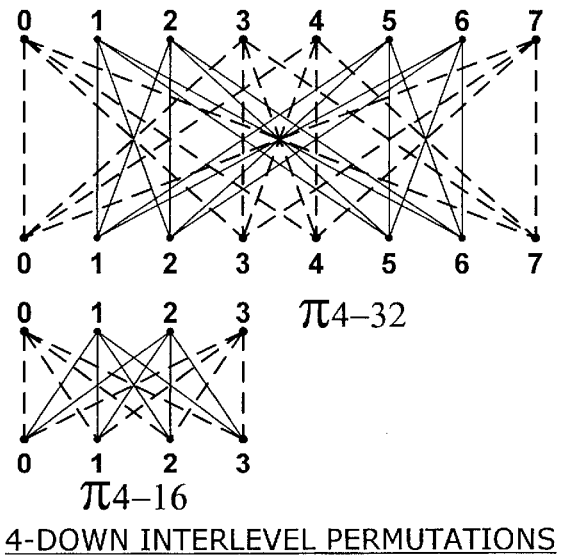
FIG. 28C is a pictorial diagram showing permutation boxes between levels.

FIGS. 28A and 28B illustrate a layout showing interconnections of four-cell nodes to form a 32-row embodiment of the interconnect structure. At the first column of the top level cells are laid out in a double horizontal-V pattern, as shown. Each vertical line contains four message paths and four control signals. A message at row 0 of level 5 follows translation sequence S32 as the message moves east along the row. A four-cell node contains the cells shown on the same vertical line, which indicate which rows connect at each column. Translation sequence π4-32 determines how output ports to the south connect to cells at the next lower level. Connections to the south are always the same rows as the cell to the north. For example, the left-most node has cells at rows 0, 8, 23 and 31. The letters A, B, C, and D indicate these same four rows at level 4. A message entering cell A has an opportunity to move south to rows 0, 8, 23 and 31. These connections are shown as a dash line. Column 1 at level 5 is laid out using translation sequence S32, and similarly at the next column. The cells at column 0, level 4, are laid out using two double-horizontal-V patterns as shown; the remainder of the columns is laid out using the translation sequence S16. FIG. 28B shows the layout of next level down, level 3. The four-cell interlevel translation sequences 2810 and 2814 are shown in FIG. 28C.

A message moving on any top-level row has an opportunity to move south to cells at the next lower level. Any two messages can move to two unblocked upper group cells, and similarly to two lower group cells. A single message entering a node has two possible connections to a next group, so that if one cell is blocked the other is advantageously available. A priority scheme is applied when a plural number of messages are competing for the same path to the south. Messages that cannot move south are routed east along the same row. The 4-by-4 switch provides more opportunities for a message to move south than for the two-cell node and the single-path embodiments previously described. The extra control logic advantageously makes more efficient use of the vertical paths connecting to the south by keeping the paths more heavily occupied with message traffic. Because a message has more than one path to the south the overall blocking rate is lower and the effective throughput is higher than two-cell nodes.

Figure 29A:
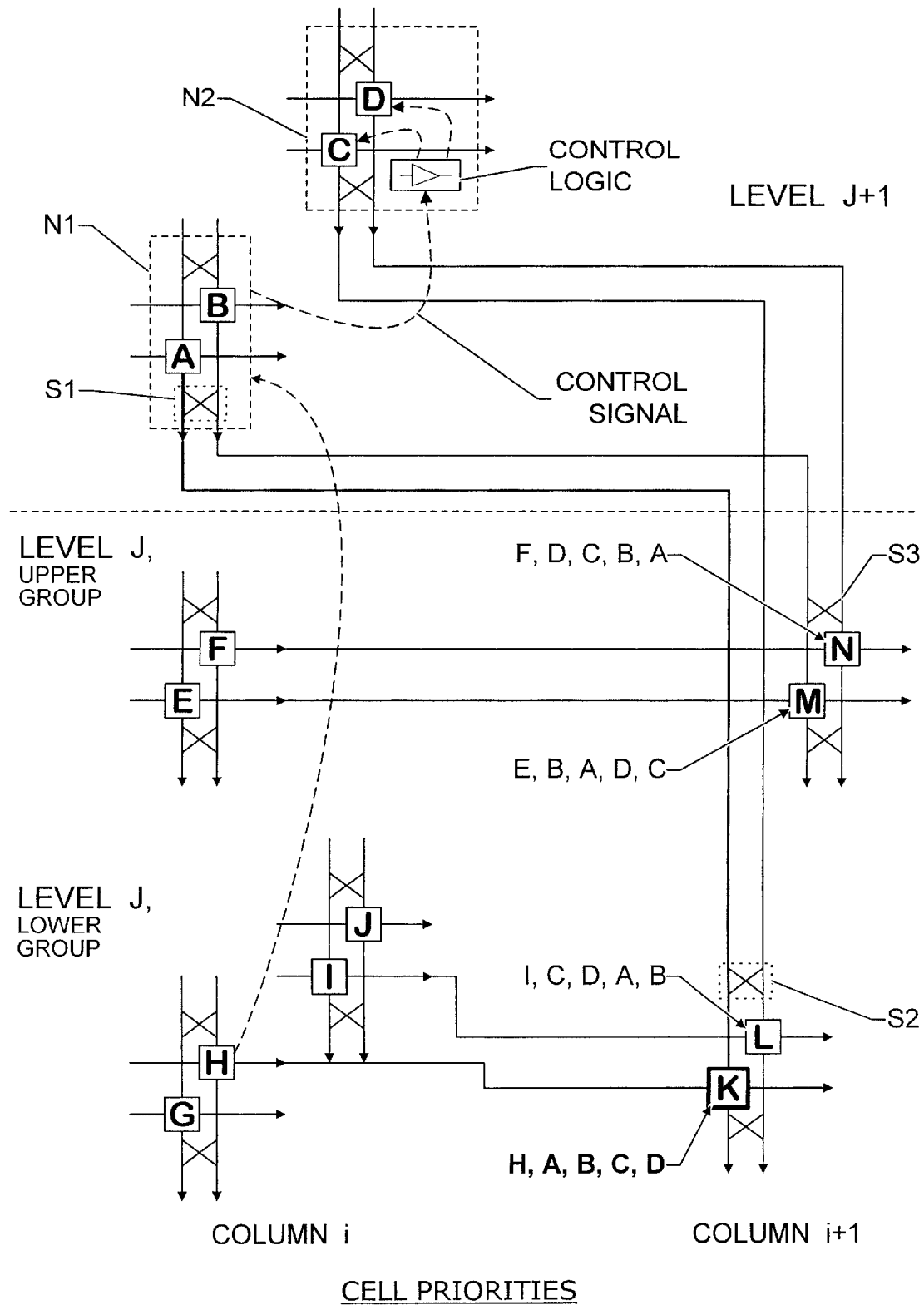
FIG. 29A is a simplified block diagram that shows an increased complexity 2-cell node at two levels and two columns of the diagonal topology shown in FIGS. 1B and 5C. The node has a rich set of interconnect paths and control signals and supports a priority relationship of cells that compete for the same node or cell in an adjacent column.

FIG. 29A shows an enhanced variation of two-cell nodes discussed hereinbefore. Switch S2 provides an additional set of connection paths downward, advantageously increasing throughput. A fair priority scheme is used to increase interconnection capacity. Cells A and B are in node N1 and cells C and D are in node N2. Both nodes are at level J+1, column i. Referring also to FIG. 5C, all cells are diagonally connected: a node sends data southeast to cells of the next column at a lower level, and nodes receive control signals from nodes in the same column. The 2×2 switch S3 allows both nodes N1 and N2 to send data to either cell M or N. Cells M and N are in upper sets at level J and are accessible from cells A, B, C and D. Cells K and L are in lower sets at level J and are also accessible from cells A, B, C and D. Cells A, B, C, D, E, F, G, H and I are at column i and cells K, L, M and N are at column i+1. The priority to send a message to cell K is given by the sequence H, A, B, C, D. The priority to send a message to cell L is given by sequence I, C, D, A, B. Note that node N1 has priority over node N2 in the use of cell K, and node N2 has priority over node N1 for cell L. The priority to send a message to cell M is given by sequence E, B, A, D, C. The priority to send a message to cell N is given by sequence F, D, C, B, A.

If cell H has a message to send to cell K, cell H sends a control signal to node N1 blocking cells A and B from sending a message to cell K. If node N1 receives a blocking signal from cell H or if node N1 sends a message to cell K then node N1 sends a blocking signal to node N2. If cell K is not blocked and a message at cell A is targeted to a lower group, node N1 sets switch S1 in the "bar" or vertical connection position. Node N1 also sends a control to switch S2 to place switch S2 in the "bar" position, resulting in a connection from cell A to cell K, shown as a heavy line. If neither cell H nor cell A sends a message to cell K, cell B has next priority; if cell B is destined to send a message to cell K, switch S1 is set in the cross, diagonal-connection opposition, sends a blocking signal to node N2, and sets switch S2 in the bar position. Given that cell K is blocked, that cell A is destined to send a message to a lower cell, and that cell L is not blocked by any of cells I, C or. D, then node N1 sets switch S1 in the cross position, sends a blocking signal to node N2, and sets switch S2 on the cross position. Similarly, cells C and D have priority over cells A and B for access to cells M and N at the lower level, and can access cells K and L at a lower priority. If only one of cells H and I is sending a message west to cells K or L then either of cells A and B can send a message to cells K or L. In another example cell A is destined to send a message to cell K or cell L, avoiding the message from cell H or cell I. Node N1 sets switch S2 to the available connection to cell K or cell L. Advantageously, if an available path is present at the lower level, any of four cells at the higher level have access to the available path under a fair priority scheme.

Figure 29B:
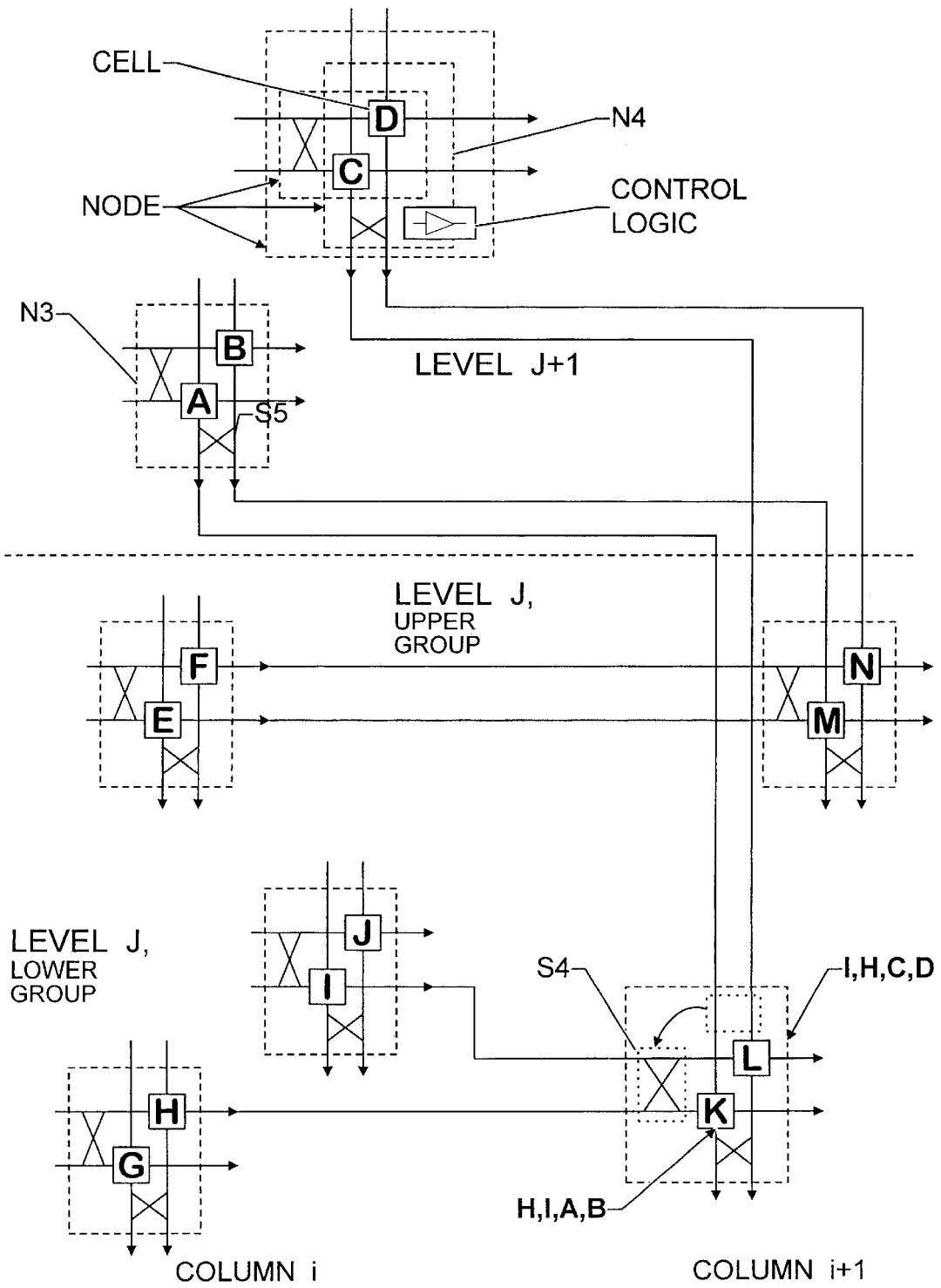
FIG. 29B is a simplified block diagram illustrating an alternative version of a 2-cell node with various internal cells, switches and control logic, that is topologically different but functionally the same as the 2-cell noded shown in FIG. 29A.

FIG. 29B shows another variation of the two-cell node where switch S4 redirects a message from a cell at a lower level to advantageously move the message out of the way. Inter-node communications lines are not shown. If only one of cells A or B is destined to send a message to the lower group and only one of cells H or I sends a message west, then node N3 is able to send a message down. In this example, cell A is destined to send a message south to cell K. Cell A has no connection to cell L. Node N3 sets switch S4 to direct the message from cell H or cell I to cell L, desirably allowing cell A to send a message to cell K. In FIG. 29A, node N1 sets a switch S2 to direct the node N1 message. In FIG. 29B node N3 sets a switch S4 that directs a message from a different node at a lower level. In general, nodes N3 and N4 set switch S4 to direct a message from a cell X, where cell X is either cell H or I in this example, distinct from cells in nodes N3 and N4. Moreover, cell X is on a different level than nodes N3 or N4. Node N3 controls two switches, S5 and S4. Switch S5 directs a message from cells A and B within the node N3, and switch S4 controls the direction of a message from a node distinct from itself.

In FIG. 29B, cells A, B, C and D are elements of two-cell nodes N3 and N4, respectively. Alternatively, cells A, B, C and D can be considered to be single-cell nodes with communication among themselves: where cells A, B, C and D of nodes N3 and N4 comprise a single, four-cell node with 8 input ports and 8 output ports. Furthermore, a node can include or not include the switches located near the node, and control logic may be within a node or partially within a node. Cells or nodes distinct from the node in which the switch is located may control a switch, such as switches S2, S3 and S4 shown in FIGS. 29A and 29B.

In interconnect structure implementations in which a node has a large number of input and output connections, internal logic becomes very complex to the degree that the complexity of a single node can approach that of an entire interconnect network. To reduce complexity of a large node and simplify timing and control, each complex individual node is advantageously replaced with a small "nodal" interconnect of a type described hereinbefore.

Figure 30:
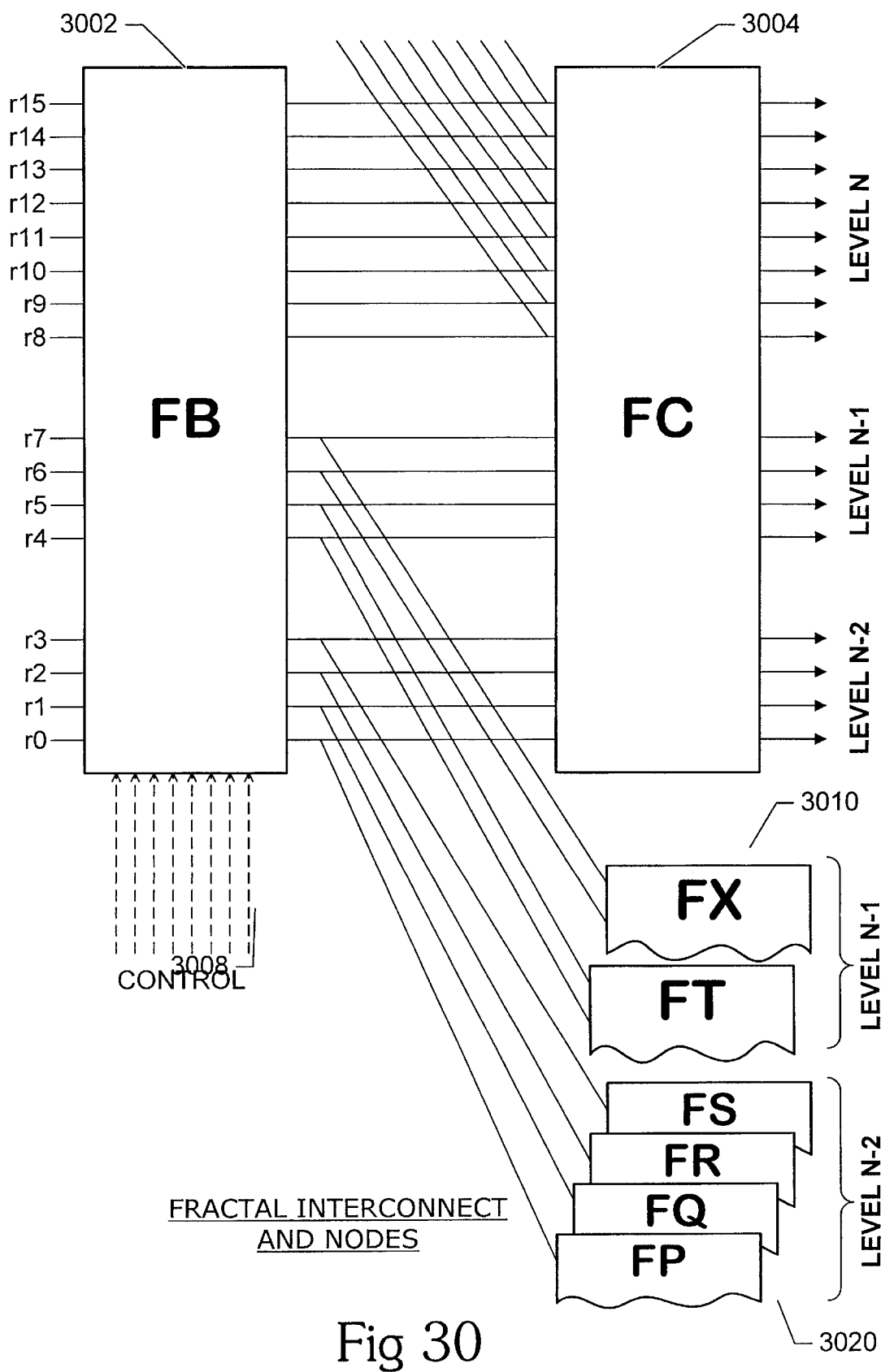
FIG. 30 shows an interconnect structure that uses a fractal node.

FIG. 30 is a block diagram showing top two levels of such an embodiment, where nodes having a significantly large number of input and output ports may be implemented using some of the structures described herein. Stated differently, a large interconnect structure 100 described hereinabove is formed by: (1) replacing each data and control path with a bus containing a plurality of data and control paths, and (2) replacing each node with a small, complete interconnect structure. Because of the self-similarity at different degrees of magnification, the resulting interconnect structure is termed a "fractal interconnect structure" and the nodal interconnect a "fractal node."

Representative connections at two columns are shown in FIG. 30. The fractal node FB 3102 contains 3 levels and a small number of columns to handle a large number of input ports and output ports. Multiple output paths are connected on the same level and downward to the next level. Data entering a nodal interconnect FB is transmitted to one of the groups below in what may be termed a radix 2 design. When more than 2 levels are used within fractal node, a message makes greater progress to the message target, which is equivalent to having a radix greater than 2.

Referring also to FIG. 21F, the two nodes S and W may block nodes E and B from sending messages to nodes T and X. The structure shown in FIG. 30 has similar macro-scale topology as the structure in FIG. 21F except that each data and control path is replaced with multiple paths, and there are connections to multiple levels. Four paths replace one path in the illustrative example shown in FIG. 30. Some embodiments of a fractal node have the same number of input and output connections in the horizontal direction as in a diagonal direction. In another embodiment, the diagonal connection between levels can be replaced with vertical connections in the manner of the cells shown in FIG. 21J.

Consider the example of a fractal node illustrated in FIG. 30. Node FB contains rows at different levels of the overall interconnect structure. Three levels are shown in the example and each level may contain rows that are not illustrated. Fractal node FB 3002 contains eight rows at level N, four rows at level N−1, and four rows at level N−2, and it has a plurality of internal columns. The fractal node is able to send data from all sixteen rows to another fractal node FC 3004 spanning the same three levels. Among all of the nodes that are capable of sending data to node FC, node FB has the highest priority, so that a message from node FB is never blocked from being sent to node FC.

The internal structure in node FB is an interconnect of a type described earlier. The number of rows at level N is greater than the number of rows at level N−1 to have sufficient room on the top level of the fractal node for all the messages from higher nodes to have a place to drop down. Multiple degrees of freedom allow for a wide class of designs. One having ordinary skill in the art can find a number of ways to modify the interconnect structures described here and in the referenced patents to allow for the case of a larger number of rows sending to a smaller number of rows.

Figure 21O:
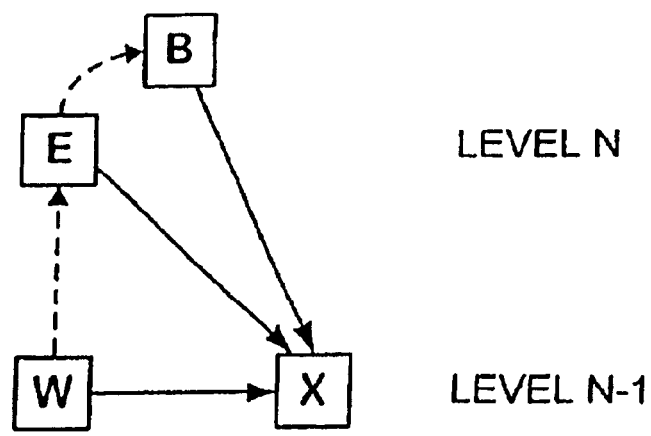

FIG. 21O depicts an elementary method for controlling multiple messages that attempt to pass through a single node. Two nodes E and B at level N are positioned to send data down to one node X at level N−1. Node W at level N−1 has highest priority to send messages to node X. Node E at level N has next highest priority to send messages to node X. Node B at level N has a lowest priority to send messages to node X. FIG. 21O shows a control line from node W to node E to indicate whether a message has been sent from node W to node X. A control line from node E to node B indicates whether either node E or W has sent a message to node X.

Referring to FIG. 30, at a given time step, node FB at level N is positioned to send a message to a node at level N−1, 3010. At the next time step, node FB is positioned to send a message to a node at level N−1, 3020. Since the number of nodes at level N−1 is equal to the number of nodes at level N−2, the interconnect pattern between these levels is the same as described in the referenced patents. When a message reaches the rightmost column of a fractal node, the message does not proceed back to the leftmost column of that node, but instead proceeds to a node on the same or a lower level. In this way, a given message moving in wormhole fashion can be distributed among several large nodes at different levels.

Within the self-similar interconnect structure, the fractal nodes are interconnect structures internally. The fractal nodes contain nodes that are of the types described here and in the referenced patents. Furthermore, the fractal nodes are connected in a structure of the type described here and in the referenced patents. N+1 denotes the number of levels in the large structure, arranged from a lowest level 0 to an uppermost level N. The fractal nodes at level N contain eight rows that have no bits of the target fixed, four rows that have one bit of the target fixed, and four rows that have two bits of the target fixed. Fractal nodes at level N−1 have eight rows with 1 target bit fixed, four rows with 2 target bits fixed, and four rows with 3 target bits fixed. This pattern continues down through the levels of the large structure. The timing in the large structure is such that control signals are sent in time intervals greater than the amount of time that it takes a given message to cross a small node. This slower time advantageously allows a control signal to travel across greater distances through various devices.

Referring to FIG. 30, a fractal node FB is at levels N, N−1, and N−2. Messages that exit from the top eight rows of node FB are sent to a fractal node FC in the next column. Messages from the bottom eight rows are also able to travel to node FC but, in addition, the messages are able to travel to other nodes connected at lower levels. Consider the sixteen rows $r_0, r_1, \ldots r_{15}$ of node FB. Messages exiting the bottom four rows of node FB are able to travel to nodes connected at level N−2. A message exiting row $r_0$ of node FB is able to enter one of the top eight rows of node FP at level N−2, here all of the messages that enter node FP are targeted for outputs with header address most significant bits (0,0). A message exiting row $r_1$ of node FB is able to enter one of the top eight rows of node FQ at level N−2, where all of the messages that enter node FQ are targeted for outputs with most significant bits (0,1). Similarly, a message exiting row $r_2$ of node FB is able to enter one of the top eight rows of node FR at level N−2, where all of the messages that enter node FR are targeted for outputs with most significant bits (1,0). Finally, a message exiting row $r_3$ of node FB is able to enter one of the top eight rows of node FS at level N−2, where all of the messages that enter node FS are targeted for outputs with most significant bits (1,1). Messages exiting rows $r_4$ and $r_5$ of node FB are able to enter two of the top eight rows of node FT at level N−1, where all messages entering FT are targeted for outputs with leading bit 0. Messages exiting rows $r_6$ and $r_7$ enter two of the top eight rows of node FX, where every message entering node FX is targeted for an output port whose leading bit is 1. This interconnect scheme continues down through the levels of the large structure.

Figure 31A:
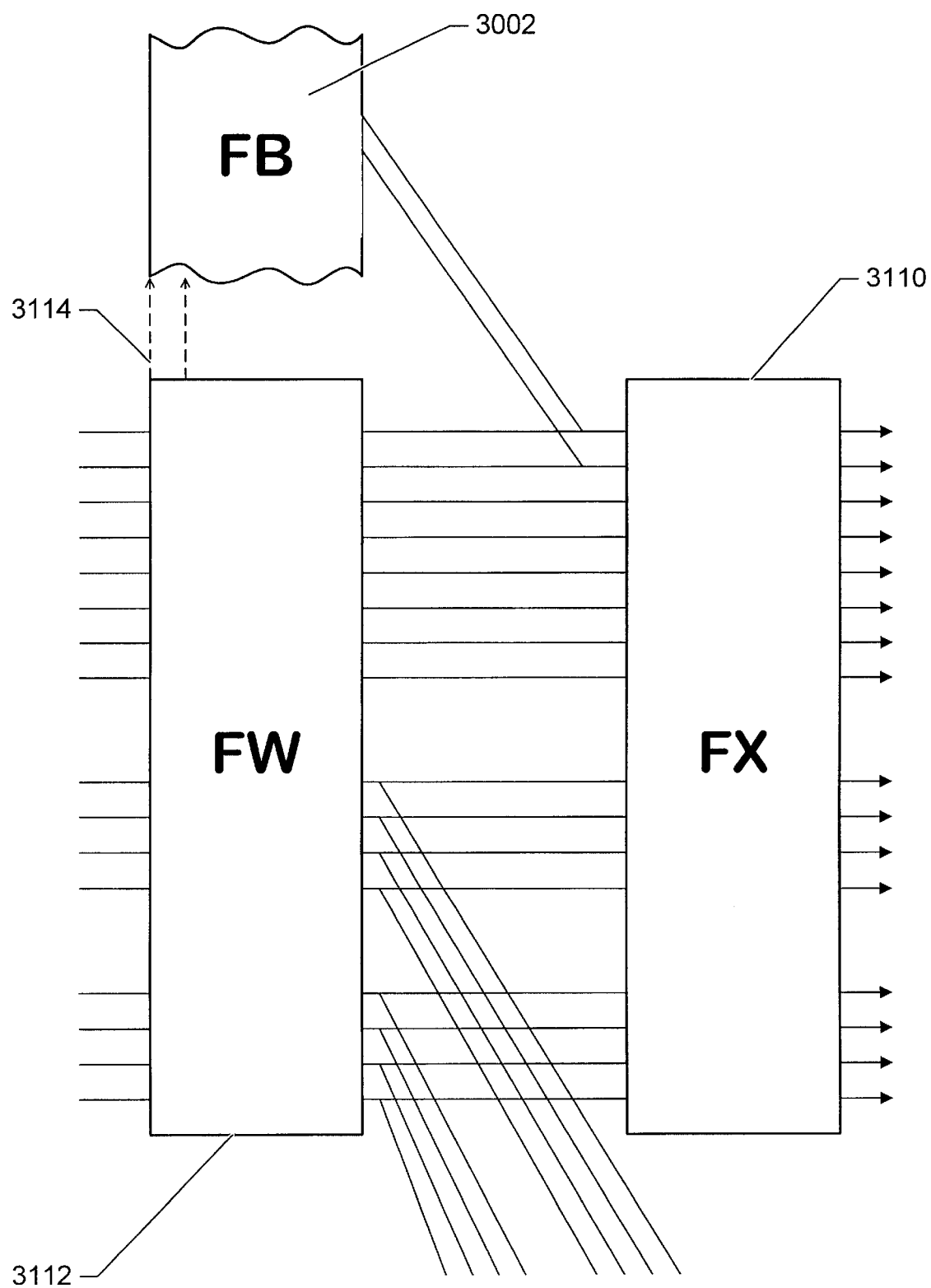
FIG. 31A is a block interconnect diagram showing two levels of a fractal interconnect structure including detail of connections among the nodes.

A message arriving at the rightmost column of the large network may be re-circulated to enter the leftmost column. However, networks in the fractal nodes have the property that a message that leaves the rightmost column progresses on to another fractal node. Referring to FIG. 31A, the top eight rows of fractal node FX 3110 are positioned to receive messages from a node FW 3112 on the same level, and from node FB 3002 on a higher level. Node FW sends control signal 3114 to FB to enforce a priority of FW over FB to send messages to FX.

Figure 31B:
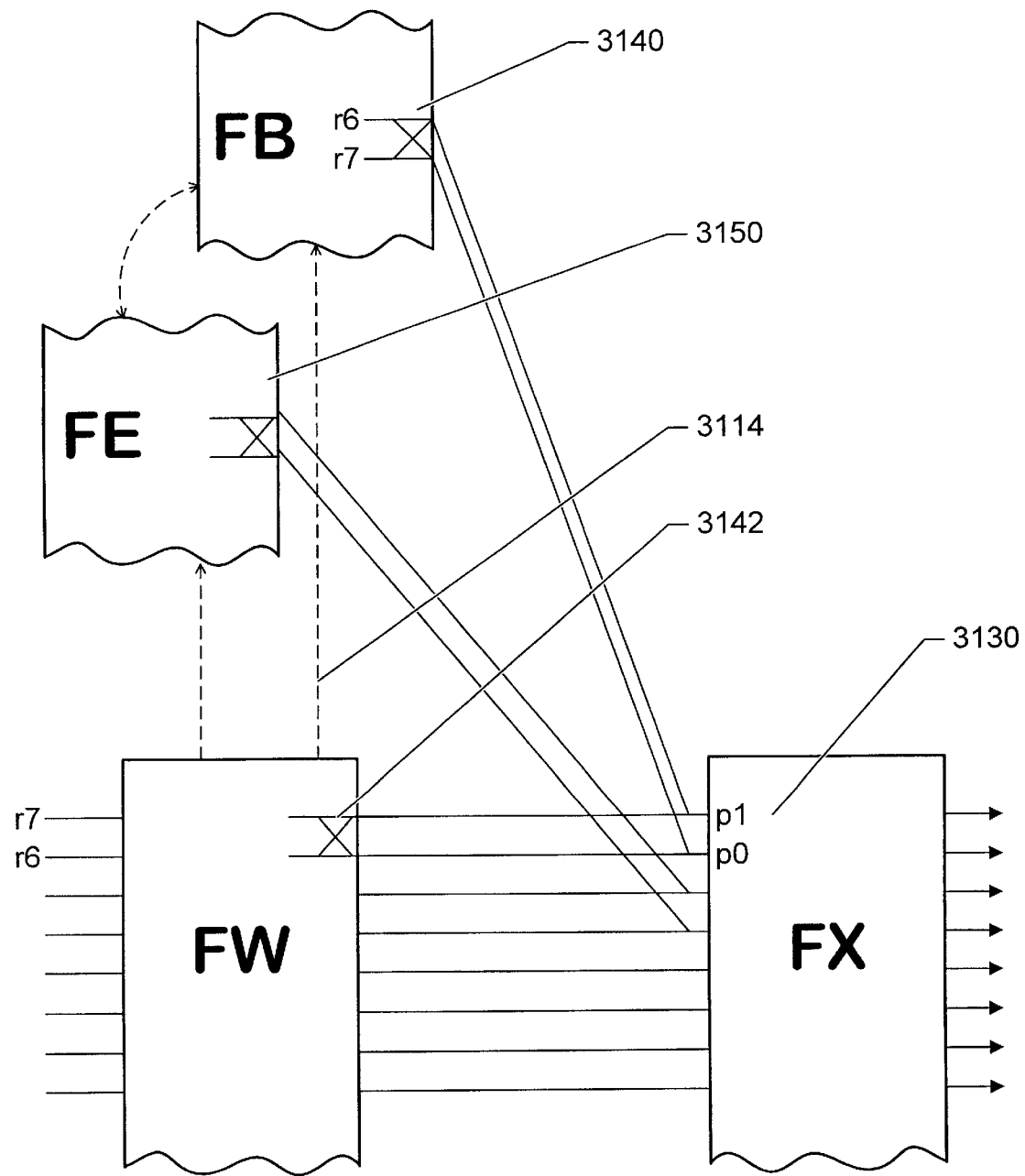
FIG. 31B is an interconnect diagram showing a packing device that routes data to the bottom of a bus while maintaining sorted order. Messages priority route so older messages at a level have priority over newer messages arriving at the level.

Referring to FIG. 31B, one embodiment of the fractal network includes additional logic at some output ports of a fractal node. Rows $r_6$ and $r_7$ from node FB enter two of the top eight rows of node FX at entry points labeled p0 and p1 3130. Node FW on the same level as node FX is capable of sending messages to node FX. Two rows from node FW send messages to entry points p0 and p1 of node FX. If at a given time only one message exits node FW from row $r_6$ or $r_7$, switch 3142 at node FW sends that message to p0. If at a given time, only one message exits a port of node FB connected to p0 and p1, switch 3140 at node FB sends that message to p1, desirably permitting both nodes to send messages to node FX. A control signal from node FW to node FB indicates how many messages node FW is sending to ports p0 and p1. The logic at node FB is able to make the proper decision to send the maximum possible number of messages from node FB to node FX.

Another embodiments may include N data lines from a node FB down to a node FX, and N data lines from a node FW, where N is greater than 2. A control signal from node FW to node FB indicates how many input ports at node FW are available. Using this information in conjunction with node FW sending messages to lower ports of node FX, node FB sends messages to the available input ports of node FX, advantageously sending the largest number of messages down.

The scheme can be generalized still further by considering node FE 3150 at the same level as node FB, which also sends to node FX. Node FE receives information from node FB concerning how many messages node FE may send to node FX. The scheme requires that control information pass from node FW to node FB and from node FB to node FE, and possibly from node FE to node FB.

All described generalizations and similar schemes will be apparent to one having ordinary skill in the art. The illustrative example is a small fractal node. One having ordinary skill in the art could apply these techniques to build a much larger fractal node. Because of the relaxed timing requirements imposed on control signals between fractal nodes, one could advantageously build a very large network where each fractal node is a network on a chip. Furthermore, by extending this principle, one having ordinary skill in the art could build an extremely large network where each fractal node is the very large network, which itself is made up of fractal nodes on a chip. The throughput and efficiency of the class of networks described here is such that they advantageously scale without limit. The only restriction on size comes from technology limitations imposed by packaging constraints. This constraint is broken by the use of self-similar, or fractal, networks which allows one to build a high-performance interconnect of any size.

Figure 32:
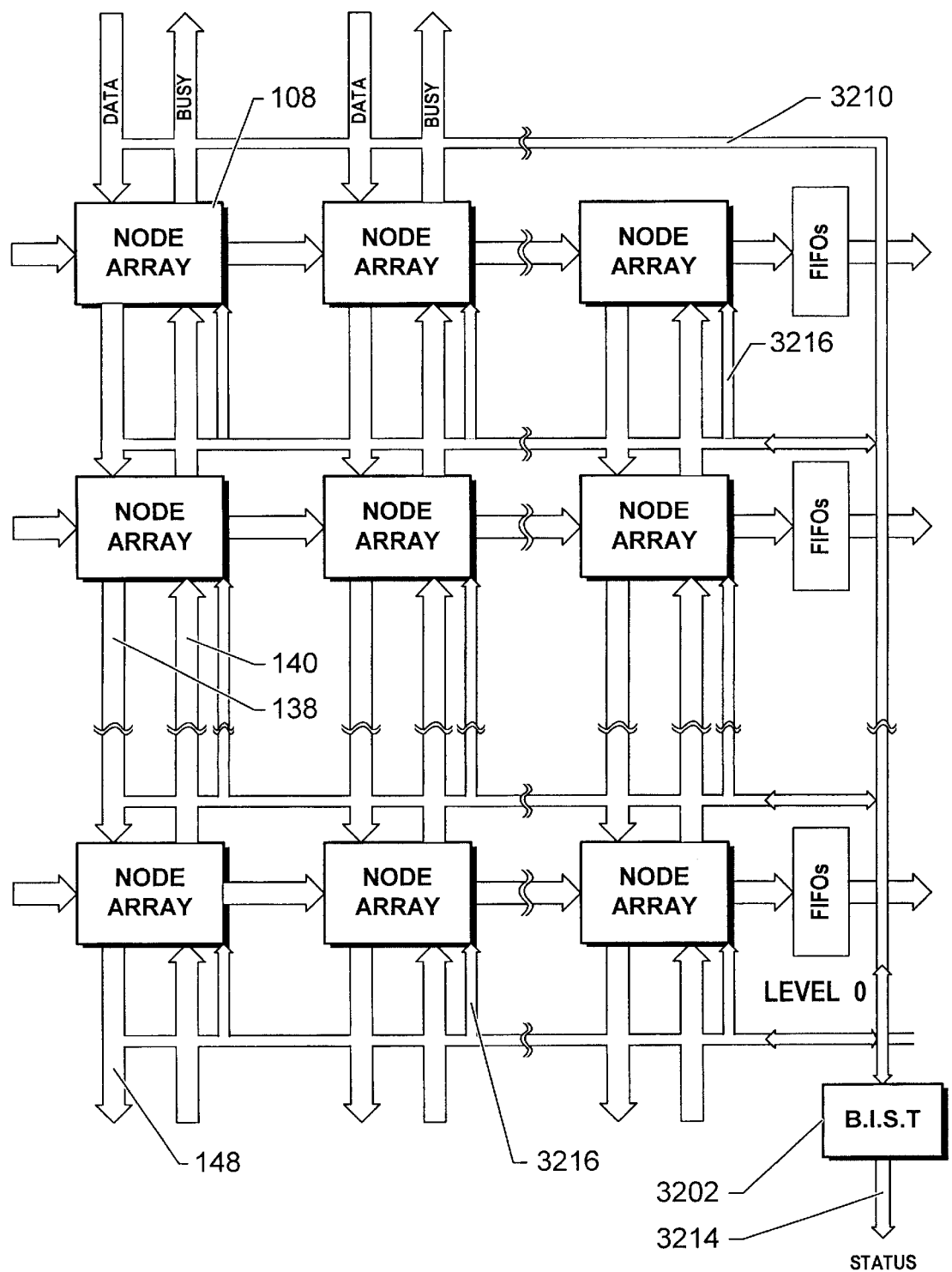
FIG. 32 is a simplified block diagram showing a built-in self test (BIST) subsystem that generates test messages and control signals within the interconnect, and monitors the successful progress of the messages through the interconnect.

Referring to FIG. 32 the optional built-in self test (BIST) subsystem tests the operation of interconnect structure 100 by issuing test messages into data buses 102 and 142 and by monitoring the progress and flow of the test messages through the interconnect structure by connections 3210 to data and control signal paths within the interconnect structure and to data exit paths 148. Defective elements within are bypassed by control 3216 sent from the BIST subsystem, desirably enabling continued operation. Results of the built-in self test, and any remedial bypassing or other repair may be signaled externally by a status signal 3214. The BIST subsystem may also produce current and statistical information about the activity and state of the interconnect structure, and supply the information externally.

FIG. 32 shows a general block diagram of the built-in self test (BIST) subsystem 3202 which operates by sending one or more messages at appropriate times into the top level and monitoring the progress of the message(s) through the interconnect structure. A plural number of competing messages are sent to validate the BIST operation. The BIST logic contains a table of messages and/or an algorithm to generate the messages, such that the messages are transmitted through the interconnect structure when the built-in self test is executed. Sufficient messages are preferably produced to ensure that every cell processes messages to the south and east.

Connections from BIST subsystem can be made at every input port, and from every control signal and data path of all cells at each level. Multiple messages are injected into an input port such that at least one message is blocked by another to advantageously test the control capability of the cell. Successful blocking is monitored by examining the control signal sent from the cell and sampling message flow during operation of the interconnect. During the BIST sequence a plural number of message combinations are sent so that every cell generates and receives a control signal.

Figure 33:
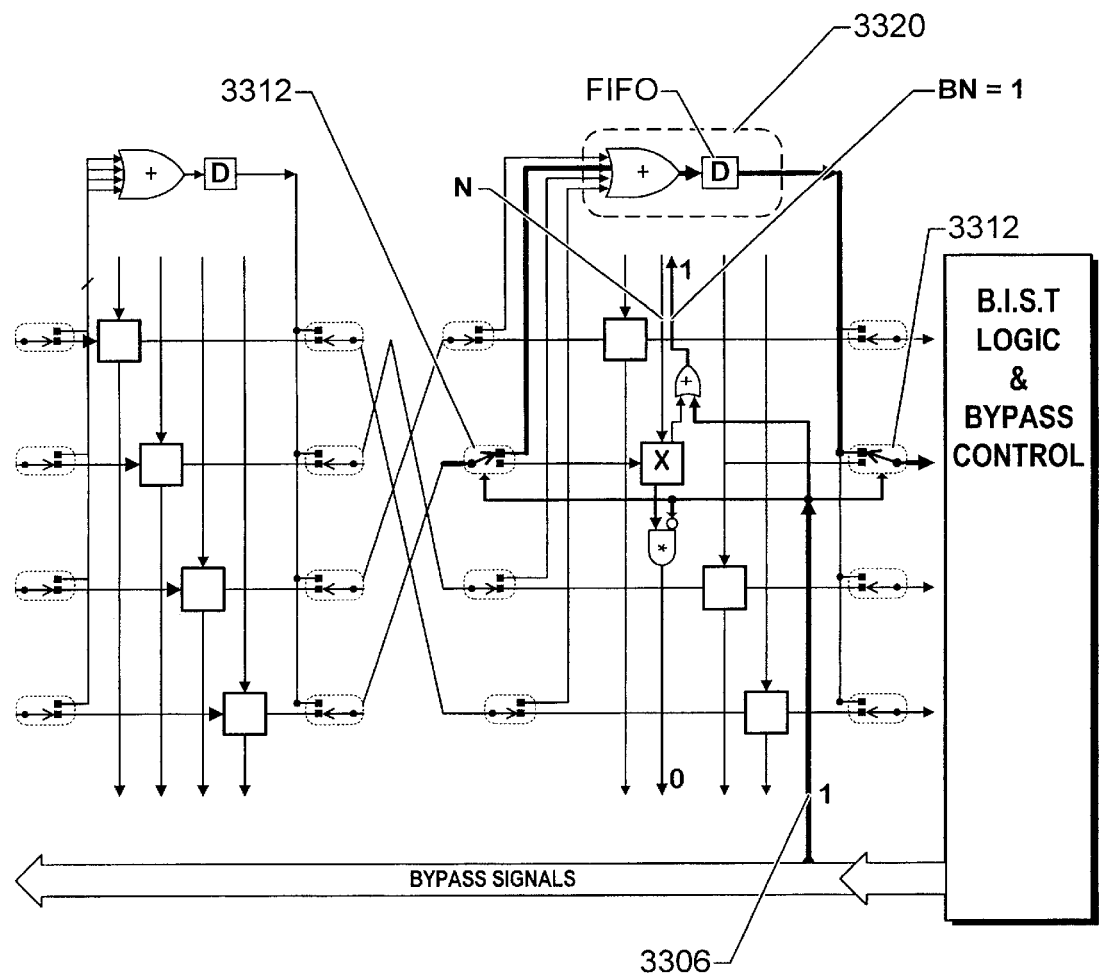
FIG. 33 is a simplified block diagram showing a defective-cell bypass which harmlessly removes a cell from the interconnect, thereby performing an on-chip self repair functionality.

At the completion of a built-in self test with complete coverage, every cell in the interconnect structure has passed at least one message to the south and one to the east and has generated and received at least one control signal. An external signal is generated indicating the success or degree of failure of the BIST. Advantageously, a bad or defective cell can be bypassed from further message traffic during operation. A table or list of defective cells is stored in the BIST subsystem and the defective cell is removed from message processing. FIG. 33 shows how a defective cell 3302 is removed from the circuit in a manner that does not harm message processing and flow. BIST sends signal 3306 to bypass elements that disconnect the defective cell.

A defective cell can be defective by sending all zeros, all ones, or random signals to the east, south or north, or the defective cell may fail to respond to a message header or a control signal. In any case, the output of a defective cell is disconnected from message processing. The bypass signal is combined with the control signal of the defective cell so that '1', meaning "busy", is always transmitted to the cell above, preventing the latter cell from sending a message to the defective cell. Similarly, the output signal to the south is switched off so that the cell to the south never receives a message or invalid data. Input signals from the west are routed around the cell 3312 through a delay element 3320. The illustrative delay element is a small FIFO that has the same delay as a cell has when the cell transmits a message from west to east. The output ports to the east and south are removed from the interconnect structure. The message passes through the bypass which functions like a cell that is blocked from the south. The net effect of the bypass is that a message does not have an opportunity to drop south at one particular column. Typical interconnects contain many more columns internally than are needed to support the number of I/O ports. Therefore, a message moving through a bypass still has multiple opportunities to move south. Incorporation of defective cell bypass is another reason to use the cascade design shown in FIG. 8A. Improved reliability may be gained for interconnect structures that include at least one bypass in every node array. Further improvement is gained for interconnect structures that include at least one bypass element for every node.

The illustrative example shows a bypass of one cell. A similar bypass is implemented for two-cell and N-cell nodes. The principle followed is that defective output ports to the east and south are disconnected, the cell or cells to the north are prevented from dropping a message south, and the defective path from west to east is bypassed. The BIST subsystem and defective cell bypass are optional features. Monte-Carlo simulations show that an interconnect with between 1024 and 65,536 I/O ports using the cascade design shown in FIG. 8A can sustain an input rate of greater than 90% without any input blocking. The scaleable interconnection capacity of the interconnect structure described herein greatly exceeds the implementation capabilities of current technology. Wafer-scale technology is one route to achieve a very large-size interconnect structure. Several examples that support a large number of I/O ports incorporate the BIST subsystem and defective-cell bypass to handle chip defects.

Figure 34:
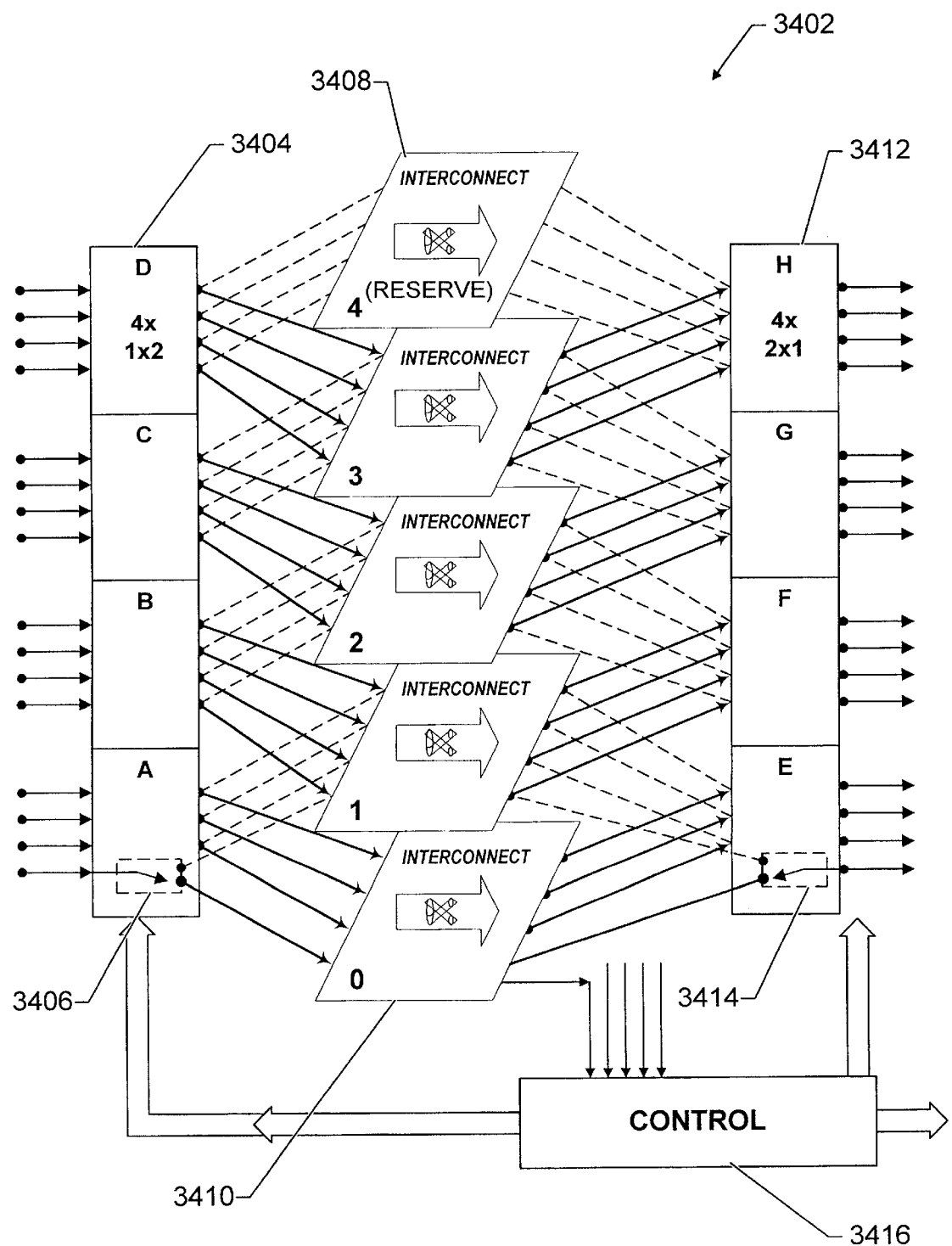
FIG. 34 is a block diagram showing one-half of a multiple-chip interconnect system with a reserve chip. The reserve chip can be switched into the system to replace a defective chip.

FIG. 34 shows a block diagram of a large interconnect system composed of multiple interconnect chips with the desirable feature that at least one interconnect chip 3408 is used as a spare or reserve chip. In the example, each interconnect has only four input ports and four output ports to simplify the drawing. System 3402 includes four interconnect chips plus one reserve 3408, an external control 3416 system, an input multiplexer 3404, and an output demultiplexer 3412. The components make up one half of a complete system. The total number of I/O ports of the system is the number for a single chip squared. For example, the four-port interconnect chip in this configuration supports a system total of $4^2$, or 16, I/O ports. Two of the half systems 3402 are used in tandem to form a complete system.

When each interconnect chip is powered-on, an embedded BIST subsystem informs external controller 3416 of the success or failure of operation. The controller monitors performance of chips during operation of the system. At power-on and during operation of the system, one of the interconnect chips can be removed from the circuit and replaced by reserve chip 3408. The input multiplexer 3404 contains a series of 1×2 switches 3406 which direct incoming messages to one of two chips. The output port of each chip is connected to demultiplexer 3414 which selects one of two chips and routes message and control signal east to a copy of system 3402.

Figure 35A:
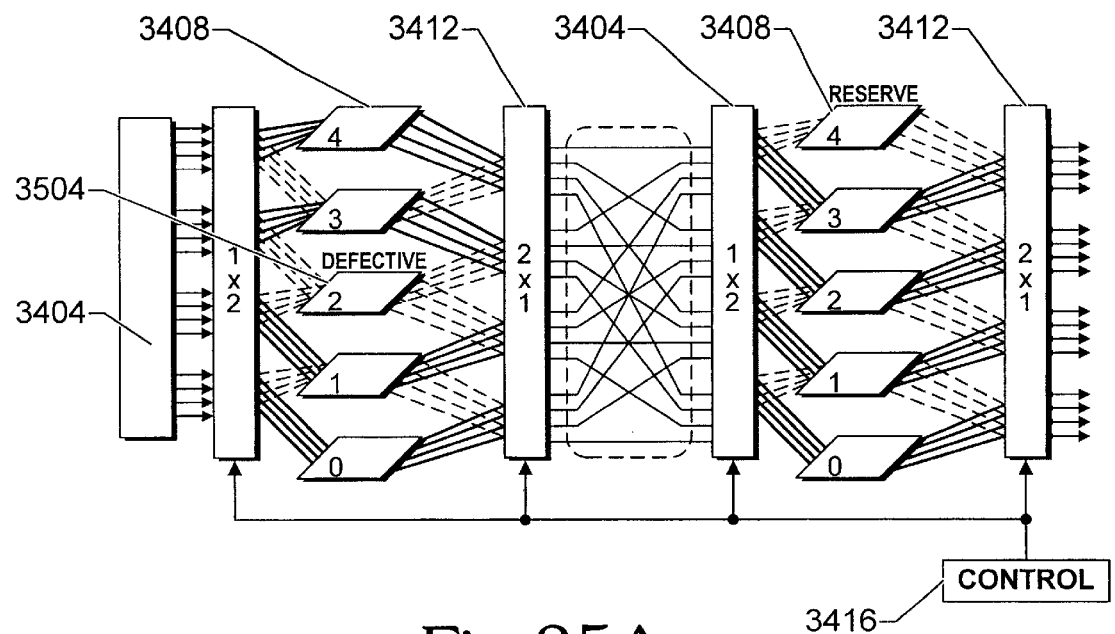
FIG. 35A is a block diagram that illustrates a multiple chip interconnect system in which two halves of the multiple-chip interconnect system elements shown in FIG. 34 interconnect to form a complete system. A reserve chip is switched into the system to replace a defective chip.

FIG. 35A is a block diagram including two defective-chip bypass subsystems 3402 connected in tandem to form a complete 16×16, system. In the example, interconnect chip 3504 has been determined to be defective. External control unit 3416 sends control information to input 3404 and output 3412 units to exclude the defective chip from the data path. In this example, messages that would ordinarily pass through chip number 2 3504 are instead routed to chip number 3, and messages that would have gone through chip number 3 are routed through the reserve chip 3408, and so on. Interconnections between the two subsystems route each output signal from a chip on the left-hand subsystem to an input port at each of the four chips in the right-hand subsystem. Thereby a message entering at any of the 16 inputs is desirably transported to any of the final output ports.

FIG. 35A shows four interconnect chips plus one reserve chip in each subsystem. In some embodiments the number of I/O ports supported by each chip would be much larger than four shown here, for example, in the range of 64 to 256. Therefore the capacity of the system would be $64^2$ to $256^2$. Most advantageously, a subsystem includes a plural number of reserve chips. In the example of a 64×64 system, a group of 8 or 16 chips is treated as a block with one reserve chip for the block. Thus a system includes four blocks of 33 chips, or eight blocks of nine chips, desirably providing reserve capacity for multiple chip failures.

Figure 35B:
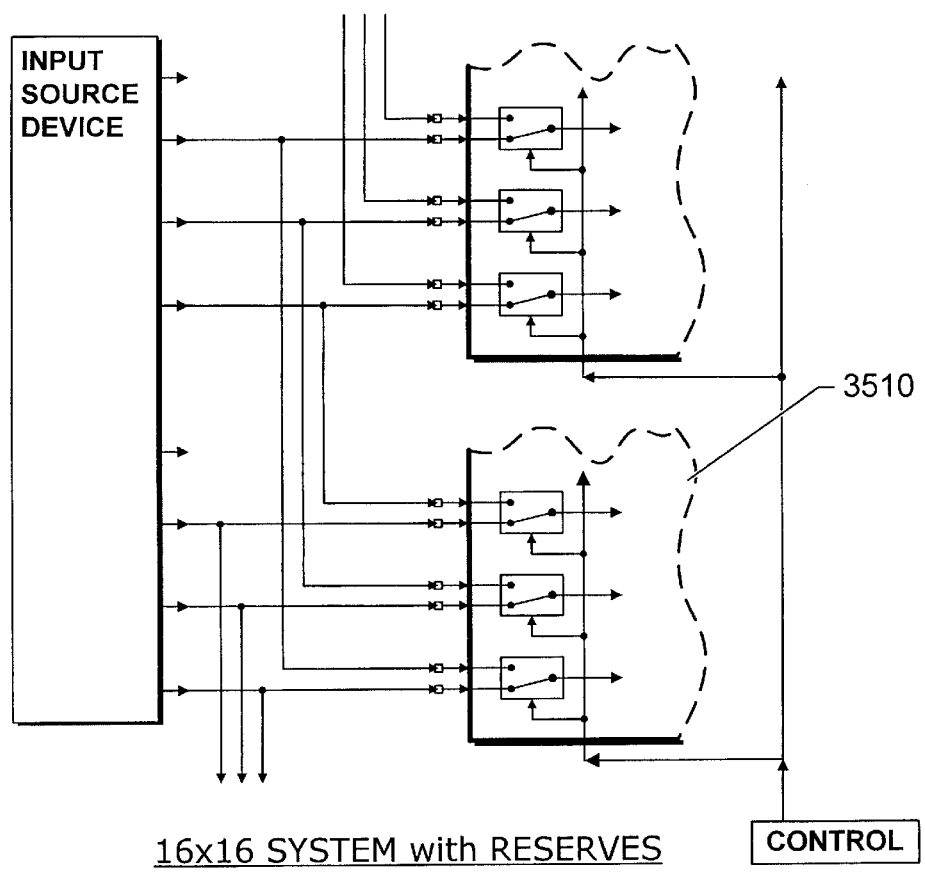
FIG. 35B is a detailed diagram of an alternative structure for switching a chip in and out of the system.

FIG. 35B shows an alternate implementation of the control units 3404 in which the function of switch 3406 is performed internally within each chip. In this example each chip 3510 has two I/O ports for every internal I/O connection. An internal 2×1-output switch, not shown, performs the equivalent function of external switch 3412. The example desirably eliminates the input unit 3404 and output unit 3412, at the cost of including twice as many I/O ports per chip. The cost is compensated by the N-squared size of the entire interconnect system.

A message moving along a row blocks a message at one column but not at the next column. In the illustrative structure, as many columns as possible are included to provide multiple opportunities for a message to move south. Because of the relatively small amount of logic used to implement a node, the major limitation imposed by technology is the limited number of I/O pins. This yields an abundance of logic versus the amount of I/O ports. The relative abundance of logic is used to create as many paths through the interconnect as possible so the probability of a message being blocked is greatly reduced.

Figure 36A:
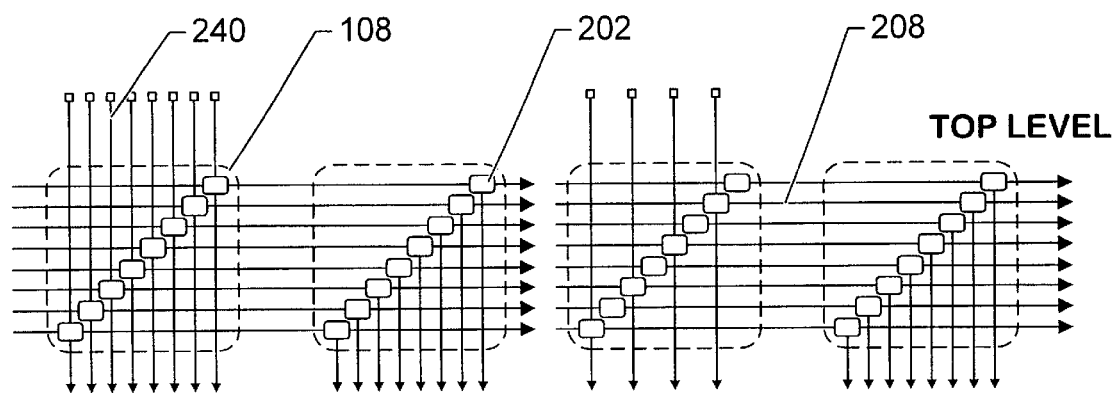
FIGS. 36A, 36B and 36C are simplified block diagrams showing input connections at a top level and respectively illustrating a variety of arrangements to satisfy various application requirements.
Figure 36B:
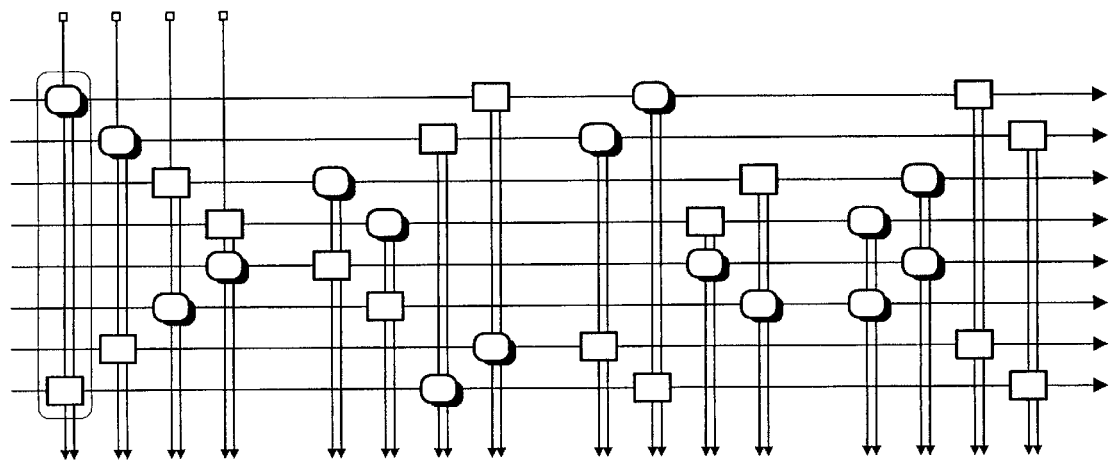

FIG. 36A shows the top level in an interconnect where alternate columns are connected to an input port, giving a reduction by a factor of two in the number of I/O connections versus logic. The two right-hand columns show another example where half the cells in a node array are connected to an input port, and none at the next column, giving a ratio of cells to I/O of 4:1. FIG. 36B shows an embodiment where a two-cell node has only one input port, so that an unblocked message entering always has an opportunity to move south. Only one column is used for input connections so that fewer input ports are included in comparison to the number of output ports, advantageously lowering traffic density within the interconnect structure and also supporting a few-to-many I/O ratio for some applications.

Referring to FIG. 7C, sufficient storage is available along a row to contain a complete message. With a large number of columns, for example two or more storage elements at each column, sufficient storage may be available to accommodate an entire message within the cells without using a separate FIFO. Logic is more efficiently spent on cells rather than on FIFO arrays. For example, a message length of 80 bits can be accommodated in an interconnect structure having about 40 columns, providing many opportunities to move south. If sufficient logic is not available on the chip, a FIFO is used to make up the difference.

Figure 36C:
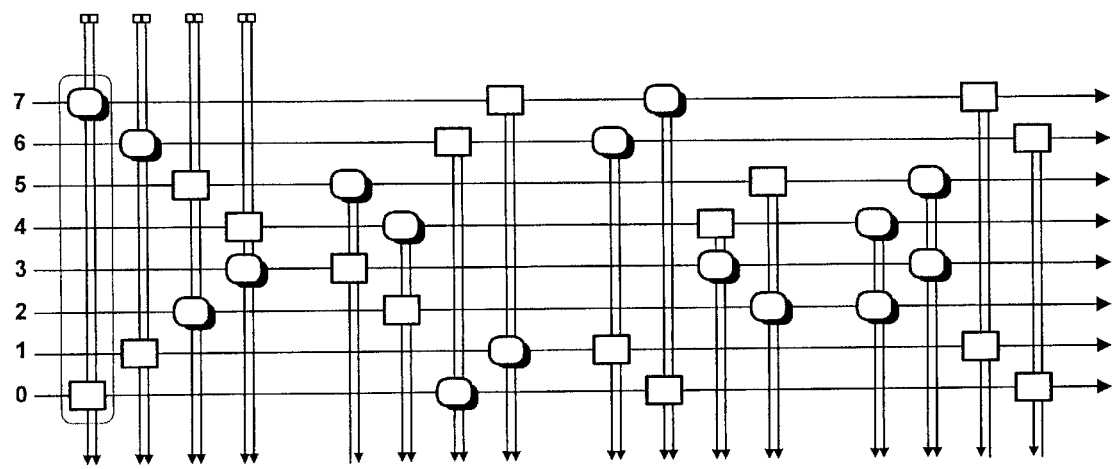

The ratio of the total number of columns to columns with input connections is determined by the amount of I/O versus logic. The available logic is used to generate as many node arrays as possible so that messages reach a target row while desirably experiencing very little blocking during passage through the interconnect. FIG. 36C shows an example using two-cell nodes in which input connections are located only in one column. Advantages of the illustrative design are that the external input devices are desirably controlled by a single timing signal, and that a high ratio of cells to I/O is obtained. A message entering the top level has numerous opportunities to move south because messages can enter a row only in a single place. Message traffic density in the example is relatively very low, desirably generating negligible blocking and achieving low latency.

Figure 24A:
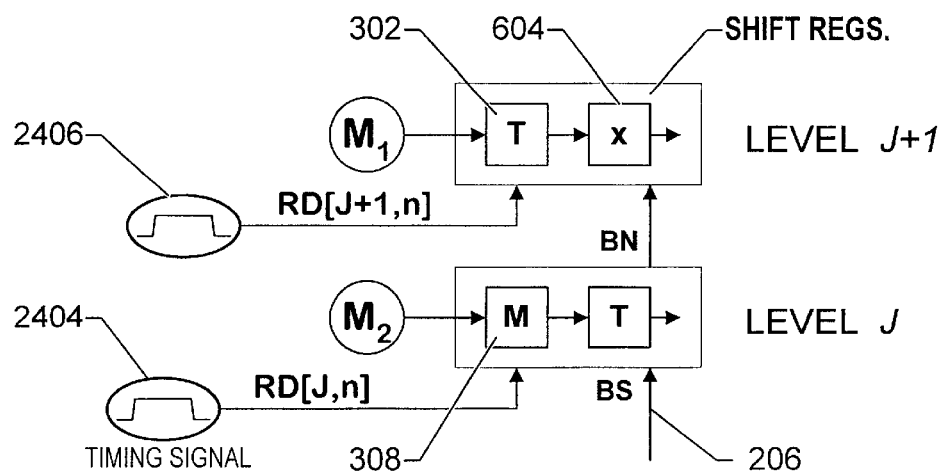
FIG. 24A is a block diagram showing two cells in a common column but at different levels and showing relative timing of message arrival at the two cells. The lower cell receives a message and determines a routing decision before message arrival at the higher cell. The block diagram further depicts the contents of shift registers in both cells with respect to header bits at the time the lower cell makes the routing decision.
Figure 24B:
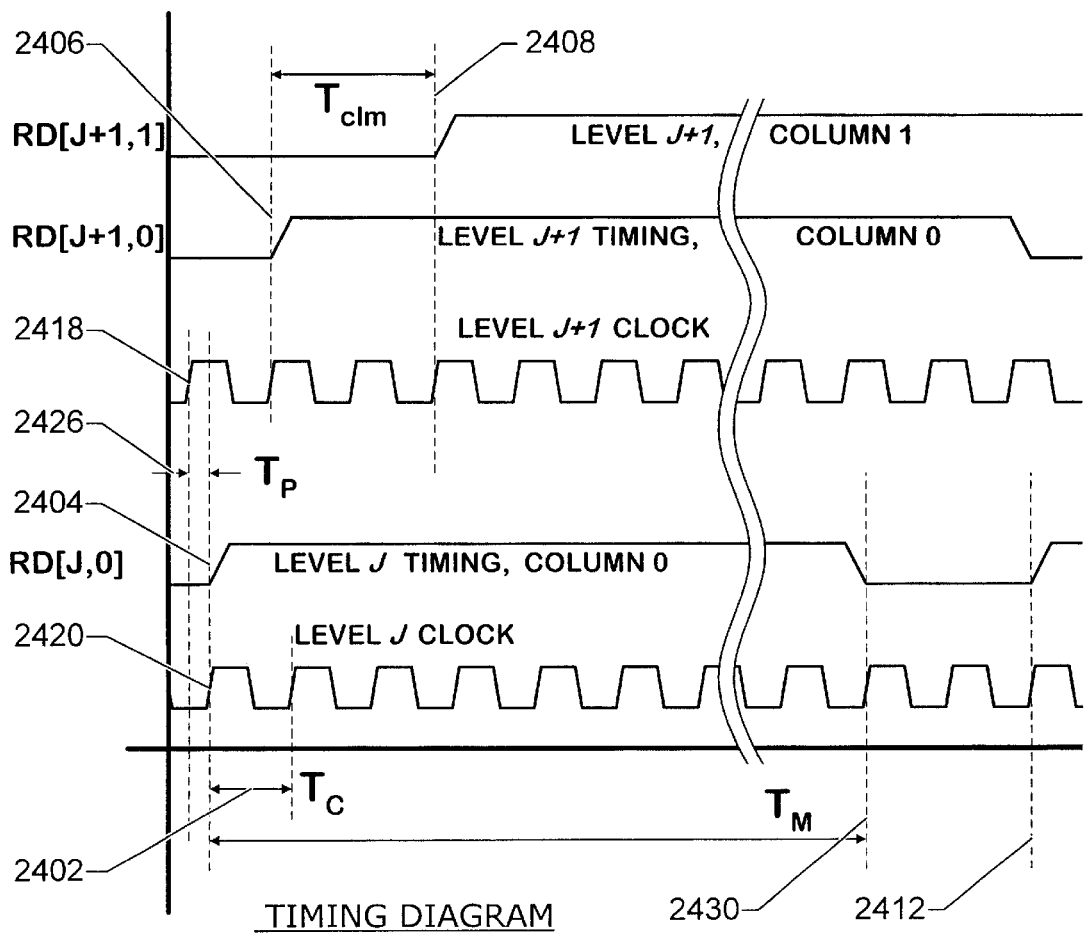
FIG. 24B is timing diagram showing message arrival for the cells at two levels. The lower level makes a routing decision prior to the next higher level. A skew in timing is inserted at the different levels to account for propagation delay. End of message timing and message arrival at the next column is also illustrated.
Figure 24C:
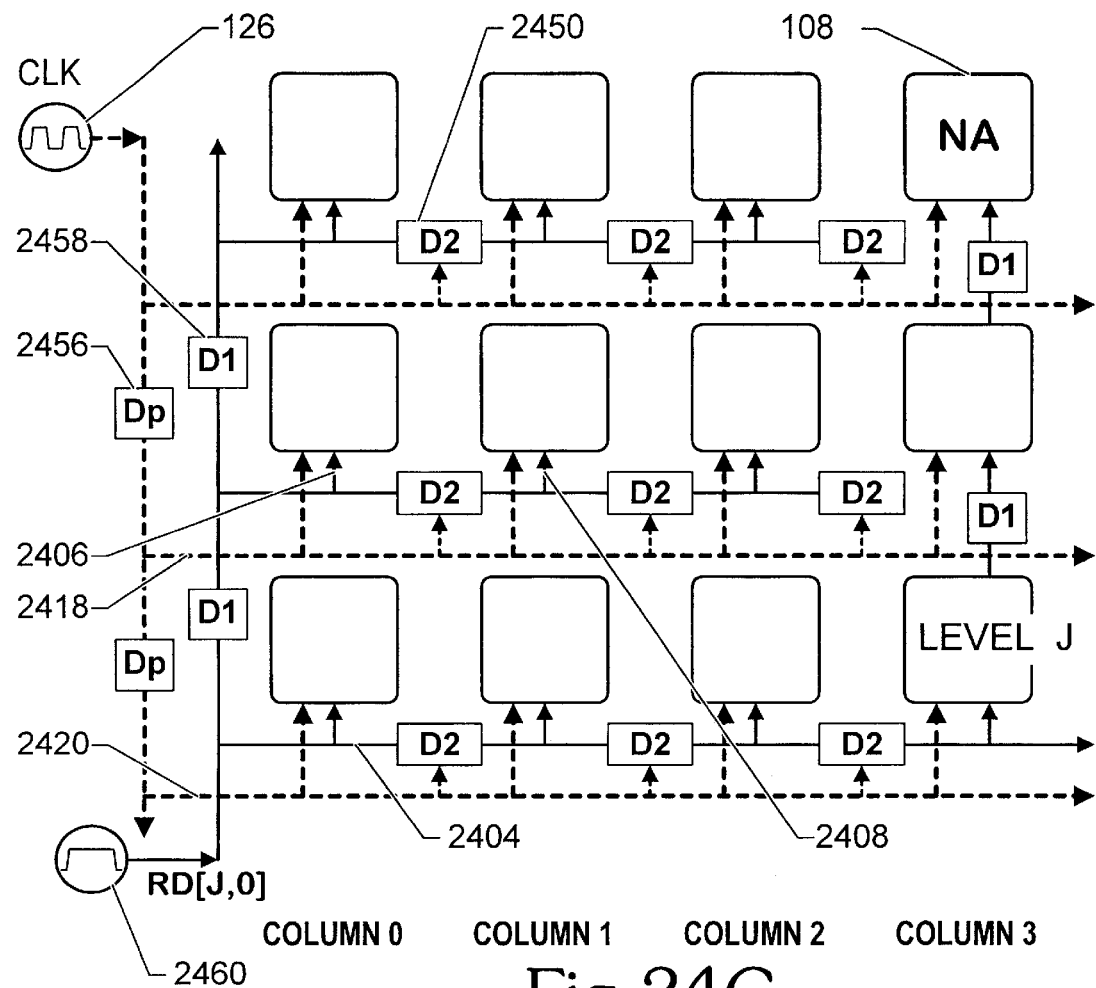
FIG. 24C is a simplified block diagram illustrating an interconnect that distributes the timing signals and clocks shown in FIG. 24B to all cells in all levels and columns of the interconnect.
Figure 24D:
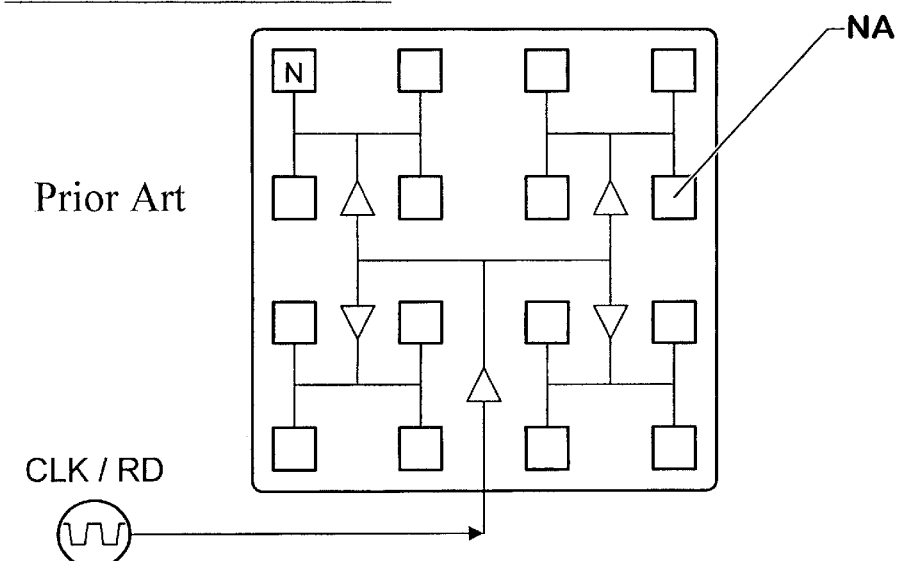
FIG. 24D is a schematic diagram showing a conventional structure with a tree-based fanout for distributing timing signals to all nodes equally within one node array.
Figure 36D:
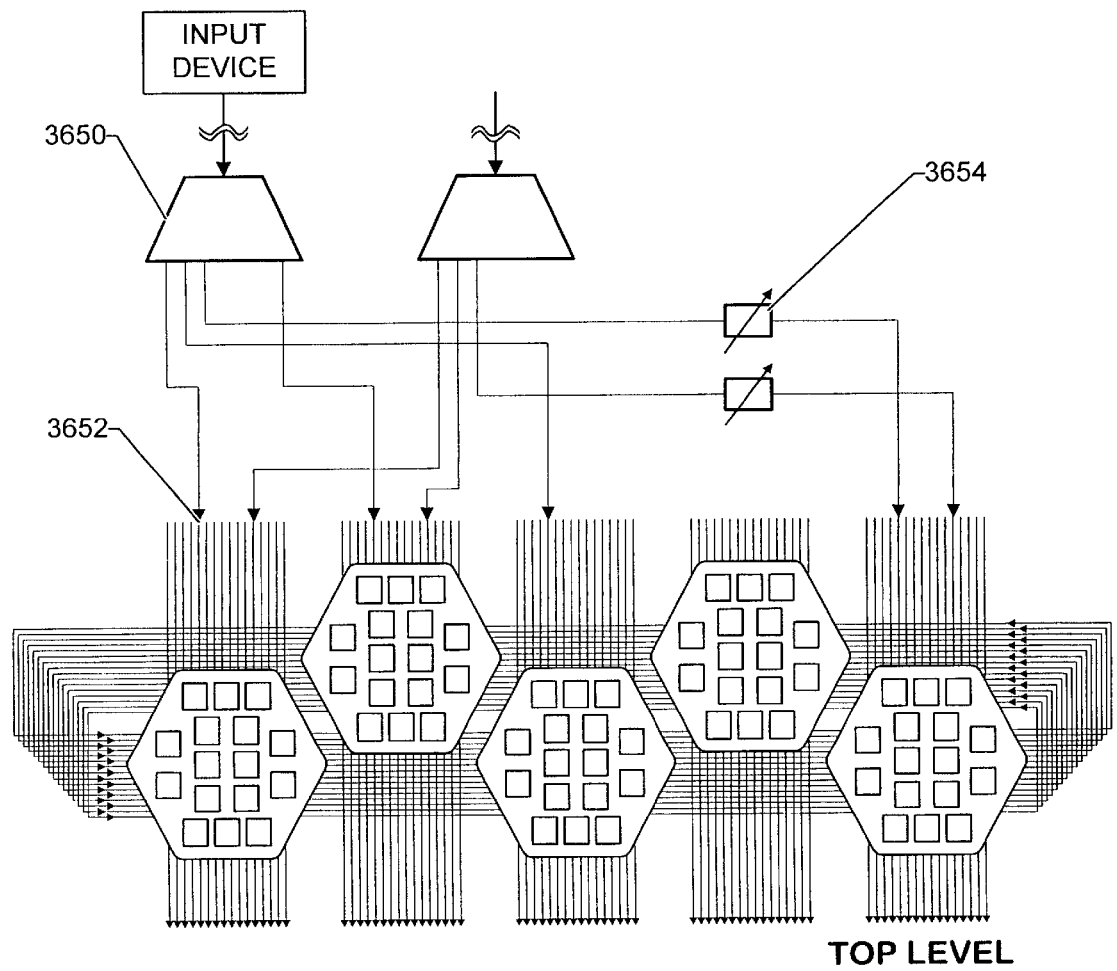
FIG. 36D is a simplified block diagram illustrating the operation of the interconnect on receipt of an asynchronous input signal in which an input message that arrives at an arbitrary time is routed to a particular column that is in synchronization with the message.

FIGS. 24A and 24B illustrate that a message must arrive at a cell a specific time to be routed through the interconnect in synchronization with other messages. FIG. 36D shows a structure that allows an input device to send a message at any time. Input controller and demultiplexer 3650 detects the arrival of traffic bit 302 and routes the arriving message to the appropriate column 3652 in synchronization with other messages at that column. An elastic delay element 3654 is used to make small timing adjustments so that all messages enter the top level synchronously.

FIG. 24B shows the relative timing of messages moving at adjacent levels. A cell has a limited time period, generally a single clock period, to generate and transmit a control signal for the cell to the north. The timing specification also holds for external devices. A top-level node sends a control signal to an external device before the cell can receive the first bit of a message. At high I/O rates, the signal's out-and-back time of flight and the internal processing requirements of input device 3710 may greatly exceed the clock period.

Figure 37:
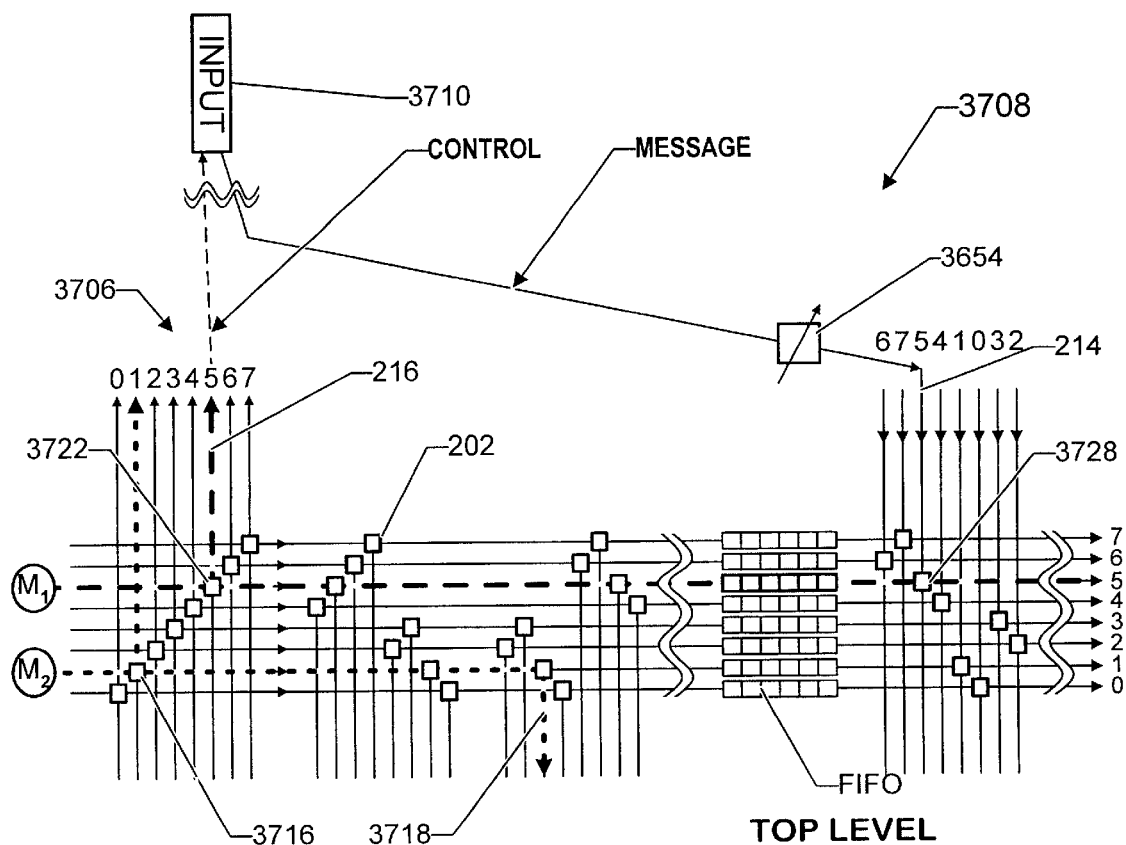
FIG. 37 is a simplified block and interconnect diagram showing the top level of an interconnect structure that supplies an external control signal to an external input device well in advance of timing requirements for that device. The interconnect structure generates a control signal and connects messages to an input device.

FIG. 37 shows a structure that greatly relaxes the input timing constraint and allows sufficient time to generate, transmit and respond to a control signal. The design is similar to the single column or single-clock input of FIG. 36C except that the control signal is taken from one column 3706 and messages are injected at another column 3708 to the east. A blocked message M1 at cell 3722 sends a control signal to an external input device 3710. The external device receives the signal well in advance of the time the external device would send a message to input port 214. An elastic delay element 3654 can be employed to make timing adjustments. The amount of time between control signal output and message input is computed by taking the total number of bits in the shift registers in the cells and FIFOs along the row, and multiplying by the clock period. For example, with a clock period of 1.2 nanoseconds, a FIFO containing 80 bits, 10 cells between signal column 3706 and input column 3708 (totaling 20 bits), the response time is 1.2 (80+20)=120 nanoseconds. The response time is desirably longer than the out-and-back time of flight required for an electronic signal to communicate with the input device plus the processing time of the input device. Message M1 reaches the input port 120 nanoseconds after the transmission of the control signal. The: length of the FIFO may be set or adjusted to accommodate external response time needs. When input cell 3728 is blocked, switch 618 does not accept input from the north, the external input device, and desirably prevents any unwanted message from entering the interconnect structure.

Another blocked message $M_2$ at cell 3716 also sends a control signal to an external device. Because of the large number of columns between the busy output column and message input column, message $M_2$ will likely move south 3718 before reaching the input column. In this case a "false" control signal is generated. The "false" control signal advantageously reduces input traffic at a time when the interconnect is becoming congested at the top level, yielding an automatic mechanism that desirably regulates the receipt of external message traffic when the interconnect becomes busy, and thereby lowers the overall traffic density through the interconnect structure. Because no input connections are made between the busy output column and message-input column, the absence of a control signal always means that the corresponding message input port is available and not blocked.

If the busy signal out is in a column directly preceding the FIFOS, then the input timing constraint is relaxed but the busy signal is never false.

FIG. 38—TIME-OF-FLIGHT LOOP

Figure 38:
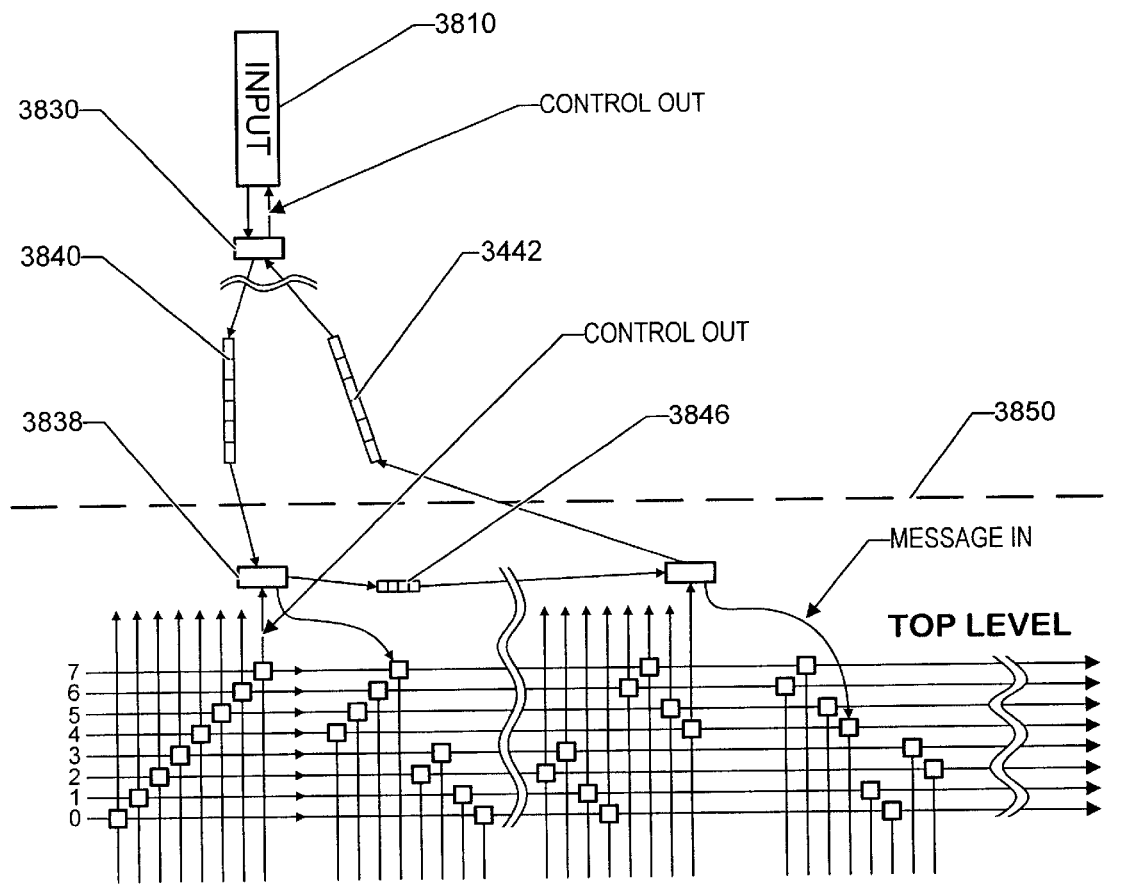
FIG. 38 is a simplified block and interconnect diagram that shows an additional structure for generating a timely control signal to an external input device and showing an external "time of flight" loop which uses a returning blocked message to signal the external device. The blocked message returns to the interconnect structure for another attempt to enter the structure.

FIG. 38 shows an additional technique for handling external response time constraints. In the illustrative structure external signal paths are used, in effect, as a FIFO loop 3840 to buffer one or more messages. If the loop is empty, input device 3810 is allowed to transmit a message into the loop. When the messages reaches an input port 3838 the message is allowed to enter the top level cell if the cell is not busy. If the cell is busy, the message travels through on-chip FIFO 3846 and attempts to access other columns and rows. If the message is blocked at every attempt, the message circulates back to the same or different input device where the message will prevent the device from sending another message into the loop. The returning message desirably serves as a control signal to inform the external input device that the device cannot send a message. After returning to input controller 3830, the message is sent back to the interconnect again to make another attempt to enter. FIFOs 3840 and 3842 together are large enough to contain one or more messages. Components below dash line 3850 are typically internal to the chip.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

In the claims, unless otherwise indicated the article "a" is to refer to "one or more than one".

What is claimed is:

1. An interconnect structure comprising:
a plurality of interconnected nodes including distinct nodes $F_W$, $F_B$, and $F_X$;
means for sending a plurality of messages through the plurality of nodes including sending a set of messages $S_W$ through the node $F_W$;
means for sending information I concerning routing of the messages in the message set $S_W$ through the node $F_W$ including routing a portion of the messages in the message set $S_W$ through the node $F_W$ to the node $F_X$;
means associated with the node $F_B$ for using the information I to route messages through the node $F_B$; and
means for sending a control signal C from the node $F_W$ to the node $F_B$ including a count of messages sent by node $F_W$ to node $F_X$.

2. An interconnect structure comprising:
a plurality of nodes including a node X, a node set T, and a node set S including nodes Y and Z;
a plurality of interconnect paths connecting the nodes;
a plurality of output ports coupled to the plurality of nodes; and
a logic that controls flow of data through the nodes to the output ports, wherein:
the node X is capable of sending data to any node in the set S;
the node set T includes nodes that can alternatively pass data that are otherwise controlled by the logic to flow through the node X;
any output port that can access data passing through the node X can also access data passing through the node Y;
the plurality of output ports include an output port O that can access data passing through the node X but cannot access data passing through the node Z; and
the logic controls flow of data through the node X to maximize the number of data messages that are sent through a node in the set T such that the number of output ports accessible from the node in the set T is less than the number of output ports that are accessible from the node X.

3. An interconnect structure comprising:
a plurality of nodes including non-intersecting node sets $F_X$, $F_Y$, $F_Z$, and $F_T$;
a plurality of interconnect paths connecting the nodes;
a plurality of output ports coupled to the plurality of nodes; and
a logic that controls flow of data through the nodes to the output ports, wherein:
a node X is capable of sending data to a plurality of nodes including nodes in the node sets $F_Y$ and $F_Z$;
a node X in the node set $F_X$ having a corresponding node Y in the node set $F_Y$ for which a subset of the plurality of output ports are accessible from the node X and the node Y;
the node X in the node set $F_X$ having a corresponding node Z in the node set $F_Z$ for which an output port of the plurality of output ports is accessible from the node X but not from the node Z;
the node set $F_T$ includes nodes that can alternatively pass data that are otherwise controlled by the logic to flow through nodes in the node set $F_X$; and
the logic controls flow of data through the node set $F_X$ to maximize the number of data messages that are sent from nodes in the node set $F_X$ to nodes in the node set $F_T$ such that the number of output ports accessible from nodes in the node set $F_T$ is less than the number of output ports that are accessible from nodes in the node set $F_X$.

4. An interconnect structure comprising:
a plurality of nodes including a node X, a node set T, and a node set S including nodes Y and Z;
a plurality of interconnect paths connecting the nodes;
a plurality of output ports coupled to the plurality of nodes; and
a logic that controls flow of data through the nodes to the output ports, wherein:
the node X is capable of sending data to any node in the set S;
the node set T includes nodes that can alternatively pass data that are otherwise controlled by the logic to flow through the node X;
any output port that can access data passing through the node X can also access data passing through the node Y;
the plurality of output ports include an output port O that can access data passing through the node X but cannot access data passing through the node Z; and
the logic controls flow of data through the node X to maximize the number of data messages with asserted quality of service bits that are sent through a node in the set T such that the number of output ports accessible from the node in the set T is less than the number of output ports that are accessible from the node X.

* * * * *